(12) United States Patent
Tang

(10) Patent No.: US 11,349,796 B2
(45) Date of Patent: *May 31, 2022

(54) GENERATING A STITCHED DATA STREAM

(71) Applicant: Snap Inc., Santa Monica, CA (US)

(72) Inventor: Kevin Dechau Tang, Los Angeles, CA (US)

(73) Assignee: Snap Inc., Santa Monica, CA (US)

(*) Notice: Subject to any disclaimer, the term of this patent is extended or adjusted under 35 U.S.C. 154(b) by 215 days.

This patent is subject to a terminal disclaimer.

(21) Appl. No.: 16/704,714

(22) Filed: Dec. 5, 2019

(65) Prior Publication Data

US 2020/0112531 A1 Apr. 9, 2020

Related U.S. Application Data

(63) Continuation of application No. 15/470,004, filed on Mar. 27, 2017, now Pat. No. 10,581,782.

(51) Int. Cl.
*H04L 51/00* (2022.01)
*H04L 51/222* (2022.01)
(Continued)

(52) U.S. Cl.
CPC ............. *H04L 51/16* (2013.01); *H04L 51/10* (2013.01); *H04L 51/20* (2013.01); *H04L 65/4069* (2013.01); *H04L 65/605* (2013.01); *H04N 21/2743* (2013.01); *H04N 21/41407* (2013.01); *H04N 21/4394* (2013.01);
(Continued)

(58) Field of Classification Search
CPC .................................................. H04N 21/8547
See application file for complete search history.

(56) References Cited

U.S. PATENT DOCUMENTS 66,223 A 1/1901 Shedlock
4,581,634 A 4/1986 Williams
(Continued)

FOREIGN PATENT DOCUMENTS

CA 2887596 A1 7/2015
CA 2894332 C 8/2018
(Continued)

OTHER PUBLICATIONS

US 10,075,404 B1, 09/2018, Allen et al. (withdrawn)
(Continued)

*Primary Examiner* — Douglas B Blair
(74) *Attorney, Agent, or Firm* — Schwegman Lundberg & Woessner, P.A.

(57) ABSTRACT

Systems and methods provide for a server computer to receive a plurality of messages from a plurality of user computing devices, each message of the plurality of messages comprising a data stream, determine a subset of messages of the plurality of messages associated with a similar geolocation and time period, determine a set of messages of the subset of messages based on a match score for each pair of messages, and stitch together the set of messages to generate a stitched data stream from the data streams for each message of the set of messages based on a time period for each message, wherein the stitched data stream comprises messages with data streams that overlap in time periods such that there may be more than one data stream for a given time period.

20 Claims, 17 Drawing Sheets

(51) Int. Cl.
  *H04L 51/10* (2022.01)
  *H04L 65/60* (2022.01)
  *H04N 21/439* (2011.01)
  *H04L 65/61* (2022.01)
  *H04N 21/2743* (2011.01)
  *H04N 21/4788* (2011.01)
  *H04N 21/414* (2011.01)
  *H04L 51/52* (2022.01)
  *H04N 21/45* (2011.01)
  *H04L 9/40* (2022.01)

(52) U.S. Cl.
  CPC ......... *H04N 21/4788* (2013.01); *H04L 51/32* (2013.01); *H04L 63/107* (2013.01); *H04N 21/4524* (2013.01)

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,075,535 A | 6/2000 | Fitzhugh et al. |
| 6,154,764 A | 11/2000 | Nitta et al. |
| 6,158,044 A | 12/2000 | Tibbetts |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,290,504 B1 | 9/2001 | Benitz et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,363,380 B1 | 3/2002 | Dimitrova |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,586 B2 | 11/2002 | Ogilvie et al. |
| 6,487,601 B1 | 11/2002 | Hubacher et al. |
| 6,499,016 B1 | 12/2002 | Anderson |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,701,347 B1 | 3/2004 | Ogilvie |
| 6,711,608 B1 | 3/2004 | Ogilvie |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,004,394 B2 | 2/2006 | Kim |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,091 B1 | 10/2006 | Khoo et al. |
| 7,124,164 B1 | 10/2006 | Chemtob |
| 7,142,823 B1 | 11/2006 | Logue et al. |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,025 B2 | 7/2007 | Stone et al. |
| 7,240,089 B2 | 7/2007 | Boudreau |
| 7,243,163 B1 | 7/2007 | Friend et al. |
| 7,269,426 B2 | 9/2007 | Kokkonen et al. |
| 7,278,168 B1 | 10/2007 | Chaudhury et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,376,715 B2 | 5/2008 | Cunningham et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,478,402 B2 | 1/2009 | Christensen et al. |
| 7,496,347 B2 | 2/2009 | Puranik |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,571,244 B2 * | 8/2009 | Costanzo ......... H04L 29/06027 709/231 |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,703,140 B2 | 4/2010 | Nath et al. |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 7,856,449 B1 | 12/2010 | Martino et al. |
| 7,912,896 B2 | 3/2011 | Wotovitz et al. |
| 7,934,156 B2 | 4/2011 | Forstall et al. |
| 7,991,638 B1 | 8/2011 | House et al. |
| 8,001,204 B2 | 8/2011 | Burtner et al. |
| 8,014,762 B2 | 9/2011 | Chmaytelli et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |

(56) References Cited

U.S. PATENT DOCUMENTS

| | | | |
|---|---|---|---|
| 8,170,957 B2 | 5/2012 | Richard |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,369,866 B2 | 2/2013 | Ashley, Jr. et al. |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,428,453 B1 | 4/2013 | Spiegel et al. |
| 8,471,914 B2 | 6/2013 | Sakiyama et al. |
| 8,472,935 B1 | 6/2013 | Fujisaki |
| 8,494,481 B1 | 7/2013 | Bacco et al. |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,570,907 B2 | 10/2013 | Garcia, Jr. et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,681,178 B1 | 3/2014 | Tseng |
| 8,682,350 B2 | 3/2014 | Altman et al. |
| 8,686,962 B2 | 4/2014 | Christie |
| 8,687,021 B2 | 4/2014 | Bathiche et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,751,310 B2 | 6/2014 | Van Datta et al. |
| 8,761,800 B2 | 6/2014 | Kuwahara |
| 8,768,876 B2 | 7/2014 | Shim et al. |
| 8,775,401 B2 | 7/2014 | Zhou et al. |
| 8,775,972 B2 | 7/2014 | Spiegel |
| 8,788,680 B1 | 7/2014 | Naik |
| 8,788,947 B2 | 7/2014 | Putz et al. |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,868,223 B1 | 10/2014 | Sharifi |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,925,106 B1 | 12/2014 | Steiner et al. |
| 8,965,271 B1 * | 2/2015 | Vucurevich ...... H04N 21/41415 455/3.06 |
| 8,972,357 B2 | 3/2015 | Shim et al. |
| 8,977,296 B1 | 3/2015 | Briggs et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,026,943 B1 | 5/2015 | Spiegel |
| 9,037,577 B1 | 5/2015 | Saylor et al. |
| 9,040,574 B2 | 5/2015 | Wang et al. |
| 9,055,416 B2 | 6/2015 | Rosen et al. |
| 9,063,638 B1 | 6/2015 | Schrock et al. |
| 9,083,770 B1 | 7/2015 | Drose et al. |
| 9,094,137 B1 | 7/2015 | Sehn et al. |
| 9,098,832 B1 | 8/2015 | Scardino |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,137,700 B2 | 9/2015 | Elefant et al. |
| 9,143,382 B2 | 9/2015 | Bhogal et al. |
| 9,143,681 B1 | 9/2015 | Ebsen et al. |
| 9,148,424 B1 | 9/2015 | Yang |
| 9,148,742 B1 * | 9/2015 | Koulomzin ............. H04W 4/00 |
| 9,152,477 B1 | 10/2015 | Campbell et al. |
| 9,159,364 B1 | 10/2015 | Matias et al. |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,258,459 B2 | 2/2016 | Hartley |
| 9,264,463 B2 | 2/2016 | Rubinstein et al. |
| 9,276,886 B1 | 3/2016 | Samaranayake |
| 9,294,425 B1 | 3/2016 | Son |
| 9,319,472 B2 | 4/2016 | Cathcart et al. |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,417,754 B2 | 8/2016 | Smith |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,477,391 B2 | 10/2016 | Flynn, III et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,542,422 B2 | 1/2017 | Duggai et al. |
| 9,544,379 B2 | 1/2017 | Gauglitz et al. |
| 9,560,006 B2 | 1/2017 | Prado et al. |
| 9,591,445 B2 | 3/2017 | Zises |
| 9,628,950 B1 | 4/2017 | Noeth et al. |
| 9,648,581 B1 | 5/2017 | Vaynblat et al. |
| 9,652,896 B1 | 5/2017 | Jurgensen et al. |
| 9,659,244 B2 | 5/2017 | Anderton et al. |
| 9,672,538 B1 | 6/2017 | Vaynblat et al. |
| 9,674,660 B1 | 6/2017 | Vaynblat et al. |
| 9,693,191 B2 | 6/2017 | Sehn |
| 9,705,831 B2 | 7/2017 | Spiegel |
| 9,710,821 B2 | 7/2017 | Heath |
| 9,742,713 B2 | 8/2017 | Spiegel et al. |
| 9,785,796 B1 | 10/2017 | Murphy et al. |
| 9,788,027 B1 * | 10/2017 | Vucurevich .......... H04N 21/482 |
| 9,802,121 B2 | 10/2017 | Ackley et al. |
| 9,825,898 B2 | 11/2017 | Sehn |
| 9,843,720 B1 | 12/2017 | Ebsen et al. |
| 9,854,219 B2 | 12/2017 | Sehn |
| 9,866,999 B1 | 1/2018 | Noeth |
| 9,881,094 B2 | 1/2018 | Pavlovskaia |
| 9,961,520 B2 | 5/2018 | Brooks et al. |
| 10,080,102 B1 | 9/2018 | Noeth et al. |
| 10,133,705 B1 | 11/2018 | Allen et al. |
| 10,135,949 B1 | 11/2018 | Pavlovskaia et al. |
| 10,182,311 B2 | 1/2019 | Sehn |
| 10,186,299 B2 * | 1/2019 | Wang ..................... H04N 13/30 |
| 10,200,813 B1 | 2/2019 | Allen et al. |

(56) References Cited

U.S. PATENT DOCUMENTS

| | | | |
|---|---|---|---|
| 10,250,683 B2* | 4/2019 | Karkkainen | H04L 67/1097 |
| 10,284,508 B1 | 5/2019 | Allen et al. | |
| 10,311,916 B2 | 6/2019 | Sehn | |
| 10,354,425 B2 | 7/2019 | Yan et al. | |
| 10,416,845 B1 | 9/2019 | Allen et al. | |
| 10,440,420 B2 | 10/2019 | Hogeg et al. | |
| 10,448,201 B1 | 10/2019 | Sehn et al. | |
| 10,476,830 B2 | 11/2019 | Allen et al. | |
| 10,580,458 B2 | 3/2020 | Sehn | |
| 10,581,782 B2* | 3/2020 | Tang | H04N 21/4788 |
| 10,582,277 B2* | 3/2020 | Tang | G11B 27/036 |
| 10,811,053 B2 | 10/2020 | Sehn | |
| 2001/0025316 A1 | 9/2001 | Oh | |
| 2001/0028787 A1 | 10/2001 | Nomura et al. | |
| 2002/0032771 A1 | 3/2002 | Gledje | |
| 2002/0047868 A1 | 4/2002 | Miyazawa | |
| 2002/0078456 A1 | 6/2002 | Hudson et al. | |
| 2002/0087631 A1 | 7/2002 | Sharma | |
| 2002/0097257 A1 | 7/2002 | Miller et al. | |
| 2002/0098850 A1 | 7/2002 | Akhteruzzaman et al. | |
| 2002/0122659 A1 | 9/2002 | Mcgrath et al. | |
| 2002/0128047 A1 | 9/2002 | Gates | |
| 2002/0144154 A1 | 10/2002 | Tomkow | |
| 2002/0171669 A1 | 11/2002 | Meron et al. | |
| 2003/0001846 A1 | 1/2003 | Davis et al. | |
| 2003/0016247 A1 | 1/2003 | Lai et al. | |
| 2003/0017823 A1 | 1/2003 | Mager et al. | |
| 2003/0020623 A1 | 1/2003 | Cao et al. | |
| 2003/0023874 A1 | 1/2003 | Prokupets et al. | |
| 2003/0037124 A1 | 2/2003 | Yamaura et al. | |
| 2003/0052925 A1 | 3/2003 | Daimon et al. | |
| 2003/0083929 A1 | 5/2003 | Springer et al. | |
| 2003/0101230 A1 | 5/2003 | Benschoter et al. | |
| 2003/0110503 A1 | 6/2003 | Perkes | |
| 2003/0126215 A1 | 7/2003 | Udell | |
| 2003/0131362 A1 | 7/2003 | Jasinschi et al. | |
| 2003/0148773 A1 | 8/2003 | Spriestersbach et al. | |
| 2003/0163370 A1 | 8/2003 | Chen et al. | |
| 2003/0164856 A1 | 9/2003 | Prager et al. | |
| 2003/0217106 A1 | 11/2003 | Adar et al. | |
| 2003/0217118 A1 | 11/2003 | Kobayashi et al. | |
| 2003/0229607 A1 | 12/2003 | Zellweger et al. | |
| 2004/0027371 A1 | 2/2004 | Jaeger | |
| 2004/0064429 A1 | 4/2004 | Hirstius et al. | |
| 2004/0078367 A1 | 4/2004 | Anderson et al. | |
| 2004/0111467 A1 | 6/2004 | Willis | |
| 2004/0158739 A1 | 8/2004 | Wakai et al. | |
| 2004/0185877 A1 | 9/2004 | Asthana et al. | |
| 2004/0189465 A1 | 9/2004 | Capobianco et al. | |
| 2004/0193488 A1 | 9/2004 | Khoo et al. | |
| 2004/0199402 A1 | 10/2004 | Walker et al. | |
| 2004/0203959 A1 | 10/2004 | Coombes | |
| 2004/0205480 A1 | 10/2004 | Moore | |
| 2004/0205514 A1 | 10/2004 | Sommerer et al. | |
| 2004/0215625 A1 | 10/2004 | Svendsen et al. | |
| 2004/0243531 A1 | 12/2004 | Dean | |
| 2004/0243688 A1 | 12/2004 | Wugofski | |
| 2004/0243704 A1 | 12/2004 | Botelho et al. | |
| 2005/0021444 A1 | 1/2005 | Bauer et al. | |
| 2005/0022211 A1 | 1/2005 | Veselov et al. | |
| 2005/0048989 A1 | 3/2005 | Jung | |
| 2005/0071435 A1 | 3/2005 | Karstens | |
| 2005/0078804 A1 | 4/2005 | Yomoda | |
| 2005/0097176 A1 | 5/2005 | Schatz et al. | |
| 2005/0102180 A1 | 5/2005 | Gailey et al. | |
| 2005/0102381 A1 | 5/2005 | Jiang et al. | |
| 2005/0104976 A1 | 5/2005 | Currans | |
| 2005/0114783 A1 | 5/2005 | Szeto | |
| 2005/0119936 A1 | 6/2005 | Buchanan et al. | |
| 2005/0122405 A1 | 6/2005 | Voss et al. | |
| 2005/0193340 A1 | 9/2005 | Amburgey et al. | |
| 2005/0193345 A1 | 9/2005 | Klassen et al. | |
| 2005/0198128 A1 | 9/2005 | Anderson | |
| 2005/0223066 A1 | 10/2005 | Buchheit et al. | |
| 2005/0288954 A1 | 12/2005 | McCarthy et al. | |
| 2006/0004630 A1 | 1/2006 | Criddle et al. | |
| 2006/0026067 A1 | 2/2006 | Nicholas et al. | |
| 2006/0107297 A1 | 5/2006 | Toyama et al. | |
| 2006/0114338 A1 | 6/2006 | Rothschild | |
| 2006/0119882 A1 | 6/2006 | Harris et al. | |
| 2006/0127054 A1 | 6/2006 | Matsuyama | |
| 2006/0242234 A1 | 10/2006 | Counts et al. | |
| 2006/0242239 A1 | 10/2006 | Morishima et al. | |
| 2006/0242554 A1 | 10/2006 | Gerace et al. | |
| 2006/0252438 A1 | 11/2006 | Ansamaa et al. | |
| 2006/0259359 A1 | 11/2006 | Gogel | |
| 2006/0265417 A1 | 11/2006 | Amato et al. | |
| 2006/0270419 A1 | 11/2006 | Crowley et al. | |
| 2006/0287878 A1 | 12/2006 | Wadhwa et al. | |
| 2007/0003221 A1 | 1/2007 | Hamada et al. | |
| 2007/0004426 A1 | 1/2007 | Pfleging et al. | |
| 2007/0028183 A1 | 2/2007 | Ostojic et al. | |
| 2007/0038715 A1 | 2/2007 | Collins et al. | |
| 2007/0040931 A1 | 2/2007 | Nishizawa | |
| 2007/0064899 A1 | 3/2007 | Boss et al. | |
| 2007/0073517 A1 | 3/2007 | Panje | |
| 2007/0073823 A1 | 3/2007 | Cohen et al. | |
| 2007/0075898 A1 | 4/2007 | Markhovsky et al. | |
| 2007/0082707 A1 | 4/2007 | Flynt et al. | |
| 2007/0106706 A1 | 5/2007 | Ahrens | |
| 2007/0136228 A1 | 6/2007 | Petersen | |
| 2007/0192128 A1 | 8/2007 | Celestini | |
| 2007/0198340 A1 | 8/2007 | Lucovsky et al. | |
| 2007/0198495 A1 | 8/2007 | Buron et al. | |
| 2007/0208751 A1 | 9/2007 | Cowan et al. | |
| 2007/0210936 A1 | 9/2007 | Nicholson | |
| 2007/0214180 A1 | 9/2007 | Crawford | |
| 2007/0214216 A1 | 9/2007 | Carrer et al. | |
| 2007/0233556 A1 | 10/2007 | Koningstein | |
| 2007/0233801 A1 | 10/2007 | Eren et al. | |
| 2007/0233859 A1 | 10/2007 | Zhao et al. | |
| 2007/0243887 A1 | 10/2007 | Bandhole et al. | |
| 2007/0244750 A1 | 10/2007 | Grannan et al. | |
| 2007/0250791 A1 | 10/2007 | Halliday et al. | |
| 2007/0255456 A1 | 11/2007 | Funayama | |
| 2007/0268988 A1 | 11/2007 | Hedayat et al. | |
| 2007/0281690 A1 | 12/2007 | Altman et al. | |
| 2007/0299807 A1 | 12/2007 | Lea et al. | |
| 2008/0012987 A1 | 1/2008 | Hirata et al. | |
| 2008/0022329 A1 | 1/2008 | Glad | |
| 2008/0025701 A1 | 1/2008 | Ikeda | |
| 2008/0032703 A1 | 2/2008 | Krumm et al. | |
| 2008/0033795 A1 | 2/2008 | Wishnow et al. | |
| 2008/0033930 A1 | 2/2008 | Warren | |
| 2008/0043041 A2 | 2/2008 | Hedenstroem et al. | |
| 2008/0046476 A1 | 2/2008 | Anderson et al. | |
| 2008/0049704 A1 | 2/2008 | Witteman et al. | |
| 2008/0055269 A1 | 3/2008 | Lemay et al. | |
| 2008/0062141 A1 | 3/2008 | Chandhri | |
| 2008/0076505 A1 | 3/2008 | Ngyen et al. | |
| 2008/0092233 A1 | 4/2008 | Tian et al. | |
| 2008/0094387 A1 | 4/2008 | Chen | |
| 2008/0104503 A1 | 5/2008 | Beall et al. | |
| 2008/0109844 A1 | 5/2008 | Baldeschweiler et al. | |
| 2008/0120409 A1 | 5/2008 | Sun et al. | |
| 2008/0147730 A1 | 6/2008 | Lee et al. | |
| 2008/0148150 A1 | 6/2008 | Mall | |
| 2008/0158230 A1 | 7/2008 | Sharma et al. | |
| 2008/0160956 A1 | 7/2008 | Jackson et al. | |
| 2008/0167106 A1 | 7/2008 | Lutnick | |
| 2008/0168033 A1 | 7/2008 | Ott et al. | |
| 2008/0168489 A1 | 7/2008 | Schraga | |
| 2008/0189177 A1 | 8/2008 | Anderton et al. | |
| 2008/0193101 A1 | 8/2008 | Agnihotri et al. | |
| 2008/0207176 A1 | 8/2008 | Brackbill et al. | |
| 2008/0208692 A1 | 8/2008 | Garaventi et al. | |
| 2008/0021421 A1 | 9/2008 | Rasanen et al. | |
| 2008/0222158 A1 | 9/2008 | Saika | |
| 2008/0222545 A1 | 9/2008 | Lemay | |
| 2008/0255976 A1 | 10/2008 | Altberg et al. | |
| 2008/0256430 A1 | 10/2008 | Gold | |
| 2008/0256446 A1 | 10/2008 | Yamamoto | |
| 2008/0256577 A1 | 10/2008 | Funaki et al. | |
| 2008/0263103 A1 | 10/2008 | Mcgregor et al. | |

(56) References Cited

U.S. PATENT DOCUMENTS

| | | |
|---|---|---|
| 2008/0266421 A1 | 10/2008 | Takahata et al. |
| 2008/0270938 A1 | 10/2008 | Carlson |
| 2008/0284587 A1 | 11/2008 | Saigh et al. |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0316181 A1 | 12/2008 | Nurmi |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0008971 A1 | 4/2009 | Wood et al. |
| 2009/0087161 A1 | 4/2009 | Roberts et al. |
| 2009/0089189 A1 | 4/2009 | Gupta et al. |
| 2009/0089678 A1 | 4/2009 | Sacco et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0169062 A1 | 7/2009 | Cheung et al. |
| 2009/0177299 A1 | 7/2009 | Van De Sluis |
| 2009/0177588 A1 | 7/2009 | Marchese |
| 2009/0177730 A1 | 7/2009 | Annamalai et al. |
| 2009/0187825 A1 | 7/2009 | Sandquist et al. |
| 2009/0192900 A1 | 7/2009 | Collision |
| 2009/0197582 A1 | 8/2009 | Lewis et al. |
| 2009/0197616 A1 | 8/2009 | Lewis et al. |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0235155 A1 | 9/2009 | Ueda |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0284658 A1 | 11/2009 | Cho |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0001980 A1 | 1/2010 | Kim et al. |
| 2010/0011316 A1 | 1/2010 | Sar et al. |
| 2010/0039505 A1 | 2/2010 | Inoue et al. |
| 2010/0041378 A1 | 2/2010 | Aceves et al. |
| 2010/0062794 A1 | 3/2010 | Han |
| 2010/0064324 A1 | 3/2010 | Liassides et al. |
| 2010/0073509 A1 | 3/2010 | Shioji |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0100729 A1 | 4/2010 | Read et al. |
| 2010/0113065 A1 | 5/2010 | Narayan et al. |
| 2010/0115281 A1 | 5/2010 | Camenisch et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0156933 A1 | 6/2010 | Jones et al. |
| 2010/0159944 A1 | 6/2010 | Pascal et al. |
| 2010/0161635 A1 | 6/2010 | Dey |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0185987 A1 | 7/2010 | Yang et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0199166 A1 | 8/2010 | Fisk, III |
| 2010/0199227 A1 | 8/2010 | Xiao et al. |
| 2010/0201482 A1 | 8/2010 | Robertson et al. |
| 2010/0201536 A1 | 8/2010 | Robertson et al. |
| 2010/0211431 A1 | 8/2010 | Lutnick et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0251143 A1 | 9/2010 | Thomas et al. |
| 2010/0257196 A1 | 10/2010 | Waters et al. |
| 2010/0259386 A1 | 10/2010 | Holley et al. |
| 2010/0262461 A1 | 10/2010 | Bohannon |
| 2010/0273463 A1 | 10/2010 | Bonnefoy |
| 2010/0273509 A1 | 10/2010 | Sweeney et al. |
| 2010/0281045 A1 | 11/2010 | Dean |
| 2010/0293105 A1 | 11/2010 | Blinn et al. |
| 2010/0306669 A1 | 12/2010 | Della Pasqua |
| 2010/0332958 A1 | 12/2010 | Weinberger et al. |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0037605 A1* | 2/2011 | Robison, Jr. ...... G08B 13/19613 340/686.1 |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0085059 A1 | 4/2011 | Noh |
| 2011/0099507 A1 | 4/2011 | Nesladek et al. |
| 2011/0102630 A1 | 5/2011 | Rukes |
| 2011/0119133 A1 | 5/2011 | Igelman et al. |
| 2011/0131633 A1 | 6/2011 | Macaskill et al. |
| 2011/0137881 A1 | 6/2011 | Cheng et al. |
| 2011/0141025 A1 | 6/2011 | Tsai |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0170838 A1 | 7/2011 | Rosengart et al. |
| 2011/0184980 A1 | 7/2011 | Jeong et al. |
| 2011/0191368 A1 | 8/2011 | Muzatko |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238300 A1 | 9/2011 | Schenken |
| 2011/0238763 A1 | 9/2011 | Shin et al. |
| 2011/0251790 A1 | 10/2011 | Liotopoulos et al. |
| 2011/0255736 A1 | 10/2011 | Thompson et al. |
| 2011/0256881 A1 | 10/2011 | Huang et al. |
| 2011/0273575 A1 | 11/2011 | Lee |
| 2011/0276637 A1 | 11/2011 | Thornton et al. |
| 2011/0282799 A1 | 11/2011 | Huston |
| 2011/0283188 A1 | 11/2011 | Farrenkopf |
| 2011/0286586 A1 | 11/2011 | Saylor et al. |

(56) References Cited

U.S. PATENT DOCUMENTS

| | | |
|---|---|---|
| 2011/0294541 A1 | 12/2011 | Zheng et al. |
| 2011/0295677 A1 | 12/2011 | Dhingra et al. |
| 2011/0296474 A1 | 12/2011 | Babic |
| 2011/0306387 A1 | 12/2011 | Moon |
| 2011/0314084 A1 | 12/2011 | Saretto et al. |
| 2011/0314419 A1 | 12/2011 | Dunn et al. |
| 2011/0320373 A1 | 12/2011 | Lee et al. |
| 2012/0004956 A1 | 1/2012 | Hustan |
| 2012/0019722 A1 | 1/2012 | Kwisthout et al. |
| 2012/0023522 A1 | 1/2012 | Anderson et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054001 A1 | 3/2012 | Zivkovic et al. |
| 2012/0054797 A1 | 3/2012 | Skog et al. |
| 2012/0054811 A1 | 3/2012 | Spears |
| 2012/0059722 A1 | 3/2012 | Rao |
| 2012/0062805 A1 | 3/2012 | Candelore |
| 2012/0070045 A1 | 3/2012 | Vesper et al. |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0117456 A1 | 5/2012 | Koskimies |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0127196 A1 | 5/2012 | Landry |
| 2012/0131507 A1 | 5/2012 | Sparandara et al. |
| 2012/0131512 A1 | 5/2012 | Takeuchi et al. |
| 2012/0136998 A1 | 5/2012 | Hough et al. |
| 2012/0001651 A1 | 6/2012 | Lalancette et al. |
| 2012/0143760 A1 | 6/2012 | Abulafia et al. |
| 2012/0150978 A1 | 6/2012 | Monaco |
| 2012/0158532 A1 | 6/2012 | Fitzsimmons |
| 2012/0163664 A1 | 6/2012 | Zhu |
| 2012/0166971 A1 | 6/2012 | Sachsen et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197690 A1 | 8/2012 | Agulnek |
| 2012/0197724 A1 | 8/2012 | Kendall |
| 2012/0200743 A1 | 8/2012 | Blanchflower et al. |
| 2012/0201362 A1 | 8/2012 | Crossan et al. |
| 2012/0203849 A1 | 8/2012 | Collins et al. |
| 2012/0208564 A1 | 8/2012 | Clark et al. |
| 2012/0209892 A1 | 8/2012 | Macaskill et al. |
| 2012/0209921 A1 | 8/2012 | Adafin et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254324 A1 | 10/2012 | Majeti et al. |
| 2012/0254325 A1 | 10/2012 | Majeti et al. |
| 2012/0259815 A1 | 10/2012 | Olson |
| 2012/0263439 A1* | 10/2012 | Lassman ............... G11B 27/10 |
| | | 386/280 |
| 2012/0271684 A1 | 10/2012 | Shutter |
| 2012/0278387 A1 | 11/2012 | Garcia et al. |
| 2012/0278692 A1 | 11/2012 | Shi |
| 2012/0281129 A1 | 11/2012 | Wang et al. |
| 2012/0288147 A1 | 11/2012 | Fujitani |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0311465 A1 | 12/2012 | Nealer et al. |
| 2012/0311623 A1 | 12/2012 | Davis et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0004014 A1* | 1/2013 | Hickman ............... G06F 16/68 |
| | | 382/100 |
| 2013/0006759 A1 | 1/2013 | Srivastava et al. |
| 2013/0006777 A1 | 1/2013 | Krishnareddy et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057489 A1 | 3/2013 | Morton |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0076758 A1 | 3/2013 | Li et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0115872 A1 | 5/2013 | Huang et al. |
| 2013/0122862 A1 | 5/2013 | Horn et al. |
| 2013/0122929 A1 | 5/2013 | Al-mufti et al. |
| 2013/0124297 A1 | 5/2013 | Hegeman et al. |
| 2013/0128059 A1 | 5/2013 | Kristensson |
| 2013/0129252 A1 | 5/2013 | Lauper |
| 2013/0132194 A1 | 5/2013 | Rajaram |
| 2013/0132477 A1 | 5/2013 | Bosworth et al. |
| 2013/0145286 A1 | 6/2013 | Feng et al. |
| 2013/0157684 A1 | 6/2013 | Moser |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173380 A1 | 7/2013 | Akbari et al. |
| 2013/0173729 A1 | 7/2013 | Starenky et al. |
| 2013/0176438 A1 | 7/2013 | Mate et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0283167 A1 | 10/2013 | Xu |
| 2013/0290337 A1 | 10/2013 | Lansford et al. |
| 2013/0290443 A1 | 10/2013 | Collins et al. |
| 2013/0304243 A1 | 11/2013 | Iseli |
| 2013/0304527 A1 | 11/2013 | Santos, III |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |

(56) References Cited

U.S. PATENT DOCUMENTS

| | | |
|---|---|---|
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0028589 A1 | 1/2014 | Reilly |
| 2014/0029034 A1 | 1/2014 | Toriyama |
| 2014/0032682 A1 | 1/2014 | Prado et al. |
| 2014/0031899 A1 | 2/2014 | Rosenthal et al. |
| 2014/0040712 A1 | 2/2014 | Chang et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047074 A1* | 2/2014 | Chung ............... H04L 51/32 709/219 |
| 2014/0047335 A1 | 2/2014 | Lewis et al. |
| 2014/0049652 A1 | 2/2014 | Moon et al. |
| 2014/0052281 A1 | 2/2014 | Eronen et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0059479 A1 | 2/2014 | Hamburg et al. |
| 2014/0068692 A1 | 3/2014 | Archibong et al. |
| 2014/0082651 A1 | 3/2014 | Sharifi |
| 2014/0086562 A1 | 3/2014 | Lassman et al. |
| 2014/0089264 A1 | 3/2014 | Talagala et al. |
| 2014/0089314 A1 | 3/2014 | Iizuka et al. |
| 2014/0092130 A1 | 4/2014 | Anderson et al. |
| 2014/0095296 A1 | 4/2014 | Angell et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129627 A1 | 5/2014 | Baldwin et al. |
| 2014/0129953 A1 | 5/2014 | Spiegel |
| 2014/0136985 A1 | 5/2014 | Albir et al. |
| 2014/0143143 A1 | 5/2014 | Fasoli et al. |
| 2014/0149519 A1 | 5/2014 | Redfern et al. |
| 2014/0015641 A1 | 6/2014 | Wuersch et al. |
| 2014/0153902 A1 | 6/2014 | Pearson et al. |
| 2014/0155102 A1 | 6/2014 | Cooper et al. |
| 2014/0164118 A1 | 6/2014 | Polachi |
| 2014/0164979 A1 | 6/2014 | Deeter et al. |
| 2014/0172542 A1 | 6/2014 | Poncz et al. |
| 2014/0172877 A1 | 6/2014 | Rubinstein et al. |
| 2014/0173424 A1 | 6/2014 | Hogeg et al. |
| 2014/0173457 A1 | 6/2014 | Wang et al. |
| 2014/0180829 A1 | 6/2014 | Umeda |
| 2014/0189592 A1 | 7/2014 | Benchenaa et al. |
| 2014/0201527 A1 | 7/2014 | Krivorot |
| 2014/0207679 A1 | 7/2014 | Cho |
| 2014/0207860 A1 | 7/2014 | Wang et al. |
| 2014/0214471 A1 | 7/2014 | Schreiner, III |
| 2014/0222564 A1 | 8/2014 | Kranendonk et al. |
| 2014/0222913 A1 | 8/2014 | Cathcart et al. |
| 2014/0250465 A1 | 9/2014 | Mulholland et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279040 A1 | 9/2014 | Kuboyama |
| 2014/0279061 A1 | 9/2014 | Elimeliah et al. |
| 2014/0279128 A1 | 9/2014 | Sagebin |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0286566 A1 | 9/2014 | Rhoads |
| 2014/0287779 A1 | 9/2014 | O'keefe et al. |
| 2014/0289603 A1* | 9/2014 | Subrahmanya ....... G06F 40/169 715/230 |
| 2014/0289833 A1 | 9/2014 | Briceno |
| 2014/0029821 A1 | 10/2014 | Park et al. |
| 2014/0304622 A1 | 10/2014 | Jorasch et al. |
| 2014/0306986 A1 | 10/2014 | Gottesman et al. |
| 2014/0317302 A1 | 10/2014 | Naik |
| 2014/0320662 A1* | 10/2014 | McNamee ......... H04N 5/23293 348/159 |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0325569 A1* | 10/2014 | Suzuki ............... H04N 21/6193 725/67 |
| 2014/0331188 A1 | 11/2014 | Sandstrom et al. |
| 2014/0337123 A1 | 11/2014 | Nuernberg et al. |
| 2014/0344698 A1* | 11/2014 | Hohteri ............... G06F 3/04847 715/720 |
| 2014/0359024 A1 | 12/2014 | Spiegel |
| 2014/0359032 A1 | 12/2014 | Spiegel et al. |
| 2014/0359656 A1 | 12/2014 | Banica et al. |
| 2014/0372844 A1 | 12/2014 | Zumkhawala |
| 2014/0372850 A1 | 12/2014 | Campbell et al. |
| 2014/0379683 A1 | 12/2014 | Bazaz |
| 2015/0015680 A1* | 1/2015 | Wang .................... G11B 27/30 348/51 |
| 2015/0020086 A1 | 1/2015 | Chen et al. |
| 2015/0040011 A1 | 2/2015 | Chun |
| 2015/0046278 A1 | 2/2015 | Pei et al. |
| 2015/0055197 A1 | 2/2015 | Romanoff et al. |
| 2015/0063724 A1 | 3/2015 | Ikeda et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0094106 A1 | 4/2015 | Grossman et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0127754 A1 | 5/2015 | Clark et al. |
| 2015/0130178 A1 | 5/2015 | Clements |
| 2015/0142753 A1 | 5/2015 | Soon-shiong |
| 2015/0154650 A1 | 6/2015 | Umeda |
| 2015/0169827 A1 | 6/2015 | Laborde |
| 2015/0172534 A1 | 6/2015 | Miyakawa et al. |
| 2015/0177937 A1 | 6/2015 | Poletto et al. |
| 2015/0178260 A1 | 6/2015 | Brunson |
| 2015/0186497 A1 | 7/2015 | Patton et al. |
| 2015/0199082 A1 | 7/2015 | Scholler et al. |
| 2015/0206349 A1 | 7/2015 | Rosenthal et al. |
| 2015/0222814 A1 | 8/2015 | Li et al. |
| 2015/0227602 A1 | 8/2015 | Ramu et al. |
| 2015/0237472 A1 | 8/2015 | Alsina et al. |
| 2015/0237473 A1 | 8/2015 | Koepke |
| 2015/0248683 A1 | 9/2015 | Walkingshaw |
| 2015/0254704 A1 | 9/2015 | Kothe et al. |
| 2015/0261917 A1 | 9/2015 | Smith |
| 2015/0262208 A1 | 9/2015 | Bjontegard |
| 2015/0269624 A1 | 9/2015 | Cheng et al. |
| 2015/0271779 A1 | 9/2015 | Alavudin |
| 2015/0294367 A1 | 10/2015 | Oberbrunner et al. |
| 2015/0312184 A1 | 10/2015 | Langholz et al. |
| 2015/0032651 A1 | 11/2015 | Tomlinson et al. |
| 2015/0332310 A1 | 11/2015 | Cui et al. |
| 2015/0332317 A1 | 11/2015 | Cui et al. |
| 2015/0332325 A1 | 11/2015 | Sharma et al. |
| 2015/0332329 A1 | 11/2015 | Luo et al. |
| 2015/0350136 A1 | 12/2015 | Flynn, III et al. |
| 2015/0356190 A1 | 12/2015 | Rotem et al. |
| 2015/0358806 A1 | 12/2015 | Salqvist |
| 2015/0365795 A1 | 12/2015 | Allen et al. |
| 2015/0367233 A1 | 12/2015 | Hicks et al. |
| 2015/0378502 A1 | 12/2015 | Hu et al. |
| 2015/0381882 A1 | 12/2015 | Rao et al. |
| 2016/0006927 A1 | 1/2016 | Sehn |
| 2016/0014063 A1 | 1/2016 | Hogeg et al. |
| 2016/0034253 A1 | 2/2016 | Bang et al. |
| 2016/0034712 A1 | 2/2016 | Patton et al. |
| 2016/0034786 A1* | 2/2016 | Suri ...................... G06K 9/6256 382/159 |
| 2016/0048369 A1 | 2/2016 | Zenoff |
| 2016/0085773 A1 | 3/2016 | Chang et al. |
| 2016/0085863 A1 | 3/2016 | Allen et al. |
| 2016/0085994 A1 | 3/2016 | Pereira |
| 2016/0086670 A1 | 3/2016 | Gross et al. |
| 2016/0092561 A1 | 3/2016 | Liu et al. |
| 2016/0092962 A1 | 3/2016 | Wasserman et al. |

(56) References Cited

U.S. PATENT DOCUMENTS

| | | |
|---|---|---|
| 2016/0098742 A1 | 4/2016 | Minicucci et al. |
| 2016/0099901 A1 | 4/2016 | Allen et al. |
| 2016/0105387 A1 | 4/2016 | Jackson |
| 2016/0180887 A1 | 6/2016 | Sehn |
| 2016/0182422 A1 | 6/2016 | Sehn et al. |
| 2016/0182875 A1 | 6/2016 | Sehn |
| 2016/0196584 A1 | 7/2016 | Franklin et al. |
| 2016/0210657 A1 | 7/2016 | Chittilappilly et al. |
| 2016/0219402 A1 | 7/2016 | Zimerman et al. |
| 2016/0234556 A1* | 8/2016 | Berridge ............ H04N 21/4758 |
| 2016/0239248 A1 | 8/2016 | Sehn |
| 2016/0247537 A1* | 8/2016 | Ricciardi ............ G11B 27/036 |
| 2016/0253833 A1 | 9/2016 | Lew |
| 2016/0253912 A1 | 9/2016 | Heilman et al. |
| 2016/0274705 A1 | 9/2016 | Kapadia et al. |
| 2016/0277419 A1 | 9/2016 | Allen et al. |
| 2016/0286244 A1* | 9/2016 | Chang ................ H04N 21/4788 |
| 2016/0292735 A1 | 10/2016 | Kim |
| 2016/0321708 A1 | 11/2016 | Sehn |
| 2016/0352659 A1 | 12/2016 | Krishnamoorth |
| 2016/0359957 A1 | 12/2016 | Laliberte |
| 2016/0359987 A1 | 12/2016 | Laliberte |
| 2016/0364668 A1* | 12/2016 | Young ............. G06Q 10/06313 |
| 2017/0006094 A1 | 1/2017 | Abou Mahmoud et al. |
| 2017/0061308 A1 | 3/2017 | Chen et al. |
| 2017/0078760 A1 | 3/2017 | Christoph et al. |
| 2017/0091795 A1 | 3/2017 | Mansour et al. |
| 2017/0111617 A1 | 4/2017 | Kuwahara et al. |
| 2017/0127233 A1 | 5/2017 | Liang et al. |
| 2017/0134821 A1 | 5/2017 | D'amelio et al. |
| 2017/0149717 A1 | 5/2017 | Sehn |
| 2017/0161382 A1 | 6/2017 | Ouimet et al. |
| 2017/0164161 A1 | 6/2017 | Gupta et al. |
| 2017/0185256 A1 | 6/2017 | Bennett |
| 2017/0186038 A1 | 6/2017 | Glover et al. |
| 2017/0222962 A1 | 8/2017 | Gauglitz et al. |
| 2017/0230315 A1 | 8/2017 | Zubas et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0310888 A1 | 10/2017 | Wright et al. |
| 2017/0374003 A1 | 12/2017 | Allen et al. |
| 2017/0374508 A1 | 12/2017 | Davis et al. |
| 2018/0013975 A1 | 1/2018 | Tang |
| 2018/0103002 A1 | 4/2018 | Sehn |
| 2018/0121957 A1 | 5/2018 | Cornwall et al. |
| 2018/0189835 A1 | 7/2018 | Deluca et al. |
| 2018/0225687 A1 | 8/2018 | Ahmed et al. |
| 2018/0278562 A1 | 9/2018 | Tang |
| 2018/0279016 A1 | 9/2018 | Tang |
| 2018/0301169 A1* | 10/2018 | Ricciardi ............. G06F 16/784 |
| 2018/0316575 A1 | 11/2018 | Son et al. |
| 2019/0237106 A1 | 8/2019 | Sehn |
| 2019/0267041 A1 | 8/2019 | Ricciardi |
| 2019/0342699 A1 | 11/2019 | Sehn et al. |
| 2020/0105304 A1 | 4/2020 | Sehn |
| 2020/0411058 A1 | 12/2020 | Sehn |

FOREIGN PATENT DOCUMENTS

| | | |
|---|---|---|
| CA | 2910158 C | 6/2019 |
| CN | 101635763 A | 1/2010 |
| CN | 102238107 A | 11/2011 |
| CN | 102572575 A | 7/2012 |
| CN | 103095768 A | 5/2013 |
| CN | 106663264 A | 5/2017 |
| CN | 107004225 A | 8/2017 |
| CN | 107111828 A | 8/2017 |
| CN | 107251006 A | 10/2017 |
| CN | 107637099 A | 1/2018 |
| CN | 107710772 A | 2/2018 |
| CN | 110462616 A | 11/2019 |
| EP | 2051480 A1 | 4/2009 |
| EP | 2151797 A1 | 2/2010 |
| GB | 2399928 A | 9/2004 |
| JP | 2012104106 A | 5/2012 |
| KR | 19990073076 A | 10/1999 |
| KR | 20010078417 A | 8/2001 |
| KR | 1020060038872 A | 5/2006 |
| KR | 1020080006729 A | 1/2008 |
| KR | 1020080017854 A | 2/2008 |
| KR | 20080028962 A | 4/2008 |
| KR | 20120121452 A | 11/2012 |
| KR | 20120125381 A | 11/2012 |
| KR | 1020120140404 A | 12/2012 |
| KR | 20130061724 A | 6/2013 |
| KR | 20140066278 A | 6/2014 |
| KR | 1020140066795 A | 6/2014 |
| KR | 1020140115413 A | 10/2014 |
| KR | 10-1822920 | 1/2018 |
| KR | 101869473 | 6/2018 |
| KR | 101933840 B1 | 12/2018 |
| KR | 102017 | 8/2019 |
| KR | 102287798 | 8/2021 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2012000107 A1 | 1/2012 |
| WO | WO-2013006584 A1 | 1/2013 |
| WO | WO-2013008238 A1 | 1/2013 |
| WO | WO-2013008251 A2 | 1/2013 |
| WO | WO-2013045753 A1 | 4/2013 |
| WO | WO-2013058897 A1 | 4/2013 |
| WO | WO-2013126784 A2 | 8/2013 |
| WO | WO-2014006129 A1 | 1/2014 |
| WO | WO-2014031562 A1 | 2/2014 |
| WO | WO-2014068573 A1 | 5/2014 |
| WO | WO-2014093668 A1 | 6/2014 |
| WO | WO-2014115136 A1 | 7/2014 |
| WO | WO-2014172388 A1 | 10/2014 |
| WO | WO-2014194262 A2 | 12/2014 |
| WO | WO-2015192026 A1 | 12/2015 |
| WO | WO-2016007285 A1 | 1/2016 |
| WO | WO-2016044241 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016112299 A1 | 7/2016 |
| WO | WO-2016149594 A1 | 9/2016 |
| WO | WO-2016179235 A1 | 11/2016 |
| WO | WO-2016179166 A1 | 11/2016 |
| WO | WO-2016202890 A1 | 12/2016 |
| WO | WO-2017106529 A1 | 6/2017 |
| WO | WO-2017176739 A1 | 10/2017 |
| WO | WO-2017176992 A1 | 10/2017 |
| WO | WO-2018005644 A1 | 1/2018 |
| WO | WO-2018144931 A1 | 8/2018 |
| WO | WO-2018183119 A1 | 10/2018 |

OTHER PUBLICATIONS

US 10,425,370 B2, 09/2019, Allen et al. (withdrawn)
US 10,484,394 B2, 11/2019, Allen et al. (withdrawn)
U.S. Appl. No. 17/023,175, filed Sep. 16, 2020, Routing Messages by Message Parameter.
U.S. Appl. No. 14/578,271, U.S. Pat. No. 9,854,219, filed Dec. 19, 2014, Gallery of Videos Set to an Audio Time Line.
U.S. Appl. No. 14/967,472, U.S. Pat. No. 10,311,916, filed Dec. 14, 2015, Gallery of Videos Set to an Audio Time Line.
U.S. Appl. No. 16/376,598, U.S. Pat. No. 10,580,458, filed Apr. 5, 2019, Gallery of Videos Set to an Audio Time Line.
U.S. Appl. No. 16/703,526, filed Dec. 4, 2019, Routing Messages by Message Parameter.

(56) References Cited

OTHER PUBLICATIONS

U.S. Appl. No. 15/470,004, U.S. Pat. No. 10,581,782, filed Mar. 27, 2017, Generating a Stitched Data Stream.
U.S. Appl. No. 15/470,025, U.S. Pat. No. 10,582,277, filed Mar. 27, 2017, Generating a Stitched Data Stream.
U.S. Appl. No. 16/704,601, filed Dec. 5, 2019, Generating a Stitched Data Stream.
"Korean Application Serial No. 10-2019-7031595, Response filed Nov. 2, 2020 to Notice of Preliminary Rejection dated Sep. 1, 2020", w/ English Claims, 34 pgs.
"European Application Serial No. 15870874.3, Communication Pursuant to Article 94(3) EPC dated Feb. 22, 2021", 5 pgs.
"Korean Application Serial No. 10-2019-7031595, Notice of Preliminary Rejection dated Mar. 10, 2021", w/ English Translation, 9 pgs.
"U.S. Appl. No. 16/703,526, Notice of Allowance dated Jun. 19, 2020", 10 pgs.
"U.S. Appl. No. 16/703,526, Supplemental Notice of Allowability dated Aug. 10, 2020", 2 pgs.
"U.S. Appl. No. 16/703,526, Corrected Notice of Allowability dated Sep. 2, 2020", 2 pgs.
"Korean Application Serial No. 10-2019-7031595, Notice of Preliminary Rejection dated Sep. 1, 2020", w/ English translation, 11 pgs.
"U.S. Appl. No. 14/304,855, Corrected Notice of Allowance dated Jun. 26, 2015", 8 pgs.
"U.S. Appl. No. 14/304,855, Final Office Action dated Feb. 18, 2015", 10 pgs.
"U.S. Appl. No. 14/304,855, Non Final Office Action dated Mar. 18, 2015", 9 pgs.
"U.S. Appl. No. 14/304,855, Non Final Office Action dated Oct. 22, 2014", 11 pgs.
"U.S. Appl. No. 14/304,855, Notice of Allowance dated Jun. 1, 2015", 11 pgs.
"U.S. Appl. No. 14/304,855, Response filed Feb. 25, 2015 to Final Office Action dated Feb. 18, 2015", 5 pgs.
"U.S. Appl. No. 14/304,855, Response filed Apr. 1, 2015 to Non Final Office Action dated Mar. 18, 2015", 4 pgs.
"U.S. Appl. No. 14/304,855, Response filed Nov. 7, 2014 to Non Final Office Action dated Oct. 22, 2014", 5 pgs.
"U.S. Appl. No. 14/505,478, Advisory Action dated Apr. 14, 2015", 3 pgs.
"U.S. Appl. No. 14/505,478, Corrected Notice of Allowance dated May 18, 2016", 2 pgs.
"U.S. Appl. No. 14/505,478, Corrected Notice of Allowance dated Jul. 22, 2016", 2 pgs.
"U.S. Appl. No. 14/505,478, Final Office Action dated Mar. 17, 2015", 16 pgs.
"U.S. Appl. No. 14/505,478, Non Final Office Action dated Jan. 27, 2015", 13 pgs.
"U.S. Appl. No. 14/505,478, Non Final Office Action dated Sep. 4, 2015", 19 pgs.
"U.S. Appl. No. 14/505,478, Notice of Allowance dated Apr. 28, 2016", 11 pgs.
"U.S. Appl. No. 14/505,478, Notice of Allowance dated Aug. 26, 2016", 11 pgs.
"U.S. Appl. No. 14/505,478, Response filed Jan. 30, 2015 to Non Final Office Action dated Jan. 27, 2015", 10 pgs.
"U.S. Appl. No. 14/505,478, Response filed Mar. 4, 2016 to Non Final Office Action dated Sep. 4, 2015", 12 pgs.
"U.S. Appl. No. 14/505,478, Response filed Apr. 1, 2015 to Final Office Action dated Mar. 17, 2015", 6 pgs.
"U.S. Appl. No. 14/506,478, Response filed Aug. 17, 2015 to Advisory Action dated Apr. 14, 2015", 10 pgs.
"U.S. Appl. No. 14/523,728, Non Final Office Action dated Dec. 12, 2014", 10 pgs.
"U.S. Appl. No. 14/523,728, Notice of Allowance dated Mar. 24, 2015", 8 pgs.
"U.S. Appl. No. 14/523,728, Notice of Allowance dated Apr. 15, 2015", 8 pgs.
"U.S. Appl. No. 14/523,728, Notice of Allowance dated Jun. 5, 2015", 8 pgs.
"U.S. Appl. No. 14/523,728, Response filed Aug. 25, 2014 to Non Final Office Action dated Jan. 16, 2015", 5 pgs.
"U.S. Appl. No. 14/529,064, Final Office Action dated Aug. 11, 2015", 23 pgs.
"U.S. Appl. No. 14/529,064, Non Final Office Action dated Mar. 12, 2015", 20 pgs.
"U.S. Appl. No. 14/529,064, Response filed Feb. 5, 2015 to Restriction Requirement dated Feb. 2, 2015", 6 pgs.
"U.S. Appl. No. 14/529,064, Response filed Mar. 26, 2015 to Non Final Office Action dated Mar. 12, 2015", 8 pgs.
"U.S. Appl. No. 14/529,064, Response filed Oct. 12, 2015 to Final Office Action dated Aug. 11, 2015", 19 pgs.
"U.S. Appl. No. 14/529,064, Restriction Requirement dated Feb. 2, 2015", 5 pgs.
"U.S. Appl. No. 14/578,258, Examiner Interview Summary dated Nov. 25, 2015", 3 pgs.
"U.S. Appl. No. 14/578,258, Non Final Office Action dated Jun. 10, 2015", 12 pgs.
"U.S. Appl. No. 14/578,258, Notice of Allowance dated Feb. 26, 2016", 5 pgs.
"U.S. Appl. No. 14/578,258, Response filed Dec. 10, 2015 to Non Final Office Action dated Jun. 10, 2015", 11 pgs.
"U.S. Appl. No. 14/578,271, Corrected Notice of Allowance dated Oct. 30, 2017", 2 pgs.
"U.S. Appl. No. 14/578,271, Final Office Action dated Dec. 3, 2015", 15 pgs.
"U.S. Appl. No. 14/578,271, Non Final Office Action dated Aug. 7, 2015", 12 pgs.
"U.S. Appl. No. 14/578,271, Notice of Allowability dated Nov. 29, 2017", 3 pgs.
"U.S. Appl. No. 14/578,271, Notice of Allowance dated Aug. 1, 2017", 5 pgs.
"U.S. Appl. No. 14/578,271, Notice of Allowance dated Dec. 7, 2016", 7 pgs.
"U.S. Appl. No. 14/578,271, Response filed Feb. 9, 2016 to Final Office Action dated Dec. 3, 2015", 10 pgs.
"U.S. Appl. No. 14/578,271, Response filed Jun. 19, 2015 to Restriction Requirement dated Apr. 23, 2015", 6 pgs.
"U.S. Appl. No. 14/578,271, Response filed Oct. 28, 2015 to Non Final Office Action dated Aug. 7, 2015", 9 pgs.
"U.S. Appl. No. 14/578,271, Restriction Requirement dated Apr. 23, 2015", 8 pgs.
"U.S. Appl. No. 14/612,692, Examiner Interview Summary dated Jan. 29, 2016", 5 pgs.
"U.S. Appl. No. 14/612,692, Examiner Interview Summary dated Jul. 6, 2016", 4 pgs.
"U.S. Appl. No. 14/612,692, Examiner Interview Summary dated Aug. 14, 2015", 3 pgs.
"U.S. Appl. No. 14/612,692, Examiner Interview Summary dated Sep. 8, 2016", 3 pgs.
"U.S. Appl. No. 14/612,692, Final Office Action dated Aug. 15, 2016", 18 pgs.
"U.S. Appl. No. 14/612,692, Final Office Action dated Aug. 25, 2017", 18 pgs.
"U.S. Appl. No. 14/612,692, Final Office Action dated Nov. 23, 2015", 15 pgs.
"U.S. Appl. No. 14/612,692, Non Final Office Action dated Jan. 3, 2017", 17 pgs.
"U.S. Appl. No. 14/612,692, Non Final Office Action dated Mar. 28, 2016", 15 pgs.
"U.S. Appl. No. 14/612,692, Non Final Office Action dated Jul. 20, 2015", 25 pgs.
"U.S. Appl. No. 14/612,692, Response filed Feb. 23, 2016 to Final Office Action dated Nov. 23, 2015", 10 pgs.
"U.S. Appl. No. 14/612,692, Response filed May 3, 2017 to Non Final Office Action dated Jan. 3, 2017", 18 pgs.
"U.S. Appl. No. 14/612,692, Response filed Nov. 14, 2016 to Final Office Action dated Aug. 15, 2016", 15 pgs.
"U.S. Appl. No. 14/612,692, Response filed Jun. 28, 2016 to Non Final Office Action dated Mar. 28, 2016", 14 pgs.

(56) References Cited

OTHER PUBLICATIONS

"U.S. Appl. No. 14/612,692, Response filed Oct. 19, 2015 to Non Final Office Action dated Jul. 20, 2015", 11 pgs.
"U.S. Appl. No. 14/634,417, Advisory Action dated Mar. 14, 2017", 3 pgs.
"U.S. Appl. No. 14/634,417, Examiner Interview Summary dated Aug. 7, 2017", 3 pgs.
"U.S. Appl. No. 14/634,417, Final Office Action dated Jan. 31, 2017", 27 pgs.
"U.S. Appl. No. 14/634,417, Non Final Office Action dated Jun. 8, 2017", 17 pgs.
"U.S. Appl. No. 14/634,417, Non Final Office Action dated Aug. 30, 2016", 23 pgs.
"U.S. Appl. No. 14/634,417, Response filed Mar. 2, 2017 to Final Office Action dated Jan. 31, 2017", 23 pgs.
"U.S. Appl. No. 14/634,417, Response filed Sep. 21, 2017 to Non Final Office Action dated Jun. 8, 2017", 16 pgs.
"U.S. Appl. No. 14/634,417, Response filed Nov. 30, 2016 to Non Final Office Action dated Aug. 30, 2016", 18 pgs.
"U.S. Appl. No. 14/738,069, Non Final Office Action dated Mar. 21, 2016", 12 pgs.
"U.S. Appl. No. 14/738,069, Notice of Allowance dated Aug. 17, 2016", 6 pgs.
"U.S. Appl. No. 14/738,069, Response filed Jun. 10, 2016 to Non Final Office Action dated Mar. 21, 2016", 10 pgs.
"U.S. Appl. No. 14/808,283, Notice of Allowance dated Apr. 12, 2016", 9 pgs.
"U.S. Appl. No. 14/808,283, Notice of Allowance dated Jul. 14, 2016", 8 pgs.
"U.S. Appl. No. 14/808,283, Preliminary Amendment filed Jul. 24, 2015", 8 pgs.
"U.S. Appl. No. 14/967,472, Corrected Notice of Allowability dated Mar. 18, 2019", 3 pgs.
"U.S. Appl. No. 14/967,472, Corrected Notice of Allowability dated Apr. 24, 2019", 3 pgs.
"U.S. Appl. No. 14/967,472, Final Office Action dated Mar. 10, 2017", 15 pgs.
"U.S. Appl. No. 14/967,472, Final Office Action dated Jun. 25, 2018", 14 pgs.
"U.S. Appl. No. 14/967,472, Non Final Office Action dated Jan. 12, 2018", 17 pgs.
"U.S. Appl. No. 14/967,472, Non Final Office Action dated Sep. 8, 2016", 11 pgs.
"U.S. Appl. No. 14/967,472, Notice of Allowance dated Jan. 24, 2019", 6 pgs.
"U.S. Appl. No. 14/967,472, Preliminary Amendment filed Dec. 15, 2015", 6 pgs.
"U.S. Appl. No. 14/967,472, Response filed Mar. 16, 2018 Non Final Office Action dated Jan. 12, 2018", 13 pgs.
"U.S. Appl. No. 14/967,472, Response filed Jun. 7, 2017 to Final Office Action dated Mar. 10, 2017", 12 pgs.
"U.S. Appl. No. 14/967,472, Response filed Sep. 21, 2018 to Final Office Action dated Jun. 25, 2018", 11 pgs.
"U.S. Appl. No. 14/967,472, Response filed Dec. 5, 2016 to Non Final Office Action dated Sep. 8, 2016", 11 pgs.
"U.S. Appl. No. 14/974,321, Non Final Office Action dated Jun. 29, 2017", 36 pgs.
"U.S. Appl. No. 14/974,321, Response filed Sep. 27, 2017 to Non Final Office Action dated Jun. 29, 2017", 13 pgs.
"U.S. Appl. No. 15/137,608, Preliminary Amendment filed Apr. 26, 2016", 6 pgs.
"U.S. Appl. No. 15/152,975, Final Office Action dated Jun. 30, 2017", 17 pgs.
"U.S. Appl. No. 15/152,975, Non Final Office Action dated Jan. 12, 2017", 36 pgs.
"U.S. Appl. No. 15/152,975, Preliminary Amendment filed May 19, 2016", 8 pgs.
"U.S. Appl. No. 15/152,975, Response filed Jun. 12, 2017 to Non Final Office Action dated Jan. 12, 2017", 13 pgs.

"U.S. Appl. No. 15/208,460, Notice of Allowance dated Feb. 27, 2017", 8 pgs.
"U.S. Appl. No. 15/208,460, Notice of Allowance dated Dec. 30, 2016", 9 pgs.
"U.S. Appl. No. 15/208,460, Supplemental Preliminary Amendment filed Jul. 18, 2016", 8 pgs.
"U.S. Appl. No. 15/224,312, Preliminary Amendment filed Feb. 1, 2017", 11 pgs.
"U.S. Appl. No. 15/224,343, Non Final Office Action dated Oct. 4, 2017", 26 pgs.
"U.S. Appl. No. 15/224,343, Preliminary Amendment filed Jan. 31, 2017", 10 pgs.
"U.S. Appl. No. 15/224,355, Non Final Office Action dated Sep. 6, 2017", 30 pgs.
"U.S. Appl. No. 15/224,355, Preliminary Amendment filed Apr. 3, 2017", 12 pgs.
"U.S. Appl. No. 15/224,359, Non Final Office Action dated Jul. 20, 2017", 33 pgs.
"U.S. Appl. No. 15/224,365, Non Final Office Action dated Aug. 8, 2017", 41 pgs.
"U.S. Appl. No. 15/224,372, Non Final Office Action dated Aug. 7, 2017", 40 pgs.
"U.S. Appl. No. 15/224,372, Preliminary Amendment filed May 5, 2017", 10 pgs.
"U.S. Appl. No. 15/224,377, Non Final Office Action dated Aug. 4, 2017", 41 pgs.
"U.S. Appl. No. 15/224,383, Non Final Office Action dated Aug. 30, 2017", 26 pgs.
"U.S. Appl. No. 15/224,359, Preliminary Amendment filed Apr. 19, 2017", 8 pgs.
"U.S. Appl. No. 15/298,806, Non Final Office Action dated Jun. 12, 2017", 26 pgs.
"U.S. Appl. No. 15/298,806, Preliminary Amendment filed Oct. 21, 2016", 8 pgs.
"U.S. Appl. No. 15/298,806, Response filed Sep. 12, 2017 to Non Final Office Action dated Jun. 12, 2017", 12 pgs.
"U.S. Appl. No. 15/416,846, Notice of Allowance dated Jul. 19, 2017", 9 pgs.
"U.S. Appl. No. 15/416,846, Preliminary Amendment filed Feb. 18, 2017", 10 pgs.
"U.S. Appl. No. 15/470,004, Examiner Interview Summary dated Sep. 12, 2019", 3 pgs.
"U.S. Appl. No. 15/470,004, Final Office Action dated May 20, 2019", 9 pgs.
"U.S. Appl. No. 15/470,004, Non Final Office Action dated Jan. 31, 2019", 9 pgs.
"U.S. Appl. No. 15/470,004, Notice of Allowance dated Oct. 22, 2019", 10 pgs.
"U.S. Appl. No. 15/470,004, Response filed Apr. 29, 2019 to Non Final Office Action dated Jan. 31, 2019", 12 pgs.
"U.S. Appl. No. 15/470,004, Response filed Sep. 9, 2019 to Final Office Action dated May 20, 2019", 13 pgs.
"U.S. Appl. No. 15/470,025, Final Office Action dated May 20, 2019", 10 pgs.
"U.S. Appl. No. 15/470,025, Non Final Office Action dated Jan. 30, 2019", 10 pgs.
"U.S. Appl. No. 15/470,025, Response filed Apr. 24, 2019 to Non Final Office Action dated Jan. 30, 2019", 13 pgs.
"U.S. Appl. No. 15/470,025, Response filed Sep. 12, 2019 to Final Office Action dated May 20, 2019", 14 pgs.
"U.S. Appl. No. 15/702,511, Preliminary Amendment filed Sep. 15, 2017", 13 pgs.
"U.S. Appl. No. 16/376,598, Non Final Office Action dated Jul. 25, 2019", 7 pgs.
"U.S. Appl. No. 16/376,598, Notice of Allowance dated Oct. 18, 2019", 5 pgs.
"U.S. Appl. No. 16/376,598, Response filed Oct. 7, 2019 to Non-Final Office Action dated Jul. 25, 2019", 2 pgs.
"Canadian Application Serial No. 2,894,332 Response filed Jan. 24, 2017 to Office Action dated Aug. 16, 2016", 15 pgs.
"Canadian Application Serial No. 2,894,332, Office Action dated Aug. 16, 2016", 4 pgs.

(56) References Cited

OTHER PUBLICATIONS

"Canadian Application Serial No. 2,910,158, Office Action dated Dec. 15, 2016", 5 pgs.
"Canadian Application Serial No. 2,910,158, Response filed Apr. 11, 2017 to Office Action dated Dec. 15, 2016", 21 pgs.
"European Application Serial No. 15870874.3, Extended European Search Report dated Nov. 29, 2017", 7 pgs.
"How Snaps Are Stored And Deleted", Snapchat, [Online] Retrieved from the Internet: <URL: https://www.snap.com/en-US/news/post/how-snaps-are-stored-and-deleted/>, (May 9, 2013), 2 pgs.
"International Application Serial No. PCT/EP2008/063682, International Search Report dated Nov. 24, 2008", 3 pgs.
"International Application Serial No. PCT/US2015/035591, International Preliminary Report on Patentability dated Dec. 22, 2016", 7 pgs.
"International Application Serial No. PCT/US2015/035591, International Search Report dated Aug. 11, 2015", 5 pgs.
"International Application Serial No. PCT/US2015/035591, International Written Opinion dated Aug. 11, 2015", 5 pgs.
"International Application Serial No. PCT/US2015/053811, International Preliminary Report on Patentability dated Apr. 13, 2017", 9 pgs.
"International Application Serial No. PCT/US2015/053811, International Search Report dated Nov. 23, 2015", 5 pgs.
"International Application Serial No. PCT/US2015/053811, Written Opinion dated Nov. 23, 2015", 8 pgs.
"International Application Serial No. PCT/US2015/056884, International Preliminary Report on Patentability dated May 4, 2017", 8 pgs.
"International Application Serial No. PCT/US2015/056884, International Search Report dated Dec. 22, 2015", 5 pgs.
"International Application Serial No. PCT/US2015/056884, Written Opinion dated Dec. 22, 2015", 6 pgs.
"International Application Serial No. PCT/US2015/065785, International Preliminary Report on Patentability dated Jun. 29, 2017", 7 pgs.
"International Application Serial No. PCT/US2015/065785, International Search Report dated Jul. 21, 2016", 5 pgs.
"International Application Serial No. PCT/US2015/065785, Written Opinion dated Jul. 21, 2016", 5 pgs.
"International Application Serial No. PCT/US2015/065821, International Preliminary Report on Patentability dated Jun. 29, 2017", 5 pgs.
"International Application Serial No. PCT/US2015/065821, International Search Report dated Mar. 3, 2016", 2 pgs.
"International Application Serial No. PCT/US2015/065821, Written Opinion dated Mar. 3, 2016", 3 pgs.
"International Application Serial No. PCT/US2016/023085, International Preliminary Report on Patentability dated Sep. 28, 2017", 8 pgs.
"International Application Serial No. PCT/US2016/023085, International Search Report dated Jun. 17, 2016", 5 pgs.
"International Application Serial No. PCT/US2016/023085, Written Opinion dated Jun. 17, 2016", 6 pgs.
"International Application Serial No. PCT/US2016/066976, International Search Report dated May 17, 2017", 7 pgs.
"International Application Serial No. PCT/US2016/066976, Invitation to Pay Add'l Fees and Partial Search Rpt dated Mar. 6, 2017", 8 pgs.
"International Application Serial No. PCT/US2016/066976, Written Opinion dated May 17, 2017", 7 pgs.
"International Application Serial No. PCT/US2018/024093, International Preliminary Report on Patentability dated Oct. 10, 2019", 7 pgs.
"International Application Serial No. PCT/US2018/024093, International Search Report dated Jul. 19, 2018", 2 pgs.
"International Application Serial No. PCT/US2018/024093, Written Opinion dated Jul. 19, 2018", 5 pgs.

"IVisit Mobile: Getting Started", IVISIT, [Online] Retrieved from the Internet: <URL: http://web.archive.org/web/20140830174355/http://ivisit.com/support_mobile>, (Dec. 4, 2013), 16 pgs.
"Pluraleyes by Red Giant", ©2002-2015 Red Giant LLC, [Online], Retrieved from the Internet: <URL: http://www.redgiant.com/products/pluraleyes/, (Accessed Nov. 11, 2015), 5 pgs.
Castelluccia, Claude, et al., "EphPub: Toward robust Ephemeral Publishing", 19th IEEE International Conference on Network Protocols (ICNP), (Oct. 17, 2011), 18 pgs.
Clarke, Tangier, "Automatically syncing multiple clips and lots of audio like PluralEyes possible?", [Online], Retrieved from the Internet: <URL: https://forums.creativecow.net/thread/344/20553, (May 21, 2013), 8 pgs.
Isaac, Mike, "New Mobile App Vyclone Aims to Remix Social Video From Every Angle", All Things D, The Wallstreet Journal, [Online] Retrieved from the Internet: <URL: http://allthingsd.com/20120718/new-mobile-app-vyclone-aims-to-rerix-social-video-from-every-angle/>, (Jul. 18, 2012), 4 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Sawers, Paul, "Snapchat for iOS Lets You Send Photos to Friends and Set How long They're Visible for", [Online] Retrieved from the Internet; <URL: https://thenextweb.com/apps/2012/05/07/snapchat-for-ios-lets-you-send-photos-to-friends-and-set-how-long-theyre-visible-for/>, (May 7, 2012), 5 pgs.
Shein, Esther, "Ephemeral Data", Communications of the ACM, vol. 56, No. 9, (Sep. 2013), 3 pgs.
Trice, Andrew, "My Favorite New Feature: Multi-Clip Sync in Premiere Pro CC", [Online], Retrieved from the Internet: <URL: http://www.tricedesigns.com/2013/06/18/my-favorite-new-feature-multi-cam-synch-in-premiere-pro-cc/, (Jun. 18, 2013), 5 pgs.
"A Whole New Story", Snap, Inc., [Online] Retrieved from the Internet: <URL: https://www.snap.com/en-US/news/>, (2017), 13 pgs.
"Adding photos to your listing", eBay, [Online] Retrieved from the Internet: <URL: http://pages.ebay.com/help/sell/pictures.html>, (accessed May 24, 2017), 4 pgs.
"Android Getting Started Guide", Voxer Business, [Online] Retrieved from the Internet: <URL: https://voxer.com/assets/AndroidGuide.pdf>, (Feb. 1, 2014), 18 pgs.
"U.S. Appl. No. 14/494,226, Appeal Brief filed Mar. 1, 2019 in response to Final Office Action dated Jun. 1, 2018", 29 pgs.
"U.S. Appl. No. 14/494,226, Examiner interview Summary dated Oct. 27, 2016", 3 pgs.
"U.S. Appl. No. 14/494,226, Examiner Interview Summary dated Dec. 20, 2017", 2 pgs.
"U.S. Appl. No. 14/494,226, Final Office Action dated Mar. 7, 2017", 34 pgs.
"U.S. Appl. No. 14/494,226, Final Office Action dated Jun. 1, 2018", 33 pgs.
"U.S. Appl. No. 14/494,226, Non Final Office Action dated Sep. 7, 2017", 36 pgs.
"U.S. Appl. No. 14/494,226, Non Final Office Action dated Sep. 12, 2016", 32 pgs.
"U.S. Appl. No. 14/494,226, Response filed Jan. 8, 2018 to Non Final Office Action dated Sep. 7, 2017", 15 pgs.
"U.S. Appl. No. 14/494,226, Response filed Jul. 7, 2017 to Final Office Action dated Mar. 7, 2017", 13 pgs.
"U.S. Appl. No. 14/494,226, Response filed Dec. 12, 2016 to Non Final Office Action dated Sep. 12, 2016", 16 pgs.
"U.S. Appl. No. 14/510,016, Advisory Action dated Nov. 30, 2017", 7 pgs.
"U.S. Appl. No. 14/510,016, Final Office Action dated May 22, 2018", 36 pgs.
"U.S. Appl. No. 14/510,016, Final Office Action dated Sep. 7, 2018", 34 pgs.
"U.S. Appl. No. 14/510,016, Final Office Action dated Sep. 8, 2017", 21 pgs.

(56) References Cited

OTHER PUBLICATIONS

"U.S. Appl. No. 14/510,016, Non Final Office Action dated Feb. 7, 2018", 36 pgs.
"U.S. Appl. No. 14/510,016, Non Final Office Action dated Apr. 21, 2017", 55 pgs.
"U.S. Appl. No. 14/510,016, Response filed Jan. 8, 2017 to Final Office Action dated Sep. 8, 2017", 22 pgs.
"U.S. Appl. No. 14/510,016, Response filed May 7, 2018 to Non Final Office Action dated Feb. 7, 2018", 13 pgs.
"U.S. Appl. No. 14/510,016, Response filed Jul. 21, 2017 to Non Final Office Action dated Apr. 21, 2017", 21 pgs.
"U.S. Appl. No. 14/510,016, Response filed Aug. 23, 2018 to Final Office Action dated May 22, 2018", 16 pgs.
"U.S. Appl. No. 14/510,016, Response filed Nov. 8, 2017 to Final Office Action dated Sep. 8, 2017", 24 pgs.
"U.S. Appl. No. 14/529,064, Examiner Interview Summary dated May 23, 2016", 3 pgs.
"U.S. Appl. No. 14/529,064, Examiner Interview Summary dated Nov. 17, 2016", 3 pgs.
"U.S. Appl. No. 14/529,064, Final Office Action dated Jan. 25, 2018", 39 pgs.
"U.S. Appl. No. 14/529,064, Final Office Action dated Aug. 24, 2016", 23 pgs.
"U.S. Appl. No. 14/529,064, Non Final Office Action dated Apr. 6, 2017", 25 pgs.
"U.S. Appl. No. 14/529,064. Non Final Office Action dated Apr. 18, 2016", 21 pgs.
"U.S. Appl. No. 14/529,064, Non Final Office Action dated Jul. 13, 2018", 38 pgs.
"U.S. Appl. No. 14/529,064, Response filed May 25, 2018 to Final Office Action dated Jan. 25, 2018", 20 pgs.
"U.S. Appl. No. 14/529,064, Response filed Jul. 18, 2016 to Non Final Office Action dated Apr. 18, 2016", 20 pgs.
"U.S. Appl. No. 14/529,064, Response filed Sep. 6, 2017 to Non Final Office Action dated Apr. 6, 2017", 19 pgs.
"U.S. Appl. No. 14/529,064, Response filed Sep. 6, 2017 to Non Final Office Action dated Apr. 6, 2017", 24 pgs.
"U.S. Appl. No. 14/529,064, Response filed Dec. 21, 2016 to Final Office Action dated Aug. 24, 2016", 17 pgs.
"U.S. Appl. No. 14/539,391, Notice of Allowance dated Mar. 5, 2015", 17 pgs.
"U.S. Appl. No. 14/548,590, Advisory Action dated Apr. 19, 2018", 2 pgs.
"U.S. Appl. No. 14/548,590, Advisory Action dated Nov. 18, 2016", 3 pgs.
"U.S. Appl. No. 14/548,590, Appeal Brief Filed Apr. 20, 2018", 28 pgs.
"U.S. Appl. No. 14/548,590, Final Office Action dated Jul. 5, 2016", 16 pgs.
"U.S. Appl. No. 14/548,590, Final Office Action dated Jul. 18, 2017", 20 pgs.
"U.S. Appl. No. 14/548,590, Final Office Action dated Sep. 16, 2015", 15 pgs.
"U.S. Appl. No. 14/548,590, Non Final Office Action dated Jan. 9, 2017", 14 pgs.
"U.S. Appl. No. 14/548,590, Non Final Office Action dated Feb. 11, 2016", 16 pgs.
"U.S. Appl. No. 14/548,590, Non Final Office Action dated Apr. 20, 2015", 14 pgs.
"U.S. Appl. No. 14/548,590, Response filed May 9, 2017 to Non Final Office Action dated Jan. 9, 2017", 17 pgs.
"U.S. Appl. No. 14/548,590, Response filed May 10, 2016 to Non Final Office Action dated Feb. 11, 2016", 14 pgs.
"U.S. Appl. No. 14/548,590, Response filed Nov. 7, 2016 to Final Office Action dated Jul. 5, 2016", 14 pgs.
"U.S. Appl. No. 14/548,590, Response filed Dec. 16, 2015 to Final Office Action dated Sep. 16, 2015", 13 pgs.
"U.S. Appl. No. 14/548,590, Response filed Jun. 16, 2015 to Non Final Office Action dated Apr. 20, 2015", 19 pgs.
"U.S. Appl. No. 14/594,410, Non Final Office Action dated Jan. 4, 2016", 10 pgs.
"U.S. Appl. No. 14/594,410, Notice of Allowance dated Aug. 2, 2016", 5 pgs.
"U.S. Appl. No. 14/594,410, Notice of Allowance dated Dec. 15, 2016", 6 pgs.
"U.S. Appl. No. 14/594,410, Response filed Jul. 1, 2016 to Non Final Office Action dated Jan. 4, 2016", 10 pgs.
"U.S. Appl. No. 14/612,692, Examiner Interview Summary dated May 14, 2018", 3 pgs.
"U.S. Appl. No. 14/612,692, Examiner Interview Summary dated Nov. 13, 2017", 13 pgs.
"U.S. Appl. No. 14/612,692, Non Final Office Action dated Jan. 9, 2018", 19 pgs.
"U.S. Appl. No. 14/612,692, Notice of Allowance dated Jul. 5, 2018", 11 pgs.
"U.S. Appl. No. 14/612,692, Response Filed May 9, 2018 to Non Final Office Action dated Jan. 9, 2018", 15 pgs.
"U.S. Appl. No. 14/612,692, Response Filed Nov. 22, 2017 to Final Office Action dated Aug. 25, 2017", 11 pgs.
"U.S. Appl. No. 14/634,417, Corrected Notice of Allowability dated Mar. 11, 2019", 3 pgs.
"U.S. Appl. No. 14/634,417, Corrected Notice of Allowability dated Mar. 20, 2019", 3 pgs.
"U.S. Appl. No. 14/634,417, Notice of Allowance dated May 22, 2018", 9 pgs.
"U.S. Appl. No. 14/634,417, Notice of Allowance dated Oct. 25, 2017", 9 pgs.
"U.S. Appl. No. 14/682,259, Notice of Allowance dated Jul. 27, 2015", 17 pgs.
"U.S. Appl. No. 14/704,212, Final Office Action dated Jun. 17, 2016", 12 pgs.
"U.S. Appl. No. 14/704,212, Non Final Office Action dated Mar. 12, 2018", 7 pgs.
"U.S. Appl. No. 14/704,212, Non Final Office Action dated Jun. 16, 2017", 13 pgs.
"U.S. Appl. No. 14/704,212, Non Final Office Action dated Nov. 25, 2016", 13 pgs.
"U.S. Appl. No. 14/704,212, Non Final Office Action dated Dec. 4, 2015", 17 pgs.
"U.S. Appl. No. 14/704,212, Notice of Allowance dated Jul. 2, 2018", 7 pgs.
"U.S. Appl. No. 14/704,212, Response filed Feb. 27, 2017 to Non Final Office Action dated Nov. 25, 2016", 14 pgs.
"U.S. Appl. No. 14/704,212, Response filed Mar. 4, 2016 to Non Final Office Action dated Dec. 4, 2015", 11 pgs.
"U.S. Appl. No. 14/704,212, Response Filed Jun. 12, 2018 to Non Final Office Action dated Mar. 12, 2018", 9 pgs.
"U.S. Appl. No. 14/704,212, Response filed Oct. 17, 2016 to Final Office Action dated Jun. 17, 2016", 12 pgs.
"U.S. Appl. No. 14/723,400, Final Office Action dated Jan. 4, 2016", 14 pgs.
"U.S. Appl. No. 14/723,400, Non Final Office Action dated Jul. 20, 2015", 14 pgs.
"U.S. Appl. No. 14/723,400, Notice of Allowance dated Mar. 28, 2016", 12 pgs.
"U.S. Appl. No. 14/723,400, Notice of Non Compliant Amendment dated Sep. 21, 2015", 2 pgs.
"U.S. Appl. No. 14/723,400, Notice of Non Compliant Amendment dated Nov. 10, 2015", 2 pgs.
"U.S. Appl. No. 14/723,400, Response filed Jan. 29, 2016 to Final Office Action dated Jan. 4, 2016", 8 pgs.
"U.S. Appl. No. 14/723,400, Response filed Aug. 13, 2015 to Non Final Office Action dated Jul. 20, 2015", 7 pgs.
"U.S. Appl. No. 14/723,400, Response filed Sep. 23, 2015 to Notice of Non Compliant Amendment dated Sep. 21, 2015", 5 pgs.
"U.S. Appl. No. 14/723,400, Response filed Nov. 19, 2015 to Notice of Non Compliant Amendment dated Nov. 10, 2015", 5 pgs.
"U.S. Appl. No. 14/841,987, Notice of Allowance dated Mar. 29, 2017", 17 pgs.
"U.S. Appl. No. 14/841,987, Notice of Allowance dated Aug. 7, 2017", 8 pgs.

(56) References Cited

OTHER PUBLICATIONS

"U.S. Appl. No. 14/974,321, Corrected Notice of Allowability dated Feb. 13, 2019", 6 pgs.
"U.S. Appl. No. 14/974,321, Corrected Notice of Allowability dated Apr. 19, 2019", 6 pgs.
"U.S. Appl. No. 14/974,321, Corrected Notice of Allowability dated Jun. 12, 2019", 6 pgs.
"U.S. Appl. No. 14/974,321, Examiner Interview Summary dated Dec. 5, 2017", 3 pgs.
"U.S. Appl. No. 14/974,321, Final Office Action dated Oct. 26, 2017", 16 pgs.
"U.S. Appl. No. 14/974,321, Non Final Office Action dated May 31, 2018", 14 pgs.
"U.S. Appl. No. 14/974,321, Notice of Allowance dated Jan. 3, 2019", 9 pgs.
"U.S. Appl. No. 14/974,321, Response filed Aug. 30, 2018 to Non Final Office Action dated May 31, 2018", 14 pgs.
"U.S. Appl. No. 15/074,029, Advisory Action dated Oct. 11, 2018", 3 pgs.
"U.S. Appl. No. 15/074,029, Corrected Notice of Allowability dated Aug. 20, 2019", 10 pgs.
"U.S. Appl. No. 15/074,029, Final Office Action dated Jun. 28, 2018", 22 pgs.
"U.S. Appl. No. 15/074,029, Non Final Office Action dated Jan. 23, 2019", 19 pgs.
"U.S. Appl. No. 15/074,029, Non Final Office Action dated Nov. 30, 2017", 16 pgs.
"U.S. Appl. No. 15/074,029, Notice of Allowance dated Jun. 19, 2019", 14 pgs.
"U.S. Appl. No. 15/074,029, Response filed Feb. 28, 2018 to Non Final Office Action dated Nov. 30, 2017", 12 pgs.
"U.S. Appl. No. 15/074,029, Response filed Aug. 28, 2018 to Final Office Action dated Jun. 28, 2018", 21 pgs.
"U.S. Appl. No. 15/074,029, Response filed Apr. 23, 2019 to Non Final Office Action dated Jan. 23, 2019", 15 pgs.
"U.S. Appl. No. 15/137,608, Amendment and Response filed Jan. 25, 2019 to Non Final Office Action dated Nov. 2, 2018", 13 pgs.
"U.S. Appl. No. 15/137,808, Corrected Notice of Allowability dated Oct. 2, 2019", 3 pgs.
"U.S. Appl. No. 15/137,608, Final Office Action dated May 13, 2019", 10 pgs.
"U.S. Appl. No. 15/137,608, Non Final Office Action dated Nov. 2, 2018", 10 pgs.
"U.S. Appl. No. 15/137,608, Notice of Allowance dated Aug. 8, 2019", 7 pgs.
"U.S. Appl. No. 15/137,608, Response filed Jul. 12, 2019 to Final Office Action dated May 13, 2019", 10 pgs.
"U.S. Appl. No. 15/152,975, Examiner Interview Summary dated Feb. 4, 2019", 7 pgs.
"U.S. Appl. No. 15/152,975, Examiner Interview Summary dated May 14, 2018", 3 pgs.
"U.S. Appl. No. 15/152,975, Examiner Interview Summary dated Nov. 13, 2017", 13 pgs.
"U.S. Appl. No. 15/152,975, Final Office Action dated Jul. 2, 2018", 19 pgs.
"U.S. Appl. No. 15/152,975, Non Final Office Action dated Jan. 10, 2018", 18 pgs.
"U.S. Appl. No. 15/152,975, Non Final Office Action dated Sep. 28, 2018", 28 pgs.
"U.S. Appl. No. 15/152,975, Notice of Allowance dated May 17, 2019", 13 pgs.
"U.S. Appl. No. 15/152,975, Response filed Jan. 28, 2019 to Non Final Office Action dated Sep. 28, 2018", 17 pgs.
"U.S. Appl. No. 15/152,975, Response Filed May 10, 2018 to Non Final Office Action dated Jan. 10, 2018", 13 pgs.
"U.S. Appl. No. 15/152,975, Response filed Sep. 19, 2018 to Final Office Action dated Jul. 2, 2018", 14 pgs.
"U.S. Appl. No. 15/152,975, Response filed Nov. 30, 2017 to Final Office Action dated Jun. 30, 2017", 9 pgs.
"U.S. Appl. No. 15/212,095, Final Office Action dated Mar. 14, 2017", 9 pgs.
"U.S. Appl. No. 15/212,095, Non Final Office Action dated Feb. 2, 2017", 8 pgs.
"U.S. Appl. No. 15/212,095, Notice of Allowance dated Jun. 1, 2017", 8 pgs.
"U.S. Appl. No. 15/212,095, Notice of Allowance dated Sep. 8, 2017", 2 pgs.
"U.S. Appl. No. 15/212,095, Response filed Feb. 28, 2017 to Non Final Office Action dated Feb. 2, 2017", 2 pgs.
"U.S. Appl. No. 15/212,095, Response filed May 15, 2017 to Final Office Action dated Mar. 14, 2017", 2 pgs.
"U.S. Appl. No. 15/224,312, Advisory Action dated Aug. 27, 2019", 3 pgs.
"U.S. Appl. No. 15/224,312, Final Office Action dated Apr. 11, 2019", 15 pgs.
"U.S. Appl. No. 15/224,312, Final Office Action dated Apr. 20, 2018", 22 pgs.
"U.S. Appl. No. 15/224,312, Non Final Office Action dated Oct. 11, 2017", 29 pgs.
"U.S. Appl. No. 15/224,312, Non Final Office Action dated Oct. 22, 2018", 15 pgs.
"U.S. Appl. No. 15/224,312, Response filed Feb. 22, 2019 to Non Final Office Action dated Oct. 22, 2018", 14 pgs.
"U.S. Appl. No. 15/224,312, Response filed Aug. 20, 2018 to Final Office Action dated Apr. 20, 2018", 18 pgs.
"U.S. Appl. No. 15/224,312, Response filed Oct. 11, 2019 to Advisory Action dated Aug. 27, 2019", 17 pgs.
"U.S. Appl. No. 15/224,312, Response filed Aug. 12, 2019 to Final Office Action dated Apr. 11, 2019", 14 pgs.
"U.S. Appl. No. 15/224,343, Amendment and Response filed Feb. 4, 2019 to Non Final Office Action dated Sep. 4, 2018", 18 pgs.
"U.S. Appl. No. 15/224,343, Final Office Action dated Mar. 22, 2019", 17 pgs.
"U.S. Appl. No. 15/224,343, Final Office Action dated Apr. 19, 2018", 20 pgs.
"U.S. Appl. No. 15/224,343, Non Final Office Action dated Sep. 4, 2018", 20 pgs.
"U.S. Appl. No. 15/224,343, Non Final Office Action dated Nov. 12, 2019", 16 pgs.
"U.S. Appl. No. 15/224,343, Response filed Jul. 19, 2018 to Final Office Action dated Apr. 19, 2018", 16 pgs.
"U.S. Appl. No. 15/224,343, Response filed Mar. 5, 2018 to Non Final Office Action dated Oct. 4, 2017", 23 pgs.
"U.S. Appl. No. 15/224,343, Response filed Aug. 22, 2019 to Final Office Action dated Mar. 22, 2019", 16 pgs.
"U.S. Appl. No. 15/224,355, Examiner Interview Summary dated Oct. 25, 2017", 3 pgs.
"U.S. Appl. No. 15/224,355, Final Office Action dated Apr. 24, 2018", 20 pgs.
"U.S. Appl. No. 15/224,355, Final Office Action dated Aug. 9, 2019", 15 pgs.
"U.S. Appl. No. 15/224,355, Non Final Office Action dated Dec. 20, 2018", 14 pgs.
"U.S. Appl. No. 15/224,355, Response filed Mar. 6, 2018 to Non Final Office Action dated Sep. 6, 2017", 25 pgs.
"U.S. Appl. No. 15/224,355, Response filed May 20, 2019 to Non Final Office Action dated Dec. 20, 2018", 13 pgs.
"U.S. Appl. No. 15/224,355, Response filed Sep. 24, 2018 to Final Office Action dated Apr. 24, 2018", 19 pgs.
"U.S. Appl. No. 15/224,355, Response filed Nov. 11, 2019 to Final Office Action dated Aug. 9, 2019", 14 pgs.
"U.S. Appl. No. 15/224,359, Final Office Action dated Apr. 2, 2018", 18 pgs.
"U.S. Appl. No. 15/224,359, Final Office Action dated Apr. 11, 2019", 15 pgs.
"U.S. Appl. No. 15/224,359, Non Final Office Action dated Sep. 28, 2018", 15 pgs.
"U.S. Appl. No. 15/224,359, Response filed Jan. 22, 2018 to Non Final Office Action dated Jul. 20, 2017", 13 pgs.
"U.S. Appl. No. 15/224,359, Response filed Feb. 28, 2019 to Non Final Office Action dated Aug. 28, 2018", 16 pgs.

(56) References Cited

OTHER PUBLICATIONS

"U.S. Appl. No. 15/224,359, Response filed Sep. 4, 2018 to Final Office Action dated Apr. 2, 2018", 14 pgs.
"U.S. Appl. No. 15/224,359, Response filed Sep. 11, 2019 to Final Office Action dated Apr. 11, 2019", 18 pgs.
"U.S. Appl. No. 15/224,365, Final Office Action dated Apr. 2, 2018", 19 pgs.
"U.S. Appl. No. 15/224,365, Final Office Action dated Aug. 23, 2019", 12 pgs.
"U.S. Appl. No. 15/224,365, Non Final Office Action dated Jan. 3, 2019", 11 pgs.
"U.S. Appl. No. 15/224,365, Response filed Feb. 8, 2018 to Non Final Office Action dated Aug. 8, 2017", 14 pgs.
"U.S. Appl. No. 15/224,365, Response filed Oct. 2, 2018 to Final Office Action dated Apr. 2, 2018", 15 pgs.
"U.S. Appl. No. 15/224,365, Response filed Jun. 3, 2019 to Non-Final Office Action dated Jan. 3, 2019", 12 pgs.
"U.S. Appl. No. 15/224,372, Final Office Action dated Mar. 6, 2019", 17 pgs.
"U.S. Appl. No. 15/224,372, Final Office Action dated Apr. 3, 2018", 18 pgs.
"U.S. Appl. No. 15/224,372, Non Final Office Action dated Sep. 14, 2018", 20 pgs.
"U.S. Appl. No. 15/224,372, Non Final Office Action dated Oct. 16, 2019", 14 pgs.
"U.S. Appl. No. 15/224,372, Response filed Jan. 8, 2017 to Non Final Office Action dated Aug. 7, 2017", 22 pgs.
"U.S. Appl. No. 15/224,372, Response filed Jan. 16, 2019 to Non Final Office Action dated Sep. 14, 2018", 18 pgs.
"U.S. Appl. No. 15/224,372, Response filed Jul. 8, 2019 to Final Office Action dated Mar. 6, 2019", 14 pgs.
"U.S. Appl. No. 15/224,372, Response filed Aug. 3, 2018 to Final Office Action dated Apr. 3, 2018", 14 pgs.
"U.S. Appl. No. 15/224,377, Examiner Interview Summary dated Mar. 4, 2019", 5 pgs.
"U.S. Appl. No. 15/224,377, Final Office Action dated Jan. 2, 2018", 29 pgs.
"U.S. Appl. No. 15/224,377, Final Office Action dated Feb. 6, 2019", 14 pgs.
"U.S. Appl. No. 15/224,377, Non Final Office Action dated Jun. 15, 2018", 19 pgs.
"U.S. Appl. No. 15/224,377, Non Final Office Action dated Oct. 15, 2019", 12 pgs.
"U.S. Appl. No. 15/224,377, Response filed Jun. 6, 2019 to Final Office Action dated Feb. 6, 2019", 10 pgs.
"U.S. Appl. No. 15/224,377, Response filed Dec. 17, 2018 to Non Final Office Action dated Jun. 15, 2018", 13 pgs.
"U.S. Appl. No. 15/224,377, Response filed Dec. 6, 2017 to Non Final Office Action dated Aug. 4, 2017", 22 pgs.
"U.S. Appl. No. 15/224,383, Examiner Interview Summary dated Aug. 15, 2018", 4 pgs.
"U.S. Appl. No. 15/224,383, Examiner Interview Summary dated Oct. 25, 2017", 3 pgs.
"U.S. Appl. No. 15/224,383, Final Office Action dated Jan. 14, 2019", 15 pgs.
"U.S. Appl. No. 15/224,383, Final Office Action dated Feb. 14, 2018", 25 pgs.
"U.S. Appl. No. 15/224,383, Non Final Office Action dated Jul. 5, 2018", 19 pgs.
"U.S. Appl. No. 15/224,383, Non-Final Office Action dated Sep. 23, 2019", 13 pgs.
"U.S. Appl. No. 15/224,383, Preliminary Amendment filed May 9, 2017", 13 pgs.
"U.S. Appl. No. 15/224,383, Response filed Jan. 3, 2018 to Non Final Office Action dated Aug. 30, 2017", 25 pgs.
"U.S. Appl. No. 15/224,383, Response filed May 14, 2019 to Final Office Action dated Jan. 14, 2019", 15 pgs.
"U.S. Appl. No. 15/224,383, Response filed Jun. 14, 2018 to Final Office Action dated Feb. 14, 2018", 14 pgs.
"U.S. Appl. No. 15/224,383, Response Filed Dec. 5, 2018 to Non Final Office Action dated Jul. 5, 2018", 16 pgs.
"U.S. Appl. No. 15/298,806, Advisory Action dated Jan. 29, 2018", 4 pgs.
"U.S. Appl. No. 15/298,806, Examiner Interview Summary dated Jan. 12, 2018", 3 pgs.
"U.S. Appl. No. 15/298,806, Examiner Interview Summary dated Aug. 13, 2018", 3 pgs.
"U.S. Appl. No. 15/298,806, Final Office Action dated Oct. 24, 2017", 15 pgs.
"U.S. Appl. No. 15/298,806, Non Final Office Action dated May 17, 2018", 16 pgs.
"U.S. Appl. No. 15/298,806, Notice of Allowance dated Sep. 19, 2018", 5 pgs.
"U.S. Appl. No. 15/298,806, Response filed Jan. 9, 2018 to Final Office Action dated Oct. 24, 2017", 17 pgs.
"U.S. Appl. No. 15/298,806, Response filed Aug. 10, 2018 to Non Final Office Action dated May 17, 2018", 15 pgs.
"U.S. Appl. No. 15/424,184, Non Final Office Action dated Nov. 30, 2018", 22 pgs.
"U.S. Appl. No. 15/470,025, Notice of Allowance dated Oct. 22, 2019", 10 pgs.
"U.S. Appl. No. 15/486,111, Corrected Notice of Allowance dated Sep. 7, 2017", 3 pgs.
"U.S. Appl. No. 15/486,111, Non Final Office Action dated May 9, 2017", 17 pgs.
"U.S. Appl. No. 15/486,111, Notice of Allowance dated Aug. 30, 2017", 5 pgs.
"U.S. Appl. No. 15/486,111, Response filed Aug. 9, 2017 to Non Final Office Action dated May 9, 2017", 11 pgs.
"U.S. Appl. No. 15/673,137, Final Office Action dated May 16, 2019", 8 pgs.
"U.S. Appl. No. 15/673,137, Non Final Office Action dated Aug. 30, 2019", 10 pgs.
"U.S. Appl. No. 15/673,137, Non Final Office Action dated Oct. 5, 2018", 7 pgs.
"U.S. Appl. No. 15/673,137, Response filed Jan. 31, 2019 to Non Final Office Action dated Oct. 5, 2018", 10 pgs.
"U.S. Appl. No. 15/673,137, Response filed Oct. 18, 2019 to Non-Final Office Action dated Aug. 30, 2019", 12 pgs.
"U.S. Appl. No. 15/673,137, Response filed Aug. 1, 2019 to Final Office Action dated May 16, 2019", 10 pgs.
"U.S. Appl. No. 15/702,511, 312 Amendment filed Jun. 26, 2019", 11 pgs.
"U.S. Appl. No. 15/702,511, Notice of Allowability dated Sep. 30, 2019", 2 pgs.
"U.S. Appl. No. 15/702,511, Notice of Allowance dated Mar. 26, 2019", 7 pgs.
"U.S. Appl. No. 15/702,511, Notice of Allowance dated Oct. 26, 2018", 7 pgs.
"U.S. Appl. No. 15/702,511, PTO Response to Rule 312 Communication dated Aug. 13, 2019", 2 pgs.
"U.S. Appl. No. 15/729,582, Corrected Notice of Allowability dated Oct. 2, 2019", 3 pgs.
"U.S. Appl. No. 15/729,582, Corrected Notice of Allowability dated Oct. 30, 2019", 3 pgs.
"U.S. Appl. No. 15/729,582, Final Office Action dated Dec. 13, 2018", 14 pgs.
"U.S. Appl. No. 15/729,582, Non Final Office Action dated May 25, 2018", 14 pgs.
"U.S. Appl. No. 15/729,582, Notice of Allowance dated Jul. 22, 2019", 9 pgs.
"U.S. Appl. No. 15/729,582, Response filed May 13, 2019 to Final Office Action dated Dec. 13, 2018", 9 pgs.
"U.S. Appl. No. 15/787,467, Corrected Notice of Allowability dated Sep. 24, 2018", 2 pgs.
"U.S. Appl. No. 15/787,467, Non Final Office Action dated Apr. 18, 2018", 17 pgs.
"U.S. Appl. No. 15/787,467, Notice of Allowance dated Aug. 31, 2018", 8 pgs.
"U.S. Appl. No. 15/787,467, Preliminary Amendment filed Oct. 26, 2017", 11 pgs.

(56) References Cited

OTHER PUBLICATIONS

"U.S. Appl. No. 15/787,467, Response filed Jul. 18, 2018 to Non Final Office Action dated Apr. 18, 2018", 12 pgs.
"U.S. Appl. No. 15/835,100, Non Final Office Action dated Jan. 23, 2018", 18 pgs.
"U.S. Appl. No. 15/835,100, Notice of Allowance dated May 22, 2018", 5 pgs.
"U.S. Appl. No. 15/835,100, Response Filed Apr. 23, 2018 to Non Final Office Action dated Jan. 23, 2018", 11 pgs.
"U.S. Appl. No. 15/946,990, Final Office Action dated May 9, 2019", 11 pgs.
"U.S. Appl. No. 15/946,990, Non Final Office Action dated Dec. 3, 2018", 10 pgs.
"U.S. Appl. No. 15/946,990, Notice of Allowance dated Sep. 24, 2019", 5 pgs.
"U.S. Appl. No. 15/946,990, Response filed Feb. 20, 2019 to Non Final Office Action dated Dec. 3, 2018", 11 pgs.
"U.S. Appl. No. 15/946,990, Response filed Jul. 9, 2019 to Final Office Action dated May 9, 2019", 12 pgs.
"U.S. Appl. No. 16/000,657, Preliminary Amendment filed Jun. 6, 2018", 8 pgs.
"U.S. Appl. No. 16/105,687, Non Final Office Action dated Sep. 14, 2018", 11 pgs.
"U.S. Appl. No. 16/204,886, Corrected Notice of Allowability dated Jul. 15, 2019", 2 pgs.
"U.S. Appl. No. 16/204,886, Corrected Notice of Allowability dated Aug. 6, 2019", 2 pgs.
"U.S. Appl. No. 16/204,886, Corrected Notice of Allowability dated Sep. 10, 2019", 2 pgs.
"U.S. Appl. No. 16/204,886, Non Final Office Action dated Jan. 4, 2019", 8 pgs.
"U.S. Appl. No. 16/204,886, Notice of Allowance dated May 15, 2019", 9 pgs.
"U.S. Appl. No. 16/204,886, Response filed Apr. 2, 2019 to Non Final Office Action dated Jan. 4, 2019", 8 pgs.
"U.S. Appl. No. 16/212,313, Preliminary Amendment filed Dec. 12, 2018", 6 pgs.
"U.S. Appl. No. 16/219,577, Non Final Office Action dated Oct. 29, 2019", 7 pgs.
"U.S. Appl. No. 16/219,577, Response filed Oct. 3, 2019 to Restriction Requirement dated Aug. 7, 2019", 6 pgs.
"U.S. Appl. No. 16/219,577, Restriction Requirement dated Aug. 7, 2019", 6 pgs.
"U.S. Appl. No. 16/376,598, Notice of Allowability dated Jan. 23, 2020", 2 pgs.
"U.S. Appl. No. 16/511,834, Non-Final Office Action dated Aug. 20, 2019", 11 pgs.
"U.S. Appl. No. 16/511,834, Notice of Allowance dated Oct. 23, 2019", 8 pgs.
"U.S. Appl. No. 16/511,834, Response filed Oct. 7, 2019 to Non-Final Office Action dated Aug. 20, 2019", 3 pgs.
"U.S. Appl. No. 16/662,956, Preliminary Amendment filed Oct. 24, 2019", 8 pgs.
"BlogStomp", StompSoftware, [Online] Retrieved from the internet: URL: http://stompsoftware.com/blogstomp>, accessed May 24, 2017), 12 pgs.
"Canadian Application Serial No. 2,894,332, Request for Reinstatement filed Jun. 11, 2018", w/Amended Claims, 17 pgs.
"Canadian Application Serial No. 2,910,158, Office Action dated Jun. 6, 2018", 5 pgs.
"Canadian Application Serial No. 2,910,158, Response filed Dec. 6, 2018 to Office Action dated Jun. 6, 2018", w/ English Claims, 18 pgs.
"Chinese Application Serial No. 201580031616.8, Office Action dated Jul. 2, 2018", w/English translation, 8 pgs.
"Chinese Application Serial No. 201580031616.8, Office Action dated Oct. 9, 2017", w/English Translation, 18 pgs.
"Chinese Application Serial No. 201580031616.8, Response filed Feb. 26, 2018 to Office Action dated Oct. 9, 2017", w/ English Translation, 8 pgs.

"Chinese Application Serial No. 201580076228.1, Office Action dated Feb. 12, 2019", w/English Translation, 18 pgs.
"Chinese Application Serial No. 201580076228.1, Office Action dated Jul. 19, 2018", w/English translation, 19 pgs.
"Chinese Application Serial No. 201580076228.1, Response filed Nov. 26, 2018 to Office Action dated Jul. 19, 2018", w/ English Claims, 16 pgs.
"Chinese Application Serial No. 201680035076.5, Office Action dated Sep. 4, 2019", w/English Translation, 16 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup~ magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"Demystifying Location Data Accuracy", Mobile Marketing Association, (Nov. 2015), 18 pgs.
"European Application Serial No. 14804343.3, Extended European Search Report dated Sep. 29, 2016", 12 pgs.
"European Application Serial No. 15733026.7, Communication Pursuant to Article 94(3) EPC dated Jul. 28, 2017", 6 pgs.
"European Application Serial No. 15733026.7, Response filed Jan. 30, 2018 to Communication Pursuant to Article 94(3) EPC dated Jul. 28, 2017", w/ Amended Claims, 37 pgs.
"European Application Serial No. 15733026.7, Summons to Attend Oral Proceedings dated Jan. 10, 2019", 7 pgs.
"European Application Serial No. 15782165.3, Communication Pursuant to Article 94(3) EPC dated Sep. 14, 2018", 7 pgs.
"European Application Serial No. 15782165.3, Response filed Jan. 24, 2019 to Communication Pursuant to Article 94(3) EPC dated Sep. 14, 2018", w/ English Claims, 54 pgs.
"European Application Serial No. 15782165.3, Response filed Oct. 17, 2017 to Communication pursuant to Rules 161(1)and 162 EPC dated May 10, 2017", 15 pgs.
"European Application Serial No. 15787854.7, Response filed Dec. 11, 2017 to Communication Pursuant to Rules 161(1) and 162 EPC dated Jun. 1, 2017", 16 pgs.
"European Application Serial No. 15870861.0, Communication Pursuant to Article 94(3) EPC dated Jul. 12, 2018", 5 pgs.
"European Application Serial No. 15870861.0, Extended European Search Report dated Jul. 3, 2018", 4 pgs.
"European Application Serial No. 15870861.0, Response filed Aug. 9, 2017 to Communication Pursuant to Rules 161(2) and 162 EPC dated Aug. 4, 2017", 10 pgs.
"European Application Serial No. 15870861.0, Response filed Nov. 14, 2018 to Communication Pursuant to Article 94(3) EPC dated Jul. 12, 2018", w/ English Claims, 27 pgs.
"European Application Serial No. 15870861.0, Summons to Attend Oral Proceedings mailed Dec. 21, 2018", 5 pgs.
"European Application Serial No. 16716090.2, Response filed May 21, 2018 to Communication pursuant to Rules 161(1) and 162 EPC dated Nov. 10, 2017", w/ English Claims, 89 pgs.
"European Application Serial No. 16829020.3, Response filed Jan. 29, 2019 to Communication Pursuant to Rules 161(1) and 162 EPC dated Jul. 25, 2018", w/ English Claims, 17 pgs.
"IAB Platform Status Report: A Mobile Advertising Review", Interactive Advertising Bureau, (Jul. 2008), 24 pgs.
"InstaPlace Photo App Tell The Whole Story", [Online] Retrieved from the Internet: <URL: https://youtu.be/uF_gFkgihBM>, (Nov. 8, 2013), 113 pgs., 1:02 min.
"International Application Serial No. PCT/US2014/040346, International Search Report dated Mar. 23, 2015", 2 pgs.
"International Application Serial No. PCT/US2014/040346, Written Opinion dated Mar. 23, 2015", 6 pgs.
"International Application Serial No. PCT/US2015/037251, International Search Report dated Sep. 29, 2015", 2 pgs.
"International Application Serial No. PCT/US2015/037251, Written Opinion dated Sep. 29, 2015", 4 pgs.
"International Application Serial No. PCT/US2015/050424, International Search Report dated Dec. 4, 2015", 2 pgs.
"International Application Serial No. PCT/US2015/050424, Written Opinion dated Dec. 4, 2015", 10 pgs.

(56) References Cited

OTHER PUBLICATIONS

"International Application Serial No. PCT/US2016/066976, International Preliminary Report on Patentability dated Jun. 28, 2018", 9 pgs.

"International Application Serial No. PCT/US2018/016723, International Search Report dated Apr. 5, 2018", 2 pgs.

"International Application Serial No. PCT/US2018/016723, Written Opinion dated Apr. 5, 2018", 17 pgs.

"Introducing Snapchat Stories", [Online] Retrieved from the internet: <URL: https://web.archive.org/web/20131026084921/https://www.youtube.com/watch?v=88Cu3yN-LIM>, (Oct. 3, 2013), 92 pgs.; 00:47 min.

"Korean Application Serial No. 10-2017-7001104, Response filed Jul. 25, 2017 to Office Action dated Jun. 26, 2017", w/ Translation of Claims, 20 pgs.

"Korean Application Serial No. 10-2017-7014135, Final Office Action dated Feb. 28, 2019", w/ English Translation, 7 pgs.

"Korean Application Serial No. 10-2017-7014135, Notice of Preliminary Rejection dated Jul. 20, 2018", w/ English Translation, 13 pgs.

"Korean Application Serial No. 10-2017-7014135, Response filed Sep. 17, 2018 to Notice of Preliminary Rejection dated Jul. 20, 2018", w/ English Claims, 16 pgs.

"Korean Application Serial No. 10-2017-7020217, Final Office Action dated Jan. 31, 2018", w/ English Translation, 10 pgs.

"Korean Application Serial No. 10-2017-7020217, Office Action dated Sep. 15, 2017", w/English Translation, 11 pgs.

"Korean Application Serial No. 10-2017-7020217, Response filed Feb. 23, 2018 to Final Office Action dated Jan. 31, 2018", w/ English Translation, 13 pgs.

"Korean Application Serial No. 10-2017-7020217, Response filed Nov. 2, 2017 to Office Action dated Sep. 15, 2017", w/ English Translation, 17 pgs.

"Korean Application Serial No. 10-2017-7029861, Notice of Preliminary Rejection dated Jan. 17, 2019", w/ English Translation, 9 pgs.

"Korean Application Serial No. 10-2017-7035789, Notice of Preliminary Rejection dated Nov. 12, 2018", w/ English Translation, 12 pgs.

"Korean Application Serial No. 10-2017-7035789, Response filed Jan. 10, 2019 to Notice of Preliminary Rejection dated Nov. 12, 2018", w/ English Claims, 23 pgs.

"Korean Application Serial No. 10-2018-7002127, Notice of Preliminary Rejection dated Apr. 10, 2018", w/ English Translation, 4 pgs.

"Korean Application Serial No. 10-2018-7002127, Response filed May 16, 2018 to Notice of Preliminary Rejection dated Apr. 10, 2018", w/ English Claims, 14 pgs.

"Korean Application Serial No. 10-2018-7016881, Notice of Preliminary Rejection dated Oct. 19, 2018", w/ English translation, 9 pgs.

"Korean Application Serial No. 10-2018-7016881, Response filed Nov. 30, 2018 to Notice of Preliminary Rejection dated Oct. 19, 2018", w/ English Claims, 27 pgs.

"Korean Application Serial No. 10-2018-7037070, Notice of Preliminary Rejection dated Mar. 20, 2019", w/ English Translation, 10 pgs.

"Korean Office Action Application Serial No. 10-2017-7001104, Office Action dated Jun. 26, 2017", w/ English Translation, 12 pgs.

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6pgs.

"Starbucks Cup Magic", [Online] Retrieved from the Internet: <URL: https://www.youtube.com/watch?v=RWwQXi9RG0w>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the internet: <URL: http://www.businesswire.com/news/home/20111115005744/en/2479513/Starbucks-Holiday-Red-Cups-Life-Signaling-Return>, (Nov. 15, 2011), 5 pgs.

"To Err is Human. To Self Destruct Messages, There is iDelete for iOS", The Apple Google, [Online], Retrieved from the Internet on Mar. 21, 2018: <http://theapplegoogle.com/2013/04/err-human-destruct-messages-idelete-ios/>, (2013), 2 pgs.

Carr, Dale, "Mobile Ad Targeting: A Labor of Love", Ad Week Online, accessed Feb. 11, 2019, URL: https://www.adweek.com/digital/mobile-ad-targeting-a-labor-of-love/, (Feb. 12, 2016), 7 pgs.

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Chen, Datong, et al., "Protecting Personal Identification in Video", Protecting Privacy in Video Surveillance, Springer-Verlag London Ltd., (2009), 115-128.

Fajman, "An Extensible Message Format for Message Disposition Notifications", Request for Comments: 2298, National Institutes of Health, (Mar. 1998), 28 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Kumar, S, "Optimization Issues in Web and Mobile Advertising", Chapter 2—Pricing Models in Web Advertising, SpringerBriefs in Operations Management, (2016), 6 pgs.

Macleod, Duncan, "Macys Beiieve-o-Magic App", [Online] Retrieved from the Internet: <URL: http://theinspirationroom.com/daily/2011/macys-believe-o-magic-app>, (Nov. 14, 2011), 10 pgs.

Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide To The New Snapchat Filters and Big Fonts", [Online] Retrieved from the Internet: <URL: https://www.buzzfeed.com/katienotopoulos/a-guide-to-the-new-snapchat-filters-and-big~fonts?utm_term=.bkQ9qVZWe#.nv58YXpkV>, (Dec. 22, 2013), 13 pgs.

Panzarino, Matthew, "Snapchat Adds Filters, A Replay Function and for Whatever Reason, Time, Temperature and Speed Overlays", TechCrunch, [Online] Retrieved form the Internet: <URL: https://techcrunch.com/2013/12/20/snapchat-adds-fiiters-new-font-and-for-some-reason-time-temperature-and-speed-overlays/>, (Dec. 20, 2013), 12 pgs.

Quercia, Daniele, et al., "Mobile Phones and Outdoor Advertising: Measurable Advertising", IEEE Persuasive Computing, (2011), 9 pgs.

Simonite, Tom, "Mobile Data: A Gold Mine for Telcos", MIT Technology Review, (May 27, 2010), 6 pgs.

Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.

"U.S. Appl. No. 16/704,601, Notice of Allowance dated Nov. 23, 2021", 10 pgs.

"U.S. Appl. No. 16/704,601, Response filed Nov. 3, 2021 to Non Final Office Action dated Sep. 10, 2021", 11 pgs.

"U.S. Appl. No. 17/023,175, Non Final Office Action dated Jun. 8, 2021", 8 pgs.

"Korean Application Serial No. 10-2019-7031595, Response filed May 7, 2021 to Notice of Preliminary Rejection dated Mar. 10, 2021", w/ English Claims, 15 pgs.

(56) References Cited

OTHER PUBLICATIONS

"Korean Application Serial No. 10-2021-7024579, Notice of Preliminary Rejection dated Aug. 17, 2021", w/ English Translation, 10 pgs.

"U.S. Appl. No. 17/023,175, Response filed Sep. 8, 2021 to Non Final Office Action dated Jun. 8, 2021", 6 pgs.

"U.S. Appl. No. 16/704,601, Non Final Office Action dated Sep. 10, 2021", 9 pgs.

"U.S. Appl. No. 17/023,175, Notice of Allowance dated Oct. 5, 2021", 7 pgs.

"Korean Application Serial No. 10-2021-7024579, Response filed Oct. 5, 2021 to Office Action dated Aug. 17, 2021", w/English Translation, 15 pgs.

"U.S. Appl. No. 17/023,175, Supplemental Notice of Allowability dated Jan. 20, 2022", 2 pgs.

* cited by examiner

GENERATING A STITCHED DATA STREAM

CLAIM FOR PRIORITY

This application is a continuation of and claims the benefit of priority of U.S. application Ser. No. 15/470,004, filed Mar. 27, 2017, which is hereby incorporated by reference in its entirety.

BACKGROUND

A messaging system may receive millions of messages from users desiring to share media content such as audio, images, and video between user devices (e.g., mobile devices, personal computers, etc.). The media content of these messages may be associated with a common geolocation, a common time period, a common event, and so forth.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to processing media content items to be shared between devices via a messaging system. For example, a user may wish to share one or more videos, images, and so forth with one or more other users. These messages may be associated with common audio content, such as a song, a concert, a speech, and the like. Embodiments described herein provide a mechanism for stitching together data streams from a plurality of messages received from a plurality of user computing devices, to create dense audio stitches associated with a common audio timeline for the data streams. For example, audio stitching is used to automatically stitch together a set of messages or data streams that are associated with the same audio content. Given a set of messages or data streams, a system described herein extracts audio fingerprints for each message, creates audio matches by matching the audio fingerprints across all pairs of messages to identify messages that are associated with the same audio content, and then audio stitches are created by finding paths through the set of audio matches. The stitched audio or stitched data stream may then be provided to one or more user computing devices for users to view the stitched data stream.

The stitched data stream may comprise messages with data streams that overlap in time periods such that there may be more than one data stream for a given time period. As a user is viewing the stitched data steam, example embodiments allow the user to switch to various other data streams for any given time period. For example, a user may be viewing a lead singer for a concert and switch views to view the guitarist or the drummer or the audience, etc. at that point in the concert. In this way a user may switch between alternate views in any given time period in the common audio timeline.

Figure 1:
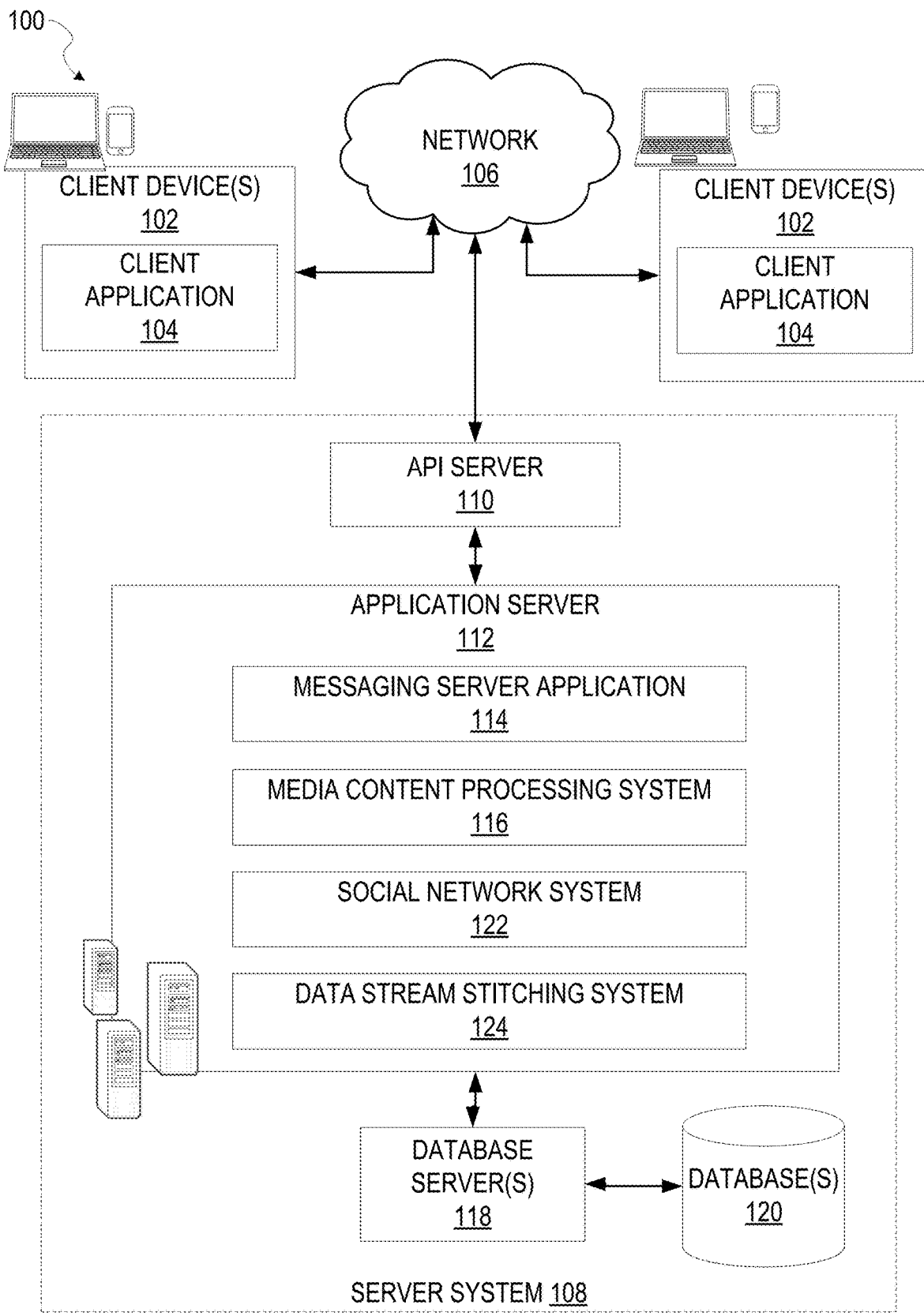
FIG. 1 is a block diagram showing an example messaging system for exchanging data (e.g., messages and associated content) over a network, according to some example embodiments.

FIG. 1 is a block diagram illustrating a networked system 100 (e.g., a messaging system) for exchanging data (e.g., messages and associated content) over a network. The networked system 100 includes multiple client devices 102, each of which hosts a number of client applications 104. Each client application 104 is communicatively coupled to other instances of the client application 104 and a server system 108 via a network 106.

The client device 102 may also be referred to herein as a user device or a user computing device. The client device 102 may comprise, but is not limited to, a mobile phone, desktop computer, laptop, portable digital assistant (PDA), smart phone, tablet, ultra-book, netbook, laptop, multi-processor system, microprocessor-based or programmable consumer electronic, game console, set-top box, computer in a vehicle, or any other communication device that a user may utilize to access the networked system 100. In some embodiments, the client device 102 may comprise a display module (not shown) to display information (e.g., in the form of user interfaces). In further embodiments, the client device 102 may comprise one or more of touch screens, accelerometers, gyroscopes, cameras, microphones, global positioning system (GPS) devices, and so forth. The client device 102 may be a device of a user that is used to create media content items such as video, images (e.g., photographs), audio, and send and receive messages containing such media content items to and from other users. Elements of such media content from multiple messages may then be stitched together as detailed further in the embodiments described below.

One or more users may interact with the client device 102 (e.g., a person, a machine, or other means of interacting with the client device 102). In example embodiments, the user may not be part of the system 100, but may interact with the system 100 via the client device 102 or other means. For instance, the user may provide input (e.g., touch screen input or alphanumeric input) to the client device 102 and the input may be communicated to other entities in the system 100 (e.g., server system 108, etc.) via the network 106. In this instance, the other entities in the system 100, in response to receiving the input from the user, may communicate information to the client device 102 via the network 106 to be presented to the user. In this way, the user may interact with the various entities in the system 100 using the client device 102.

The system 100 may further include a network 106. One or more portions of network 106 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 102 may access the various data and applications provided by other entities in the system 100 via a web client (e.g., a browser, such as the Internet Explorer® browser developed by Microsoft® Corporation of Redmond, Wash. State) or one or more client applications 104. As described above, the client device 102 may include one or more client applications 104 (also referred to as "apps") such as, but not limited to, a web browser, messaging application, electronic mail (email) application, an e-commerce site application, a mapping or location application, media content editing application, media content viewing application, and the like.

In one example, a client application 104 may be a messaging application that allows a user to take a photograph or video, add a caption, or otherwise edit the photograph or video, and then send the photograph or video to another user. The message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery. A gallery may be a collection of photos and videos which may be viewed by other users "following" the user's gallery (e.g., subscribed to view and receive updates in the user's gallery). The gallery may also be ephemeral (e.g., lasting 24 hours, lasting a duration of an event (e.g., during a music concert, sporting event, etc.), or other predetermined time).

An ephemeral message may be associated with a message duration parameter, the value of which determines an amount of time that the ephemeral message will be displayed to a receiving user of the ephemeral message by the client application 104. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, to assemble photographs and videos from a recent vacation to share with friends and family.

In some embodiments, the one or more client applications 104 may be included in a given one of the client device 102, and configured to locally provide the user interface and at least some of the functionalities with the application 104 configured to communicate with other entities in the system 100 (e.g., server system 108), on an as needed basis, for data and/or processing capabilities not locally available (e.g., access location information, to authenticate a user, to verify a method of payment, access media content stored on a server, sync media content between the client device 102 and a server computer, etc.). Conversely, one or more applications 104 may not be included in the client device 102, and then the client device 102 may use its web browser to access the one or more applications hosted on other entities in the system 100 (e.g., server system 108).

A server system 108 may provide server-side functionality via the network 106 (e.g., the Internet or wide area network (WAN)) to one or more client devices 102. The server system 108 may include an application programming interface (API) server 110, an application server 112, a messaging server application 114, and a media content processing server 116, a social network system 122, and a data stream stitching system 124, which may each be communicatively coupled with each other and with one or more data storage(s), such as database(s) 120.

The server system 108 may be a cloud computing environment, according to some example embodiments. The server system 108, and any servers associated with the server system 108, may be associated with a cloud-based application, in one example embodiment. The one or more database(s) 120 may be storage devices that store information such as untreated media content, original media content from users (e.g., high quality media content), processed media content (e.g., media content that is formatted for sharing with client devices 102 and viewing on client devices 102), stitched audio data streams, user information, user device information, and so forth. The one or more database(s) 120 may include cloud-based storage external to the server system 108 (e.g., hosted by one or more third party entities external to the server system 108). While the storage devices are shown as database(s) 120, it is understood that the system 100 may access and store data in storage devices such as databases 120, blob storages, and other type of storage methods.

Accordingly, each client application 104 is able to communicate and exchange data with another client applications 104 and with the server system 108 via the network 106. The data exchanged between client applications 104, and between a client application 104 and the server system 108, includes functions (e.g., commands to invoke functions) as well as payload data (e.g., text, audio, video or other multimedia data).

The server system 108 provides server-side functionality via the network 106 to a particular client application 104. While certain functions of the system 100 are described herein as being performed by either a client application 104 or by the server system 108, it will be appreciated that the location of certain functionality either within the client application 104 or the server system 108 is a design choice. For example, it may be technically preferable to initially deploy certain technology and functionality within the server system 108, but to later migrate this technology and functionality to the client application 104 where a client device 102 has a sufficient processing capacity.

The server system 108 supports various services and operations that are provided to the client application 104. Such operations include transmitting data to, receiving data from, and processing data generated by the client application 104. This data may include message content, client device information, geolocation information, media annotation and overlays, message content persistence conditions, social network information, and live event information, date and time stamps, as examples. Data exchanges within the networked system 100 are invoked and controlled through functions available via user interfaces (UIs) of the client application 104.

In the server system 108, an application program interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 server receives and transmits message data (e.g., commands and message payloads) between the client device 102 and the application server 112. Specifically, the API server 110 provides a set of interfaces (e.g., routines and protocols) that can be called or queried by the client application 104 in order to invoke functionality of the application server 112. The API server 110 exposes various functions supported by the application server 112, including account registration, login functionality, the sending of messages, via the application server 112, from a particular client application 104 to another client application 104, the sending of media files (e.g., images or video) from a client application 104 to the messaging application server 114, and for possible access by another client application 104, the setting of a collection of media data (e.g., Story), the retrieval of a list of friends of a user of a client device 102, the retrieval of such collections, the retrieval of messages and content, the adding and deletion of friends to a social graph, the location of friends within a social graph, opening and application event (e.g., relating to the client application 104), and so forth.

The application server 112 hosts a number of applications and subsystems, including a messaging server application 114, a media content processing system 116, a social network system 122, and a data stream stitching system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the client application 104. Other processor and memory intensive processing of data may also be performed server-side by the messaging server application 114, in view of the hardware requirements for such processing.

The application server 112 also includes media content processing system 116 that is dedicated to performing various media content processing operations, typically with respect to images or video received within the payload of a message at the messaging server application 114. The media content processing system 116 may access one or more data storages (e.g., database(s) 120) to retrieve stored data to use in processing media content and to store results of processed media content.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the networked system 100 with which a particular user has relationships or is "following," and also the identification of other entities and interests of a particular user.

The application server 112 is communicatively coupled to a database server 118, which facilitates access to one or more database(s) 120 in which is stored data associated with messages processed by the messaging server application 114.

The messaging server application 114 may be responsible for generation and delivery of messages between users of client devices 102. The messaging application server 114 may utilize any one of a number of message delivery networks and platforms to deliver messages to users. For example, the messaging application server 114 may deliver messages using electronic mail (e-mail), instant message (IM), Short Message Service (SMS), text, facsimile, or voice (e.g., Voice over IP (VoIP)) messages via wired (e.g., the Internet), plain old telephone service (POTS), or wireless networks (e.g., mobile, cellular, WiFi, Long Term Evolution (LTE), Bluetooth).

The data stream stitching system 124 may be responsible for generating a stitched data stream from data streams included in a plurality of messages received from a plurality of user computing devices (e.g., client devices 102), as described in further detail below.

Figure 2:
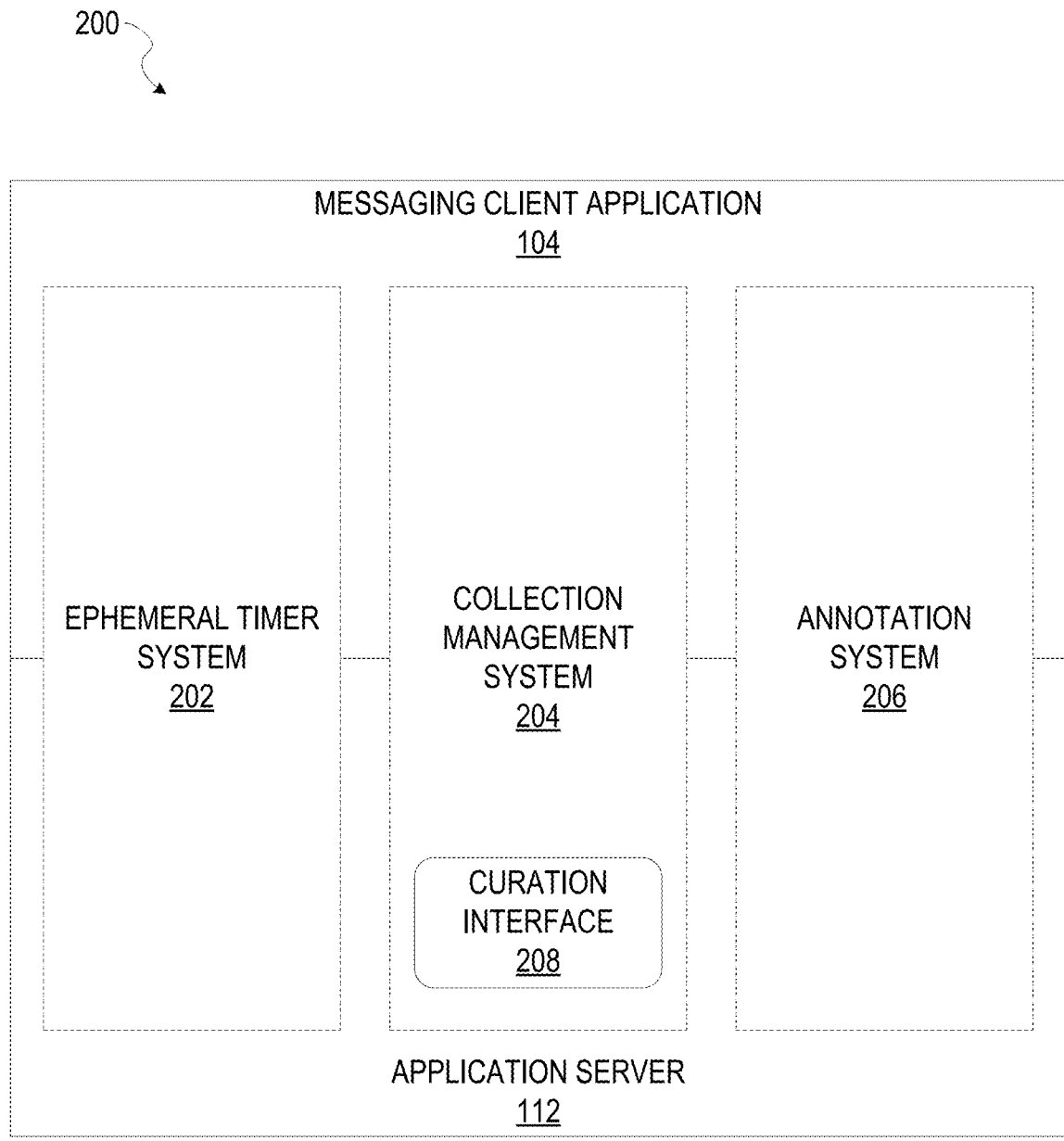
FIG. 2 is block diagram illustrating further details regarding a messaging system, according to some example embodiments.

FIG. 2 is block diagram illustrating further details regarding the system 100, according to example embodiments. Specifically, the system 100 is shown to comprise the messaging client application 104 and the application server 112, which in turn embody a number of some subsystems, namely an ephemeral timer system 202, a collection management system 204, and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT Story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation (e.g. money, non-money credits or points associated with the communication system or a third party reward system, travel miles, access to artwork or specialized lenses, etcetera) may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the networked system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay is to be offered to other users. The annotation system 206 generates a media overlay that includes the uploaded content and associates the uploaded content with the selected geolocation.

Figure 3:
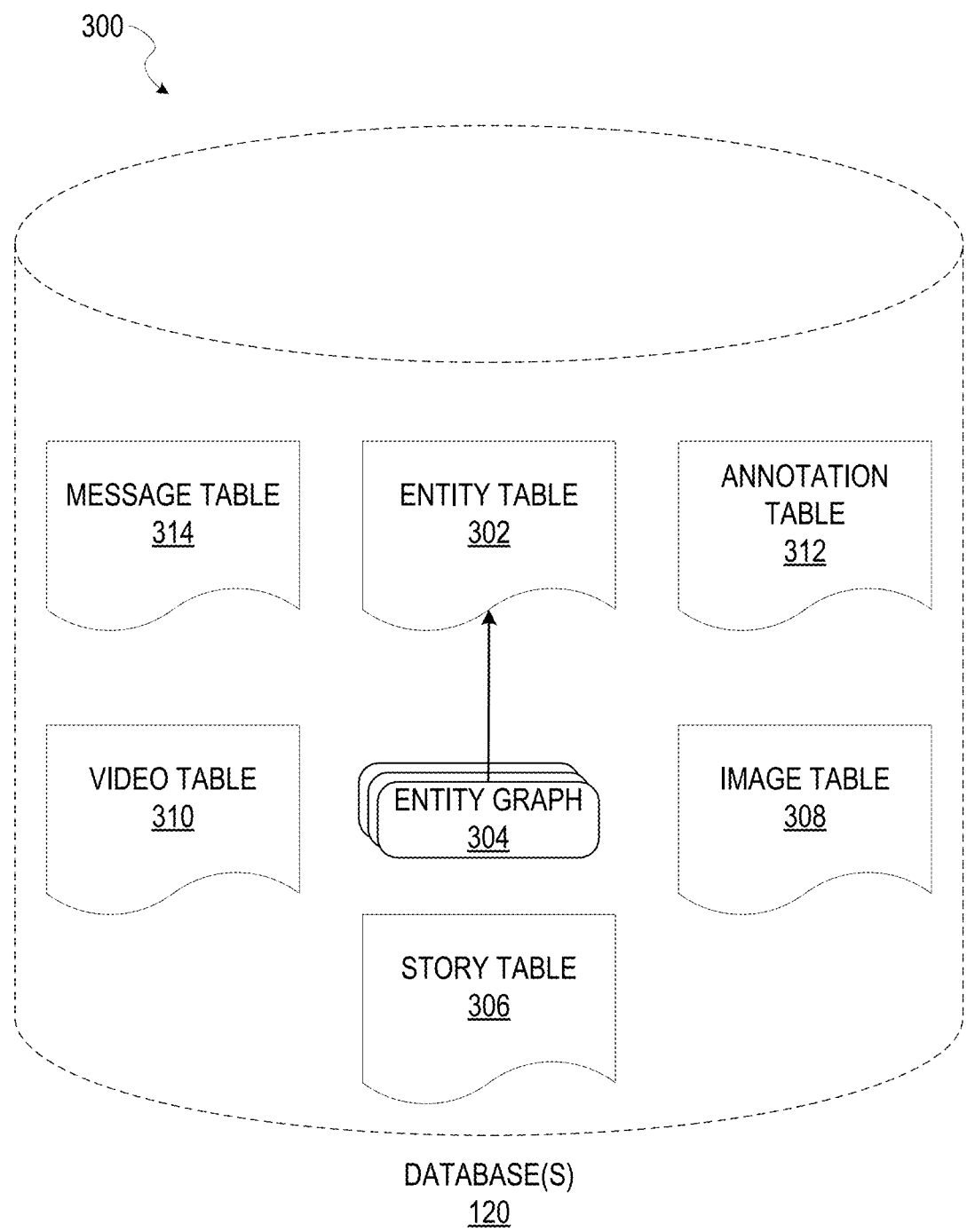
FIG. 3 is a schematic diagram illustrating data which may be stored in the database of the messaging server system, according to some example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data which may be stored in the database 120 of the server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices 102 have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
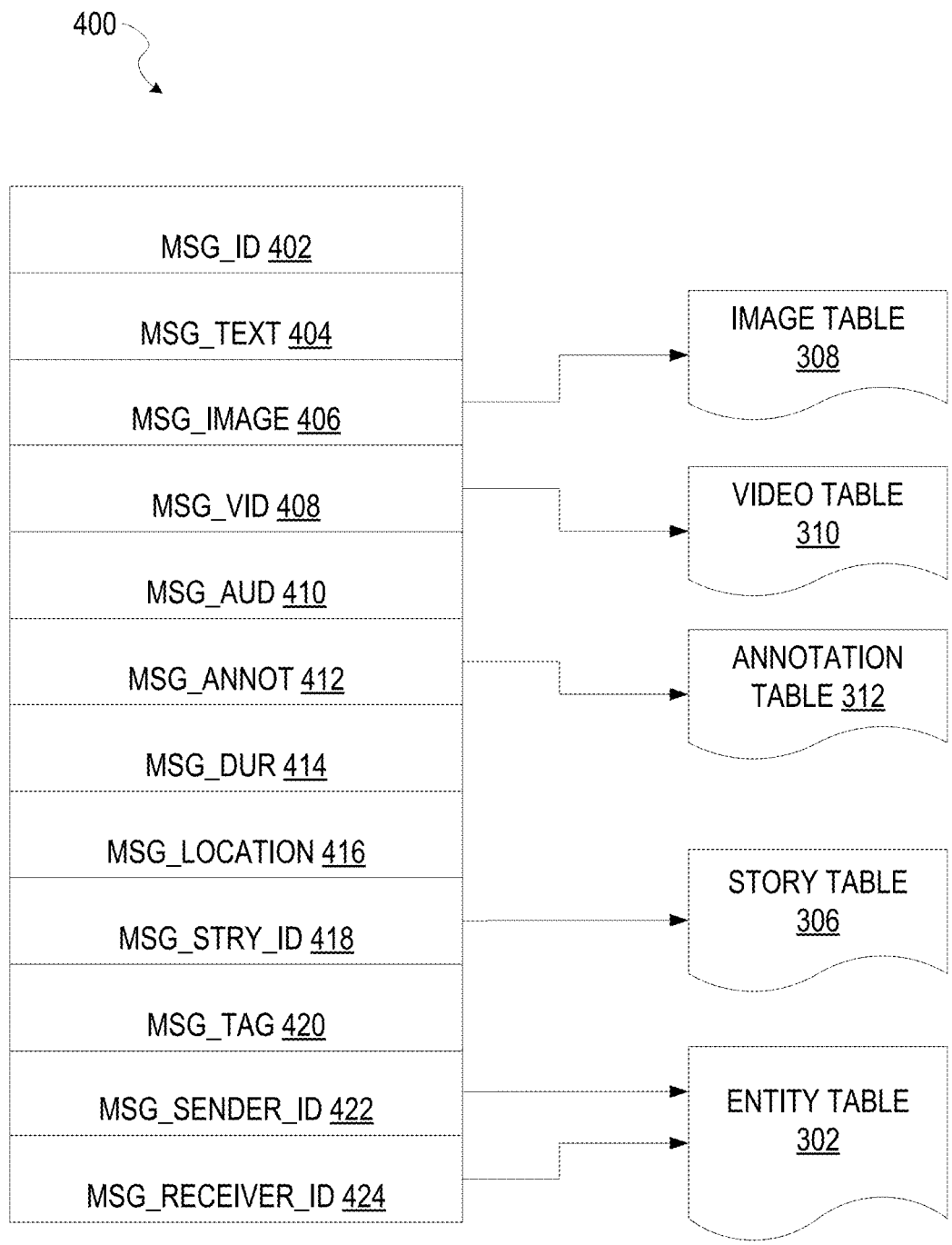
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a client application 104 for communication to a further client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from memory of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from the memory component of the client device 102, and that is included in the message 400.
- A message annotations 412: annotation data (e.g., filters, stickers or other enhancements) that represents annotations to be applied to message image payload 406, message video payload 408, or message audio payload 410 of the message 400.
- A message duration parameter 414: parameter value indicating, in seconds, the amount of time for which content of the message 400 (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message 400. Multiple message geolocation parameter 416 values may be included in the payload, each of these parameter values being associated with respect to content items included in the content (e.g., a specific image into within the message image payload 406, or a specific video in the message video payload 408).
- A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address or device identifier) indicative of a user of the client device 102 on which the message 400 was generated and from which the message 400 was sent
- A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
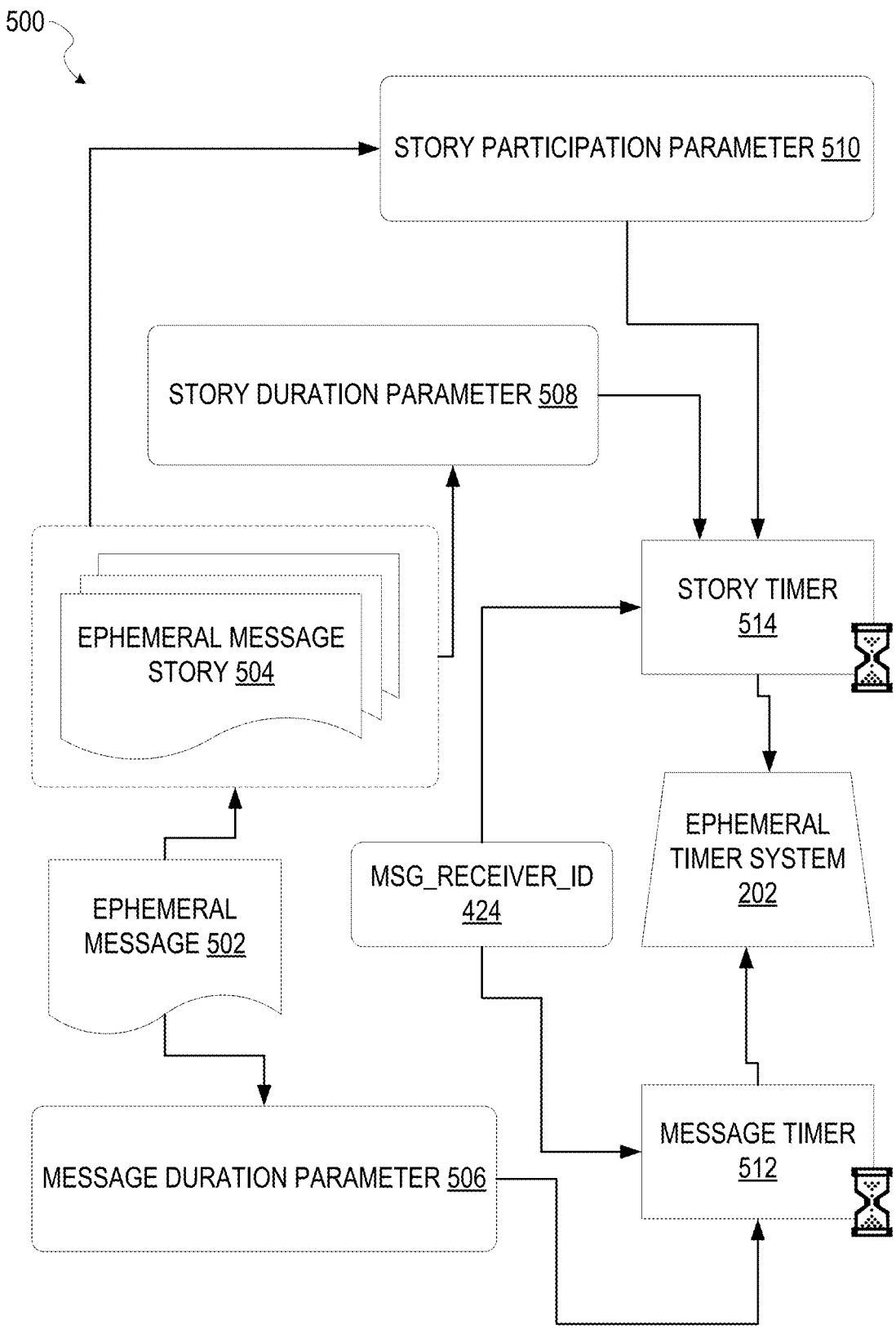
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the client application 104. In one embodiment, where the client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT story, or an event story). The ephemeral message story 504 has an associated story duration parameter 508, a value of which determines a time-duration for which the ephemeral message story 504 is presented and accessible to users of the networked system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the system 100 (and, for example, specifically the messaging client application 104 to cause an indicium (e.g., an icon) associated with the relevant ephemeral message story 504 to no longer be displayed within a user interface of the client application 104. Similarly, when the ephemeral timer system 202 determines that the message duration parameter 506 for a particular ephemeral message 502 has expired, the ephemeral timer system 202 causes the client application 104 to no longer display an indicium (e.g., an icon or textual identification) associated with the ephemeral message 502.

Figure 6:
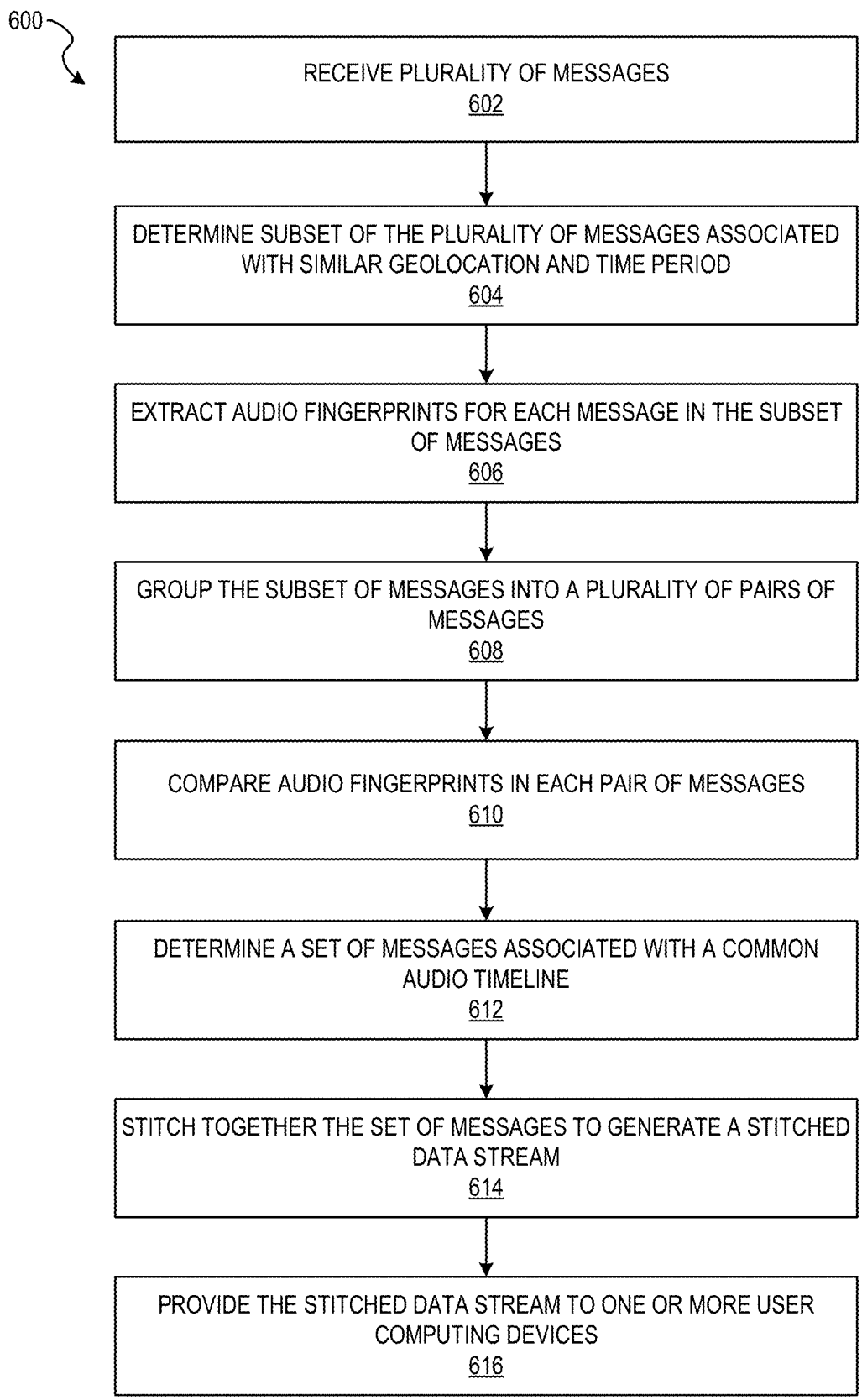
FIG. 6 is a flowchart illustrating aspects of a method, according to some example embodiments.

FIG. 6 is a flow chart illustrating aspects of a method 600, according to some example embodiments, for generating a stitched data stream from a plurality of messages received from a plurality of user computing devices (e.g., client devices 102). For example, the server system 108 may determine that a subset of the plurality of messages are associated with common audio content and generate a stitched data stream from the subset of the plurality of messages for an audio timeline associated with the common audio content. For illustrative purposes, method 600 is described with respect to the networked system 100 of FIG. 1. It is to be understood that method 600 may be practiced with other system configurations in other embodiments.

In operation 602, the server system 108 (e.g., via a server computer associated with the data stream stitching system 124) receives a plurality of messages from a plurality of user computing devices (e.g., client devices 102). Each message, of the plurality of messages, may comprise media content such as an image, a data stream, and so forth. In one example, the data stream may be a video taken by a user during a concert, speech, or other event that comprises audio. Each message may also comprise other data, such as, geolocation data, a date and time stamp for the message (e.g., when the message was created or sent), a data and time stamp for the data stream or other media content (e.g., when the data stream or other media content of the message was captured or recorded), and so forth.

In operation 604, the server computer determines a subset of messages, of the plurality of messages, associated with a similar geolocation and time period. For example, the server computer may analyze each message of the plurality of messages to determine a geolocation of each of the plurality of messages and time period for each of the messages. In one example, the server computer may determine the geolocation of each of the plurality of messages using data included in the message such as global positioning system (GPS) coordinates of a user computing device from which the message was sent. In another example, the server computer may determine a time period based on a timestamp included in the message that indicates the time the message was sent, or the time media content (e.g., a data stream) included in the message was captured, or based on a time the message was received by the server computer, and so forth. The server computer may detect that the subset of messages of the plurality of messages comprise a geolocation associated with the same predetermined region of GPS coordinates and a time period within a predetermined window of time (e.g., 1 minute, 5, minutes, 10 minutes, 20 minutes, etc.).

In one example, the server system 108 may pre-divide the world (e.g., a world map) into predefined grids. For each grid, the server computer may aggregate all of the messages with a geolocation that fall into each grid within a particular time period (e.g., every ten minutes). Each grid may be the same size, or each grid size may vary based on the density of population in an area, the size of a town or city, and so forth. Accordingly, the subset of messages may be an aggregation of messages with geolocations within one particular grid that occurred within the same (e.g., ten minute) time period.

In operation 606, the server computer extracts audio fingerprints for each message in the subset of messages to be used to determine whether there is common audio across messages in the subset of messages. For example, the server computer may analyze audio included in each message (e.g., the audio for a data stream of the message) and calculate an audio fingerprint. There are a number of different methods that may be used to calculate audio fingerprints. One example is extracting features from a spectrogram and using the extracted features in a comparison with other spectrograms to figure out whether or not key spectrograms match up and exactly where they match up. Using a spectrogram is simply one example of a method of calculating audio fingerprints. It is understood that other methods may be used in the alternative, or in combination.

In one example, the following response is returned from analyzing audio included in a message to calculate an audio fingerprint:

```
{
    ...
    "results": {
        "audiofp_vi": {
            "fingerprints": [230, 36820, 38234] # 30 bit integer hash of N fingerprints
            "frames": [7, 7, 30] # corresponding frames the N fingerprints appear in
            "spectrogram_length": 105 # number of frames in spectrogram
            "wav_length": 220500 # length of wav data
        }
    }
}
```

A spectrogram representation may be computed using a Fast Fourier Transform (FFT) across windows in time. For example, parameters used in the FFT window may include:
SAMPLING_RATE=44100
WINDOW_SIZE=4096
OVERLAP_RATIO=0.5

Figure 7:
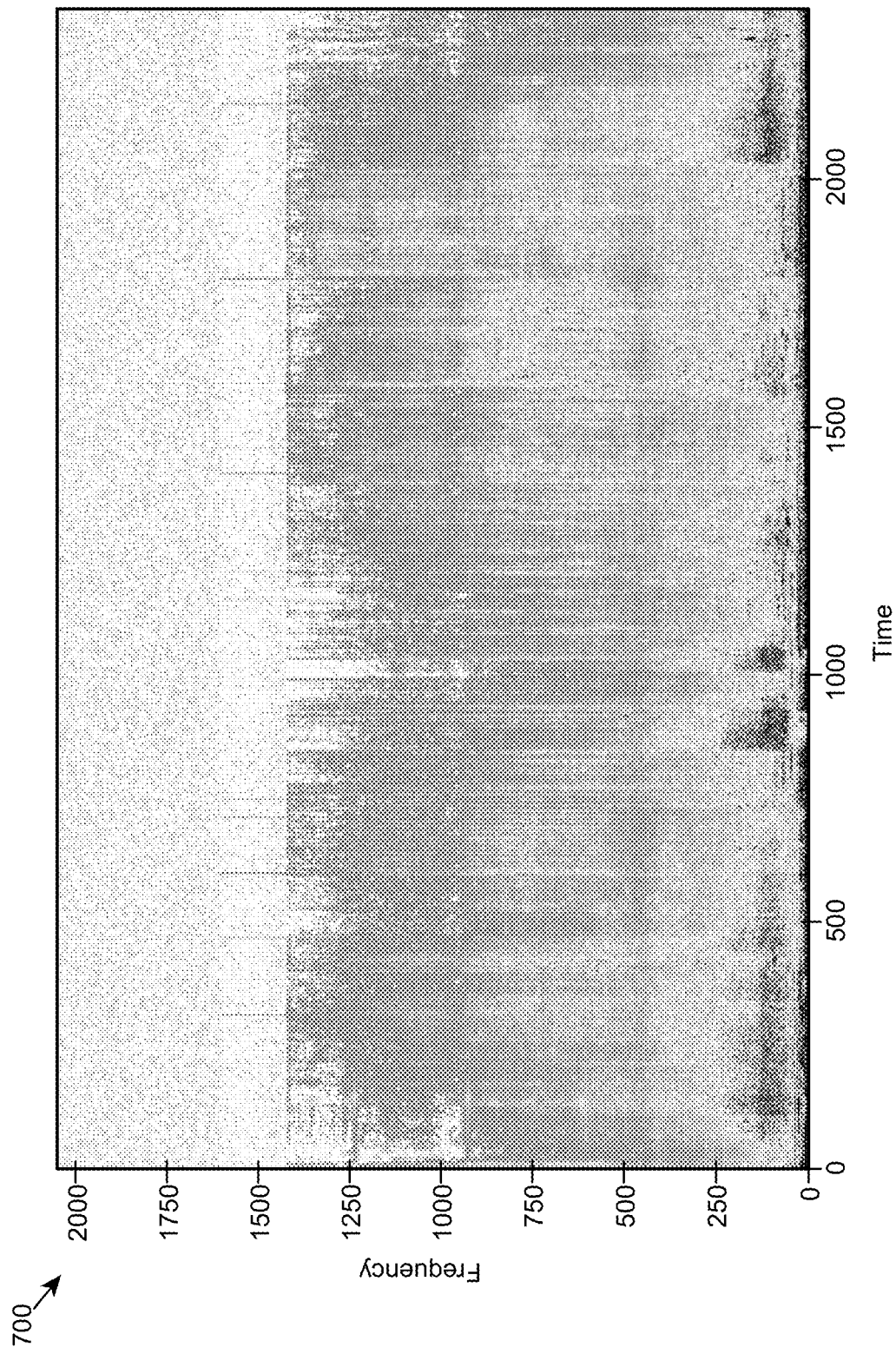
FIG. 7 shows an example of a spectrogram, according to some example embodiments.
Figure 8:
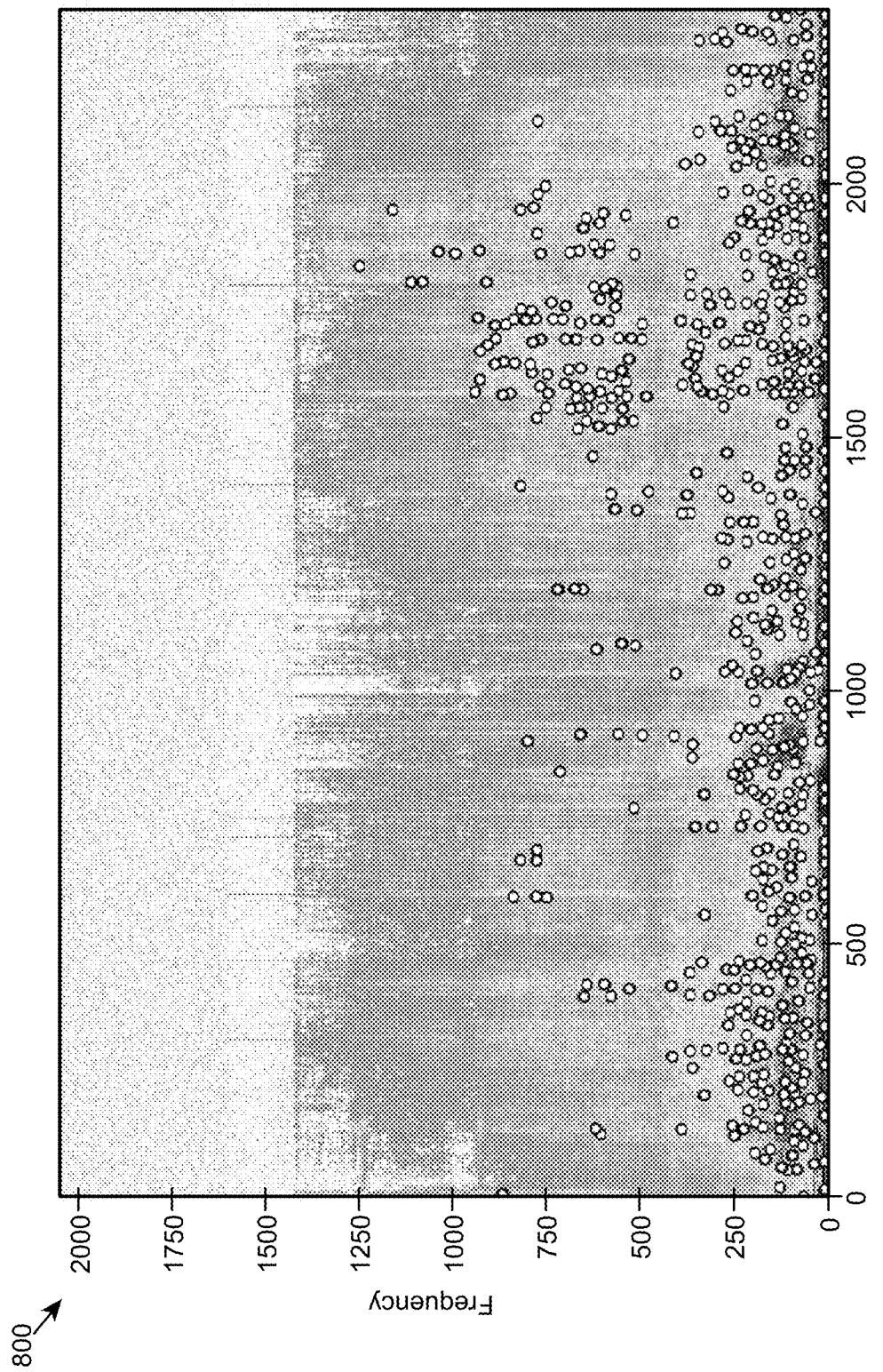
FIG. 8 shows an example of detected maxima of a spectrogram, according to some example embodiments.

FIG. 7 shows an example of a spectrogram 700. With the spectrogram, maxima (or peaks) may be extracted using a diamond maxima filter of size NEIGHBORHOOD_SIZE=20. FIG. 8 shows an example of the detected maxima of a spectrogram 800.

Figure 9:
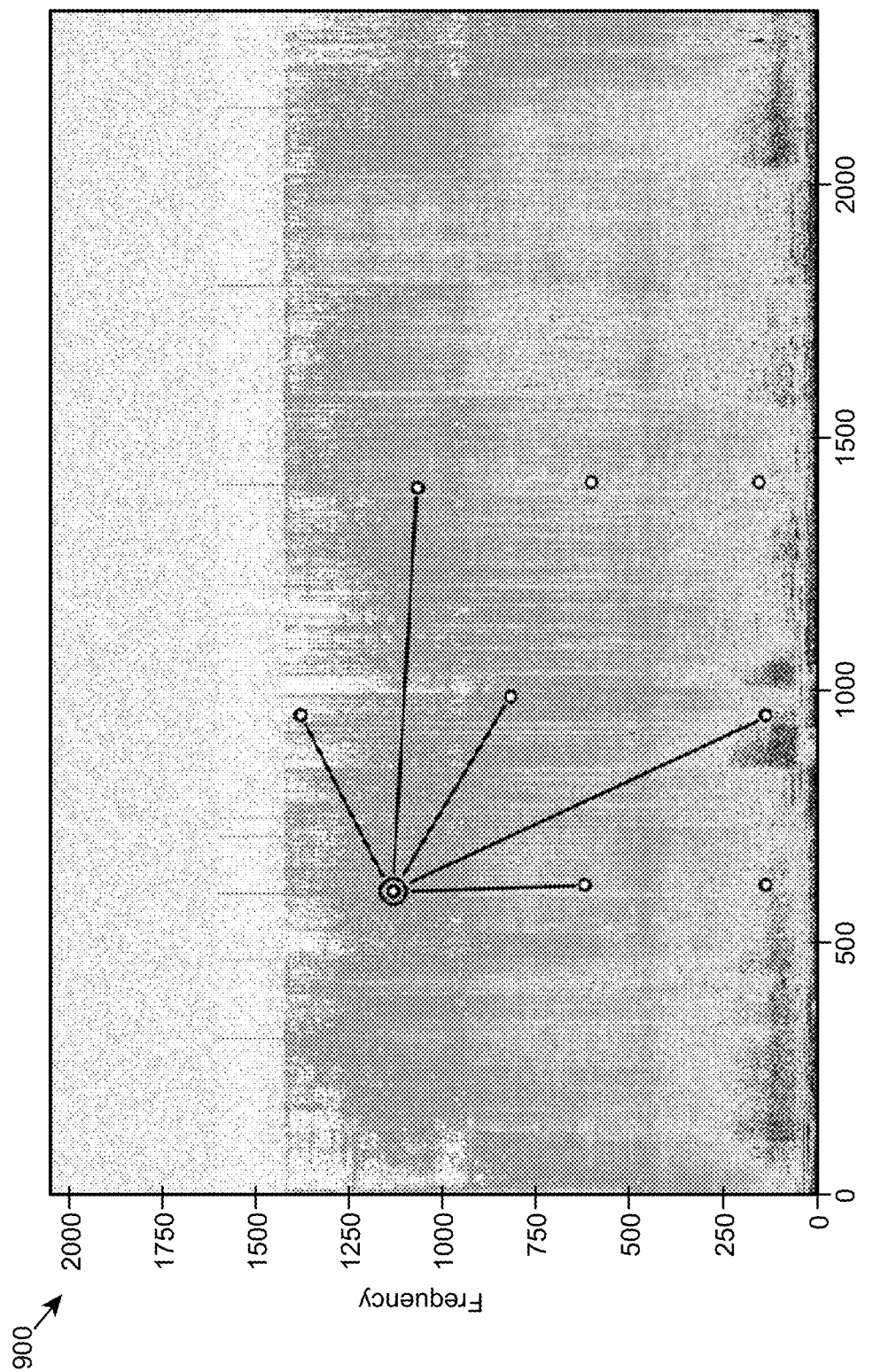
FIG. 9 shows an example of maxima of a spectrogram linked together into a final audio fingerprint, according to some example embodiments.

After the maxima are extracted, pairs of maxima are linked together into a final audio fingerprint, as shown in the spectrogram 900 of FIG. 9. First, the maxima may be sorted by time in which they occur. Then, each maxima is linked with a first FAN_VALUE maxima after it, provided that they are within a MIN_TIME_DELTA and a MAX_TIME_DELTA time frames away. The fingerprint may be created using three values:
1. frequency of first maxima (11 bits)
2. frequency of second maxima (11 bits)
3. time difference between the two maxima (8 bits)

In this example, these three values are be packed into a single unsigned integer to form an audio fingerprint. This audio fingerprint is then associated with the time frame of the first maxima. This results in a fingerprint hash as follows:
TIME_DELTA|FREQ1|FREQ2
8-bits|11-bits|11-bits The parameters that may be used for the hashing are as follows:
FAN_VALUE=15
MIN_TIME_DELTA=1
MAX_TIME_DELTA=255

In one example, audio fingerprints are designed in such a way as to be resistant to noise. Thus, as long as there is some common audio shared between two data streams, the two data streams can still be effectively matched.

Returning to FIG. 6, in operation 608, the server computer groups the subset of messages into a plurality of pairs of messages so that each message in the subset of the plurality of messages may be compared to each other message. Each pair of messages may comprise a first message and a second message.

In operation 610, the server computer compares the audio fingerprint of the first message to the audio fingerprint of the second message in each pair of messages to determine a match score for each pair of messages. In this way, the server computer may match audio fingerprints between all pairs of messages (e.g., from audio content in each data stream in each message) in the subset of messages. If the match score for the pair of messages is above a predetermine threshold, the server computer may consider the pair of messages as a match (e.g., containing a portion of the same audio content) and determine exactly where each message in the pair align. In one example, a match may be found if enough fingerprints match in the exact temporal order.

In another example, the server computer may determine at what time point the two messages should be connected so that their intersecting audio tracks match up exactly. The matching may be done in spectrogram space and may be accurate down to $\frac{1}{20}$ of a second. For example, a first message may comprise the first ten seconds of the audio content (e.g., from time 00:00 to time 00:10) of the audio content, the second message may comprise five seconds of the audio content from time 00:08 to time 00:13, and so forth.

In one example, the server computer may determine if there are enough pairs of messages that all link together into one common audio timeline. A common audio timeline is associated with a particular audio content (e.g., a song, a speech, a concert, etc.). The common audio timeline may comprise an entire length of the audio content (e.g., the entire song, speech, concert, etc.) or the common audio timeline may comprise a portion of the entire length of the audio content (e.g., the last 45 seconds of a song, a middle portion of a speech, the first ten minutes of a concert, etc.).

A predetermined threshold may be used to determine if there are enough pairs of messages that all link together into one common audio timeline. For example, a predetermined threshold may be a certain amount of time in which there must be linked messages (e.g., a minimum of thirty seconds, one minute, five minutes, etc.), a certain number of messages that must be linked (e.g., two, ten, twenty, fifty, one hundred, etc.), or other threshold. If there are enough pairs of messages to link together into one common audio timeline, then the server computer may stitch together the messages associated with the common audio timeline.

In operation 612, the server computer determines a set of messages of the subset of messages associated with a common audio timeline. For example, the server computer may determine the set of messages based on the match score for each pair of messages. In one example, the set of messages may comprise all of the messages in the subset of messages. In another example, the set of message may be a further subset of the subset of messages (e.g., messages in the subset of message may not be all associated with a common audio content, but may instead be associated with different audio content).

In operation 614, the server computer stitches together the set of messages to generate a stitched data stream from the data streams for each message of the set of messages. For example, the server computer may stitch together the set of messages based on a time period for each message. For instance, message A may be for time period 00:10-00:20 in the common audio timeline, message B may be for time period 00:20-00:23, message C may be for time period 00:22-00:31, and so forth. Data streams may overlap in time periods such that there may be more than one data stream for a given time period.

In one example, the server computer may determine a start message for the stitching. The start message may be a message that is occurring first in the common audio timeline for the set of messages. For example, there may be one message that has a period of time in the audio timeline starting at 00:10, and another message that has a period of time in the audio timeline starting at 00:15, and so forth. The server computer determines which message is earliest in the audio timeline (e.g., the one starting at time 00:10).

In one example, there may be more than one message with similar start times, any of which may be a start message. For example, a first message may start at time 00:10:01, a second message at 00:10:02, and a third message at 00:10:01. The server computer may select a start message from these messages by random choice, based on a quality score of the messages indicating a level of quality of the message (e.g., image clarity, audio clarity, steadiness of stream, etc.), based on an interest score (e.g., based on user interest), or other means, or a combination of these methods.

In one example, the server computer determines all possible start points for a stitch by considering messages or data streams from the messages that only appear at the front of all matches. The server computer may then run a recursive breadth first search starting at each start point to create a dense audio stitch from the audio matches.

In another example, the server computer may optimize the stitches. For example, optimized stitches may comprise the minimum number of messages or data streams from the messages that are necessary to span an entire dense stitch. These may be computed efficiently for each dense stitch using a greedy algorithm. For example, starting with a first message or data stream, the server computer may determine the longest message or data stream that intersects with the first message to select the second message. The server computer may then determine the longest message or data stream that intersects with the second message to select the third message, and so forth until the entire common audio timeline is completed.

Figure 10:
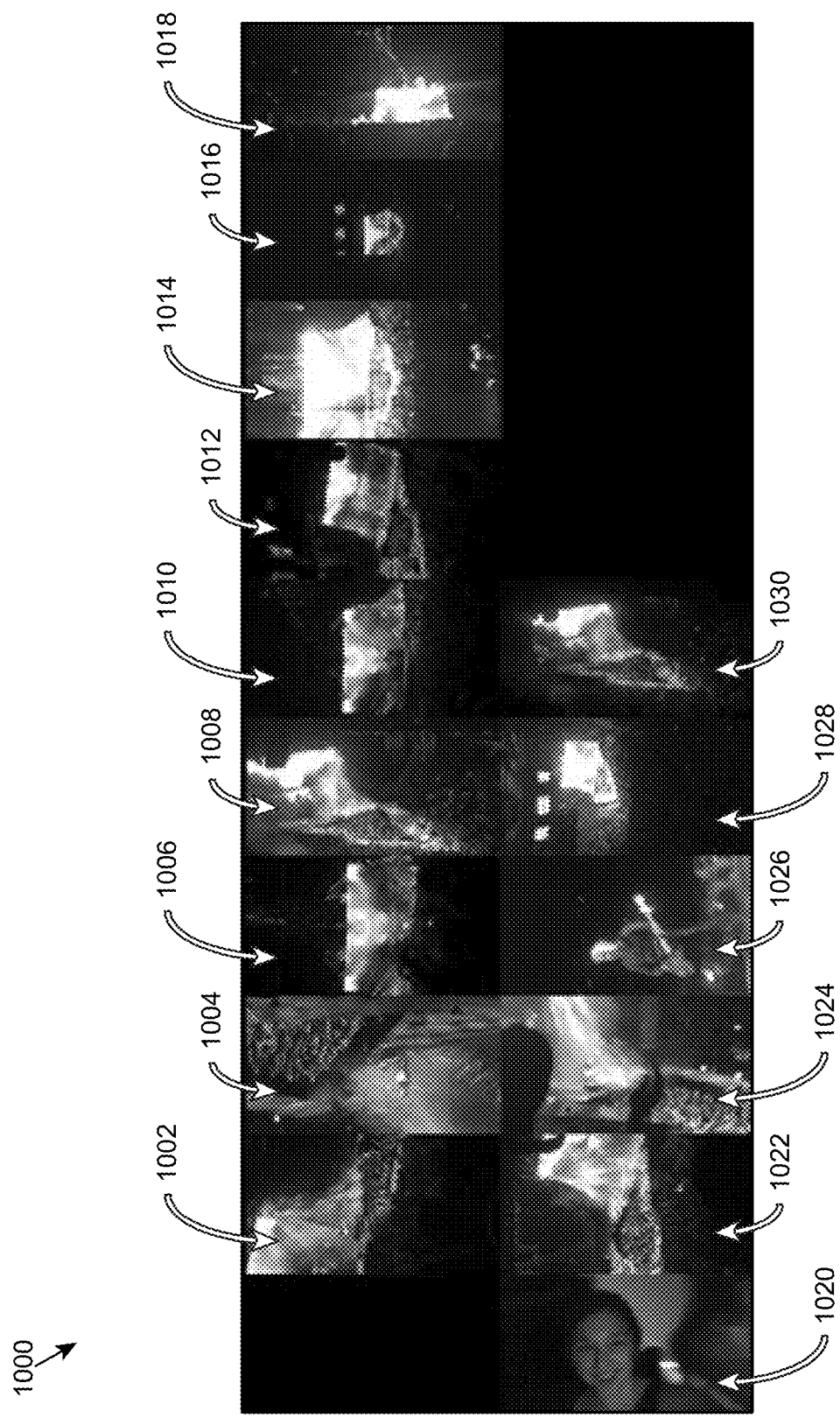
FIGS. 10-11 each show a visual representation of a stitched data stream comprising a plurality of messages received from a plurality of user devices, according to some example embodiments.

FIG. 10 shows a visual representation of a stitched data stream 1000 comprising a plurality of messages or data streams 1002-1030 received from various users via a plurality of user devices. Each box 1002-1030 represents a message or data stream in the stitched data stream 1000 that was received from a user. For example, each message or data stream in each box 1002-1030 may comprise a time period during the common audio timeline (e.g., 1002 may be the first 10 seconds of the common audio timeline, 1004 may be the next 10 seconds of the common audio timeline, 1006 may be the next 5 seconds of the common audio timeline, etc.). In this example, the stitched data stream 1000 comprises messages from a live audio event.

Figure 11:

FIG. 11 shows another visual representation of a stitched data stream 1100 comprising a plurality of messages or data streams received from various users via a plurality of user devices. As in FIG. 10, in FIG. 11 each box represents a message or data stream in the stitched data stream 1100 that was received from a user. In this example, the stitched data stream 1100 comprises messages from a live sporting event.

In one example, the stitched data stream may comprise messages that are prioritized based on a random selection of order of display in the timeline. In another example, the stitched data stream may comprise messages that are prioritized according to one or more rules. For example, the stitched data stream may comprise messages that are prioritized based on a quality score for an order of display in the common audio timeline. In one example, each message or data stream may be analyzed to determine a score for the quality of the data stream based on image quality, shakiness of the data stream, audio quality, light, and so forth.

In yet another example, the stitched data stream may comprise messages that are prioritized based on the user or user profile of the user associated with the user computing device. For example, the stitched data stream may comprise messages from the user or from other users associated with the user (e.g., friends, family, other users that the user is "following," etc.). The server computer may prioritize selection of messages that were created or sent by the user or other users associated with the user.

Referring again to FIG. 6, in operation 616, the server computer provides the stitched data stream to one or more user computing devices. In one example, the server computer may send the stitched data stream to the one or more computing devices. In another example, the server computer may provide access to the stitched data stream from the one or more computing devices, such as via a link, or other means, that will allow the user computing device to access the stitched data stream on the server computer (e.g., to stream the stitched data stream from the server computer).

Figure 13:
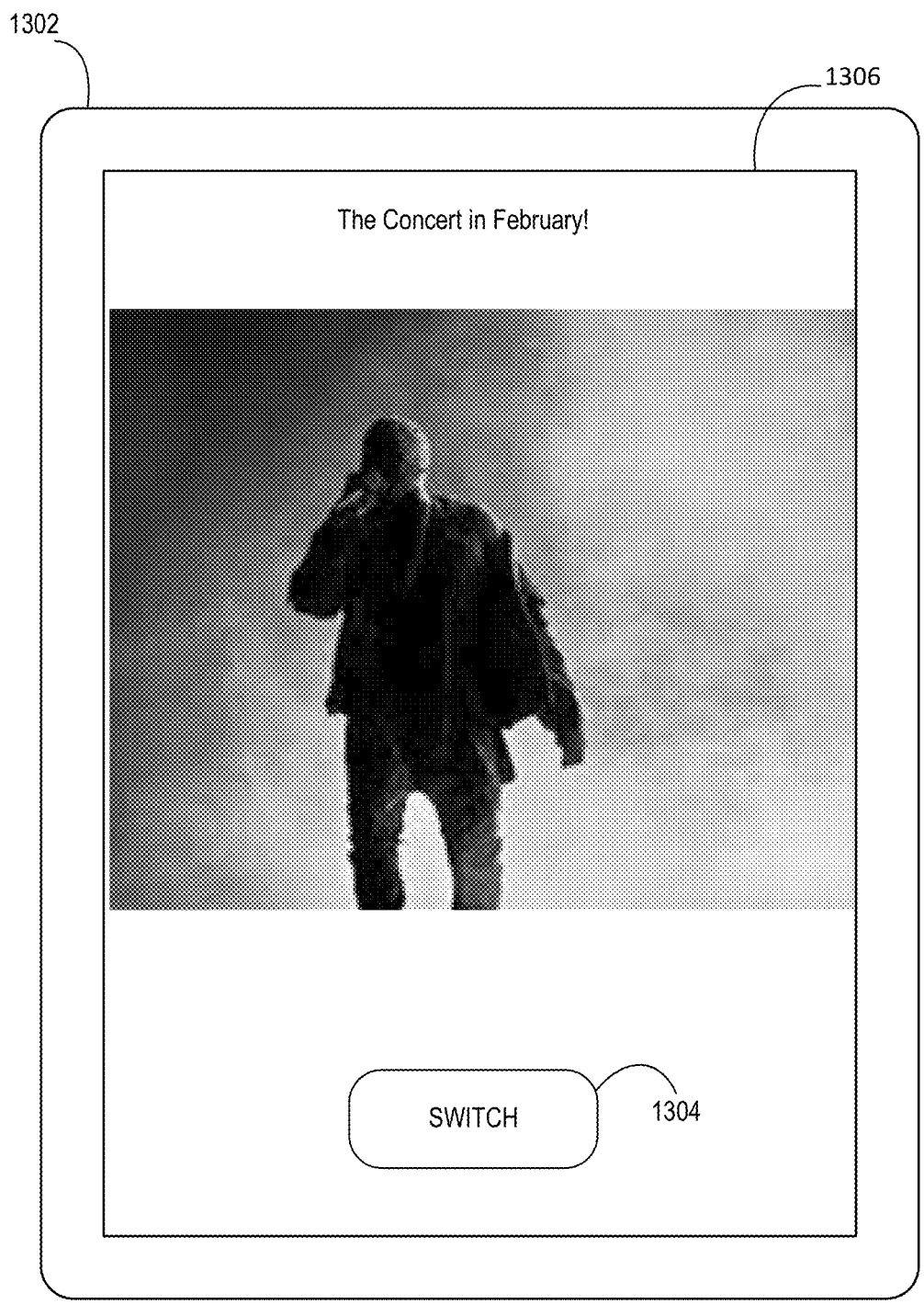
FIGS. 13-15 each show an example user interface of a user computing device, according to some example embodiments.
Figure 14:
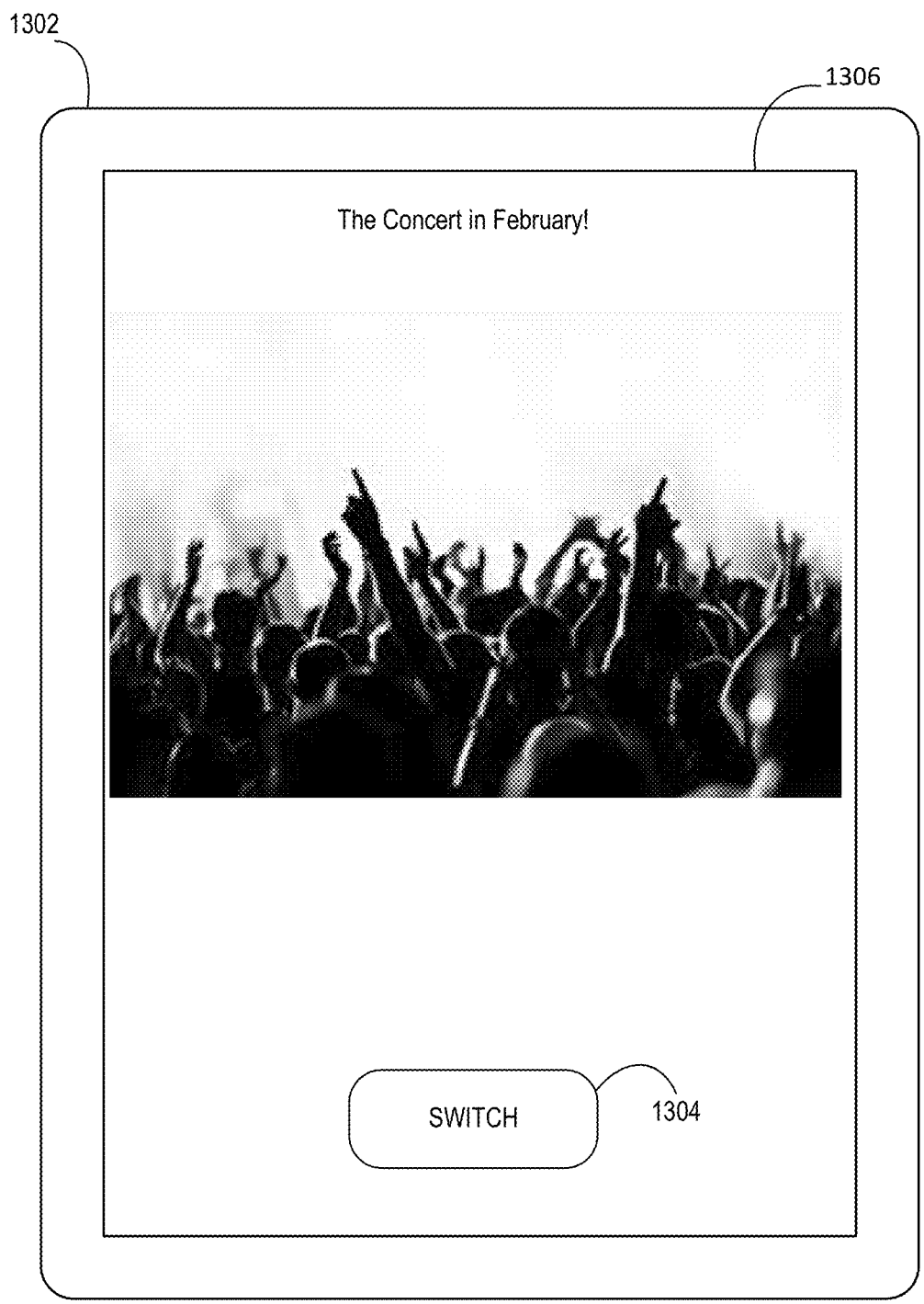
Figure 15:
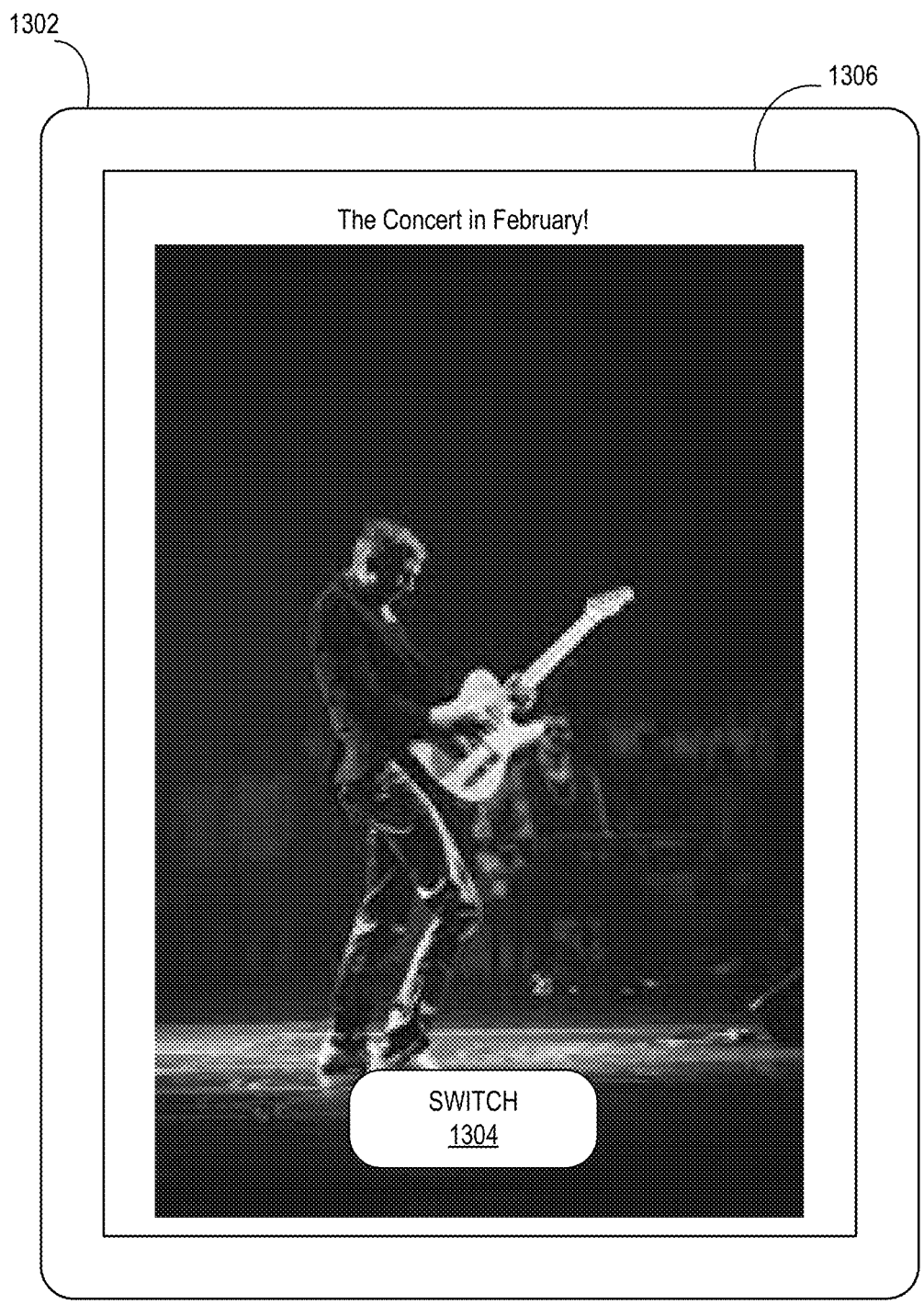

The one or more user devices may display the stitched data stream on a display of the one or more user devices, as shown in the examples in FIGS. 13-15. In one example, the stitched data stream is displayed on the user device as a continuous data stream that transitions from one message data stream to the next message data stream to a continuous common audio stream. In one example, the audio from each data stream of the stitched data stream is averaged to provide a better quality audio stream. Thus, the continuous common audio stream may comprise audio that is an average of audio associated with each data stream in the stitched data stream to provide a better quality audio stream, or the continuous audio stream may comprise the original audio received in the plurality of messages.

Example embodiments allow a user to switch a display between alternate data streams for a given time period in the stitched data stream. Using the example illustrated in FIGS. 13-15, a user may be viewing a display 1306 of a stitched data stream for a recent concert on a computing device 1302. The display 1306 may show the lead singer in the concert and the user may want to see other views at that time in the audio timeline. In one example, the display 1306 may somehow indicate that there are alternate views of the currently viewed data stream (e.g., via button 1304, highlighted frame, pop up message, or other indicator). The user may move the device (e.g., shake, tilt, etc.), touch the display 1306 of the device (e.g., touch a button or link on the display 1306), or otherwise provide an indication that he desires to view an alternate display. After receiving the indication from the user, the user computing device 1302 may display the alternate view (e.g., data stream) which may show the audience, as shown in FIG. 14, a guitarist in the band, as shown in FIG. 15, or other display. The stitched data stream would then continue playing from that view to the end of that view and then would transition to a next view that aligns with that view, and so forth. Accordingly, the display of the stitched data stream transitions to a next message data stream when the prior data stream ends or when a user indicates he desires to view an alternate display.

Figure 12:
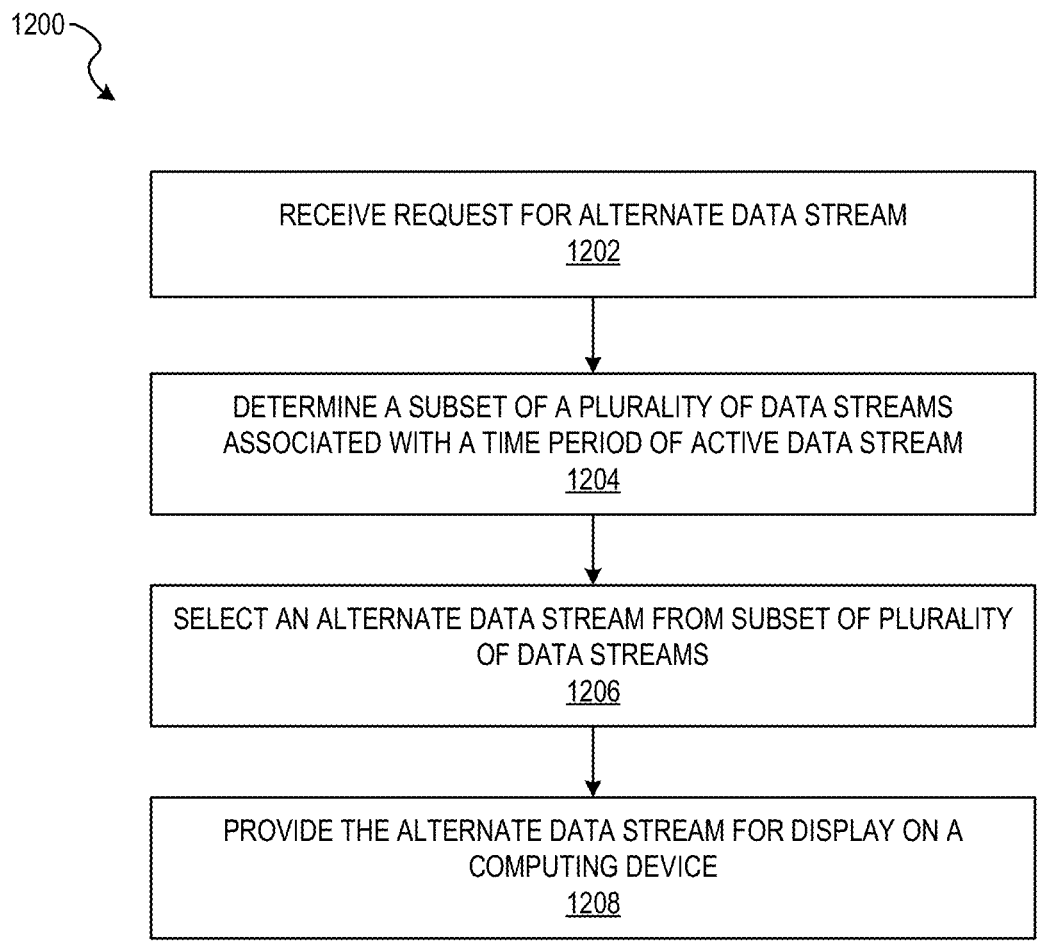
FIG. 12 is a flowchart illustrating aspects of a method, according to some example embodiments.

FIG. 12 is a flow chart illustrating aspects of a method 1200, according to some example embodiments, for providing alternate data streams for display on a user computing device (e.g., client device 102). For illustrative purposes, method 1200 is described with respect to the networked system 100 of FIG. 1. It is to be understood that method 1200 may be practiced with other system configurations in other embodiments.

In operation 1202, a computing device receives a request for an alternative data stream. The computing device in these examples may be a user computing device (e.g., client device 102) or a server computer (e.g., a server computer associated with server system 118). For example, during display on a user computing device of a stitched data stream comprising a plurality of individual data streams associated with a common audio timeline, the user computing device or the server computer may receive the request for an alternate data stream of the plurality of data streams than an active data stream currently being displayed on the computing device (e.g., depending on whether the stitched data stream resides on the user computing device or is streamed from the server computer, and/or whether the functionality for providing an alternate data stream resides on the user comping device or the server computer). As explained in further detail above, the plurality of data streams associated with the common audio timeline are received from a plurality of computing devices and stitched together to form the stitched data stream. As also explained above, the common audio timeline may be for audio content that is an average of audio associated with the plurality of individual data streams of the stitched data stream, in one example.

In one example, a user may indicate a desire to switch to an alternate data stream in a display on a user computing device, as explained above. For example, the user computing device may receive an indication from a user of the computing device to switch to an alternate data stream, as explained above (e.g., via motion input, touch input, etc.). The user computing device may send the request to server system 108, in one example, or may handle the request itself, in another example. If the user computing device sends the request to the server system 108, then a computing device such as a server computer receives the request for an alternate data stream. If the user computing device handles the request itself, then the user computing device receives the request for an alternate data stream.

In operation 1204, the computing device determines a subset of the plurality of individual data streams of the individual data streams of the stitched data stream associated with a time period of the active data stream in the common audio timeline. For example, the computing device may determine a time period of the active data stream based on data received in the request for the alternate data stream. In one example, the computing device may determine that the active data stream is associated with the time period 00:30 to 00:33 of the common audio timeline. The request for the alternate data stream may include the time period, or may include the current time stamp where the active data stream was displaying when the request was sent (e.g., 00:30:49, 00:32:10, etc.). The computing device may analyze the plurality of data streams to determine which of the plurality of data streams comprise a time period that overlaps with the time period of the active data stream.

In operation 1206, the computing device selects an alternate data stream from the subset of the plurality of individual data streams of the stitched data stream associated with the time period of the active data stream in the common audio timeline. In one example, to select the alternate data stream from the subset of the plurality of data streams, the computing device may determine a quality score for each data stream of the subset of the plurality of data streams of the stitched data stream associated with the time period of the active data stream. In this example the computing device selects the alternate data stream based on the quality score for the alternate data stream. For example, the computing device may select the data stream with the highest quality score for the alternate data stream. The quality score may be based on a quality score of video or images in the data stream and/or an interest score of the data stream to a plurality of users, in one example. In another example, the computing device may randomly select the alternate data stream from the subset of the plurality of data streams.

In operation 1208, the computing device may provide the alternate data stream for displaying a computing device. In one example, the server computer may provide the alternate data stream to the user computing device to display to a user. In another example, the user computing device may display the alternate data stream to the user.

The display of the active data stream on the computing device may transition to the alternate data stream on the computing device in the common audio timeline. In this way, the user may view the alternate data stream as explained above. The display of the stitched data stream continues from the alternate data stream and transitions to a next data stream of the plurality of data streams that occurs after the alternate data stream ends in the common audio timeline.

Figure 16:
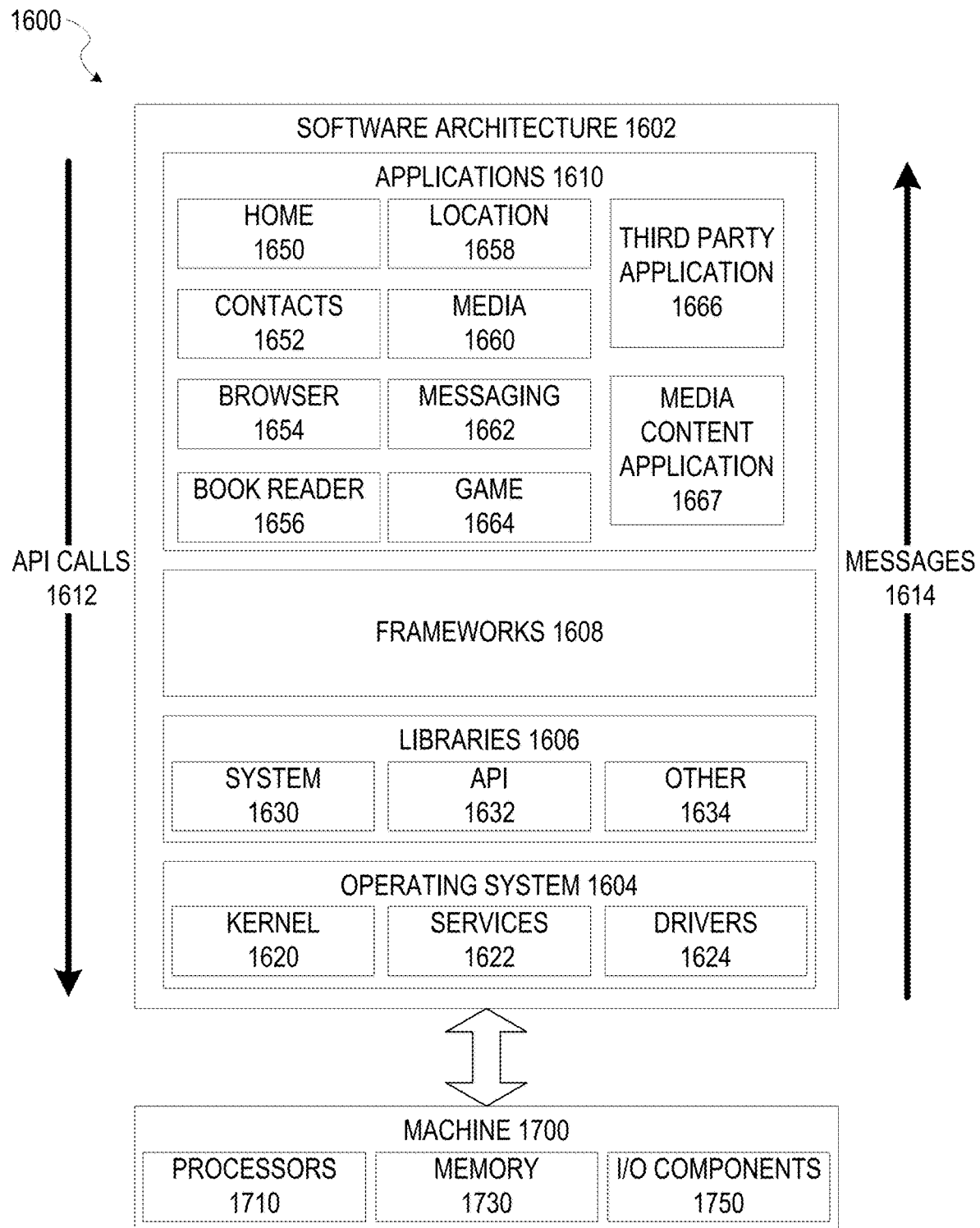
FIG. 16 is a block diagram illustrating an example of a software architecture that may be installed on a machine, according to some example embodiments.

FIG. 16 is a block diagram 1600 illustrating software architecture 1602, which can be installed on any one or more of the devices described above. For example, in various embodiments, client devices 102 and server systems 108, including server systems 110, 112, 114, 116, 118, 122, and 124 may be implemented using some or all of the elements of software architecture 1602. FIG. 16 is merely a non-limiting example of a software architecture, and it will be appreciated that many other architectures can be implemented to facilitate the functionality described herein. In various embodiments, the software architecture 1602 is implemented by hardware such as machine 1700 of FIG. 17 that includes processors 1710, memory 1730, and I/O components 1750. In this example, the software architecture 1602 can be conceptualized as a stack of layers where each layer may provide a particular functionality. For example, the software architecture 1602 includes layers such as an operating system 1604, libraries 1606, frameworks 1608, and applications 1610. Operationally, the applications 1610 invoke application programming interface (API) calls 1612 through the software stack and receive messages 1614 in response to the API calls 1612, consistent with some embodiments.

In various implementations, the operating system 1604 manages hardware resources and provides common services. The operating system 1604 includes, for example, a kernel 1620, services 1622, and drivers 1624. The kernel 1620 acts as an abstraction layer between the hardware and the other software layers, consistent with some embodiments. For example, the kernel 1620 provides memory management, processor management (e.g., scheduling), component management, networking, and security settings, among other functionality. The services 1622 can provide other common services for the other software layers. The drivers 1624 are responsible for controlling or interfacing with the underlying hardware, according to some embodiments. For instance, the drivers 1624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1606 provide a low-level common infrastructure utilized by the applications 1610. The libraries 1606 can include system libraries 1630 (e.g., C standard library) that can provide functions such as memory allocation functions, string manipulation functions, mathematic functions, and the like. In addition, the libraries 1606 can include API libraries 1632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 1606 can also include a wide variety of other libraries 1634 to provide many other APIs to the applications 1610.

The frameworks 1608 provide a high-level common infrastructure that can be utilized by the applications 1610, according to some embodiments. For example, the frameworks 1608 provide various graphic user interface (GUI) functions, high-level resource management, high-level location services, and so forth. The frameworks 1608 can provide a broad spectrum of other APIs that can be utilized by the applications 1610, some of which may be specific to a particular operating system 1604 or platform.

In an example embodiment, the applications 1610 include a home application 1650, a contacts application 1652, a browser application 1654, a book reader application 1656, a location application 1658, a media application 1660, a messaging application 1662, a game application 1664, and a broad assortment of other applications such as a third party applications 1666 and media content application 1667. According to some embodiments, the applications 1610 are programs that execute functions defined in the programs. Various programming languages can be employed to create one or more of the applications 1610, structured in a variety of manners, such as object-oriented programming languages (e.g., Objective-C, Java, or C++) or procedural programming languages (e.g., C or assembly language). In a specific example, the third party application 1666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 1666 can invoke the API calls 1612 provided by the operating system 1604 to facilitate functionality described herein.

As explained above, some embodiments may particularly include a messaging application 1662. In certain embodiments, this may be a stand-alone application that operates to manage communications with a server system such as server system 108. In other embodiments, this functionality may be integrated with another application such as a media content viewing application 1667. Messaging application 1662 may request and display various media content items and may provide the capability for a user to input data related to media content items via a touch interface, keyboard, or using a camera device of machine 1700, communication with a server system 108 via I/O components 1750, and receipt and storage of media content items in memory 1730. Presentation of media content items and user inputs associated with media content items may be managed by messaging application 1662 using different frameworks 1608, library 1606 elements, or operating system 1604 elements operating on a machine 1700.

Figure 17:
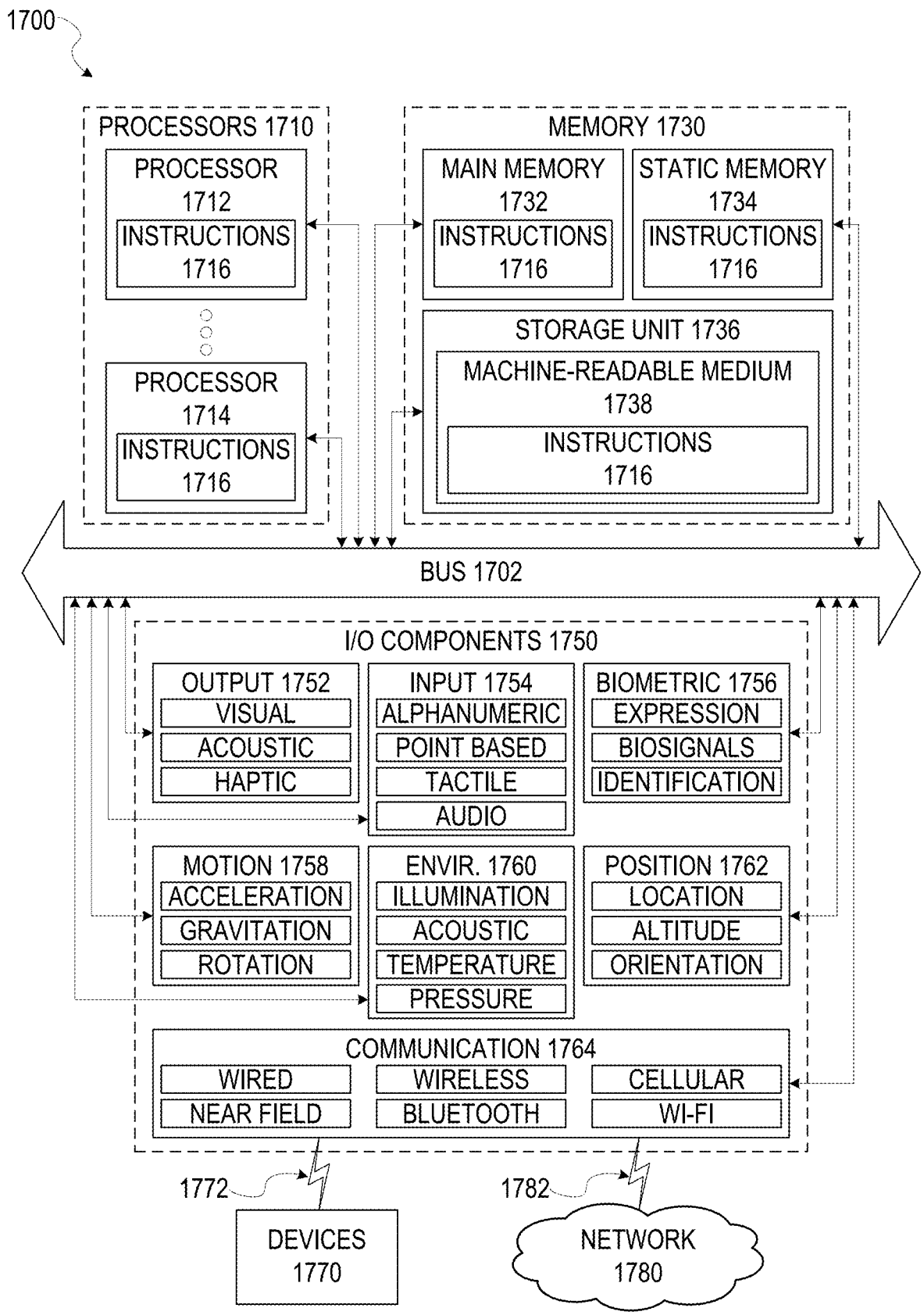
FIG. 17 illustrates a diagrammatic representation of a machine, in the form of a computer system, within which a set of instructions may be executed for causing the machine to perform any one or more of the methodologies discussed herein, according to an example embodiment.

FIG. 17 is a block diagram illustrating components of a machine 1700, according to some embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1716 (e.g., software, a program, an application 1610, an applet, an app, or other executable code) for causing the machine 1700 to perform any one or more of the methodologies discussed herein can be executed. In alternative embodiments, the machine 1700 operates as a standalone device or can be coupled (e.g., networked) to other machines. In a networked deployment, the machine 1700 may operate in the capacity of a server system 108, 110, 112, 114, 116, 118, 122, 124, etc. or a client device 102 in a server-client network environment, or as a peer machine in a peer-to-peer (or distributed) network environment. The machine 1700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any one or more of the methodologies discussed herein.

In various embodiments, the machine 1700 comprises processors 1710, memory 1730, and I/O components 1750, which can be configured to communicate with each other via a bus 1702. In an example embodiment, the processors 1710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1712 and a processor 1714 that may execute the instructions 1716. The term "processor" is intended to include multi-core processors 1710 that may comprise two or more independent processors 1712, 1714 (also referred to as "cores") that can execute instructions 1716 contemporaneously. Although FIG. 17 shows multiple processors 1710, the machine 1700 may include a single processor 1710 with a single core, a single processor 1710 with multiple cores (e.g., a multi-core processor 1710), multiple processors 1712, 1714 with a single core, multiple processors 1710, 1712 with multiples cores, or any combination thereof.

The memory 1730 comprises a main memory 1732, a static memory 1734, and a storage unit 1736 accessible to the processors 1710 via the bus 1702, according to some embodiments. The storage unit 1736 can include a machine-readable medium 1738 on which are stored the instructions 1716 embodying any one or more of the methodologies or functions described herein. The instructions 1716 can also reside, completely or at least partially, within the main memory 1732, within the static memory 1734, within at least one of the processors 1710 (e.g., within the processor's cache memory), or any suitable combination thereof, during execution thereof by the machine 1700. Accordingly, in various embodiments, the main memory 1732, the static memory 1734, and the processors 1710 are considered machine-readable media 1738.

As used herein, the term "memory" refers to a machine-readable medium 1738 able to store data temporarily or permanently and may be taken to include, but not be limited to, random-access memory (RAM), read-only memory (ROM), buffer memory, flash memory, and cache memory. While the machine-readable medium 1738 is shown, in an example embodiment, to be a single medium, the term "machine-readable medium" should be taken to include a single medium or multiple media (e.g., a centralized or distributed database, or associated caches and servers) able to store the instructions 1716. The term "machine-readable medium" shall also be taken to include any medium, or combination of multiple media, that is capable of storing instructions (e.g., instructions 1716) for execution by a machine (e.g., machine 1700), such that the instructions 1716, when executed by one or more processors of the machine 1700 (e.g., processors 1710), cause the machine 1700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1750 include a wide variety of components to receive input, provide output, produce output, transmit information, exchange information, capture measurements, and so on. In general, it will be appreciated that the I/O components 1750 can include many other components that are not shown in FIG. 17. The I/O components 1750 are grouped according to functionality merely for simplifying the following discussion, and the grouping is in no way limiting. In various example embodiments, the I/O components 1750 include output components 1752 and input components 1754. The output components 1752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1750 include biometric components 1756, motion components 1758, environmental components 1760, or position components 1762, among a wide array of other components. For example, the biometric components 1756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1758 include acceleration sensor components (e.g., accelerometer), gravitation sensor components, rotation sensor components (e.g., gyroscope), and so forth. The environmental components 1760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1750 may include communication components 1764 operable to couple the machine 1700 to a network 1780 or devices 1770 via a coupling 1782 and a coupling 1772, respectively. For example, the communication components 1764 include a network interface component or another suitable device to interface with the network 1780. In further examples, communication components 1764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1770 may be another machine 1700 or any of a wide variety of peripheral devices (e.g., a peripheral device coupled via a Universal Serial Bus (USB)).

Moreover, in some embodiments, the communication components 1764 detect identifiers or include components operable to detect identifiers. For example, the communication components 1764 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1780 or a portion of the network 1780 may include a wireless or cellular network, and the coupling 1782 may be a Code Division Multiple Access (CDMA) connection, a Global System for Mobile communications (GSM) connection, or another type of cellular or wireless coupling. In this example, the coupling 1782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1716 are transmitted or received over the network 1780 using a transmission medium via a network interface device (e.g., a network interface component included in the communication components 1764) and utilizing any one of a number of well-known transfer protocols (e.g., Hypertext Transfer Protocol (HTTP)). Similarly, in other example embodiments, the instructions 1716 are transmitted or received using a transmission medium via the coupling 1772 (e.g., a peer-to-peer coupling) to the devices 1770. The term "transmission medium" shall be taken to include any intangible medium that is capable of storing, encoding, or carrying the instructions 1716 for execution by the machine 1700, and includes digital or analog communications signals or other intangible media to facilitate communication of such software.

Furthermore, the machine-readable medium 1738 is non-transitory (in other words, not having any transitory signals) in that it does not embody a propagating signal. However, labeling the machine-readable medium 1738 "non-transitory" should not be construed to mean that the medium is incapable of movement; the medium 1738 should be considered as being transportable from one physical location to another. Additionally, since the machine-readable medium 1738 is tangible, the medium 1738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, at a server computer, a plurality of messages from a plurality of user computing devices, each message of the plurality of messages comprising a data stream;
   determining, by the server computer, a subset of messages of the plurality of messages associated with a similar geolocation and time period;
   grouping, by the server computer, the subset of messages into a plurality of pairs of messages, each pair of messages comprising a first message and a second message;
   comparing, by the server computer, audio fingerprints of the first message and the second message in each pair of messages to determine a match score for each pair of messages;
   determining, by the server computer, a set of messages of the subset of messages associated with a common audio timeline based on the match score for each pair of messages; and
   stitching together, by the server computer, the set of messages to generate a stitched data stream from the data streams for each message of the set of messages based on a time period for each message corresponding to the common audio timeline, the stitched data stream comprising messages with data streams that overlap in time periods such that there is more than one data stream for at least one time period in the stitched data stream.

2. The method of claim 1, further comprising:
   providing the stitched data stream to one or more user computing devices, to be displayed on the one or more computing devices as a continuous data stream that transitions from one message data stream to a next message data stream to a continuous common audio stream.

3. The method of claim 2, wherein the continuous audio stream comprises audio that is an average of audio associated with each data stream in the stitched data stream.

4. The method of claim 1, wherein determining a subset of messages of the plurality of messages associated with a similar geolocation comprises determining that a geolocation for each of the subset of messages is associated with the same predetermined region of global positioning system (GPS) coordinates.

5. The method of claim 1, wherein stitching together the set of messages to generate a stitched data stream further comprises:

determining a start message for the stitched data stream based on a message with a time period occurring first in the common audio timeline for the subset of messages; and
   stitching together the set of messages starting with the start message to generate the stitched data stream.

6. The method of claim 5, wherein determining the start message further comprises:
   selecting the start message from a plurality of messages with similar periods of time in the common audio timeline based on a quality score.

7. The method of claim 5, wherein determining the start message further comprises:
   randomly selecting the start message from a plurality of messages with similar periods of time in the common audio timeline.

8. The method of claim 1, wherein the stitched data stream comprises messages that are prioritized based on a quality score for an order of display in the timeline.

9. The method of claim 1, wherein the stitched data stream comprises messages that are prioritized based on a random selection for an order of display in the timeline.

10. The method of claim 1, wherein audio associated with the stitched data stream comprises audio that is an average of audio associated with each data stream in the stitched data stream.

11. A server computer comprising:
    a processor; and
    a computer readable medium coupled with the processor, the computer readable medium comprising instructions stored thereon that are executable by the processor to cause a computing device to perform operations comprising:
    receiving a plurality of messages from a plurality of user computing devices, each message of the plurality of messages comprising a data stream;
    determining a subset of messages of the plurality of messages associated with a similar geolocation and time period;
    grouping the subset of messages into a plurality of pairs of messages, each pair of messages comprising a first message and a second message;
    comparing audio fingerprints of the first message and the second message in each pair of messages to determine a match score for each pair of messages;
    determining a set of messages of the subset of messages associated with a common audio timeline based on the match score for each pair of messages; and
    stitching together the set of messages to generate a stitched data stream from the data streams for each message of the set of messages based on a time period for each message corresponding to the common audio timeline, the stitched data stream comprising messages with data streams that overlap in time periods such that there is more than one data stream for at least one time period in the stitched data stream.

12. The server computer of claim 11, the operations further comprising:
    providing the stitched data stream to one or more user computing devices, to be displayed on the one or more computing devices as a continuous data stream that transitions from one message data stream to a next message data stream to a continuous common audio stream.

13. The server computer of claim 12, wherein the continuous audio stream comprises audio that is an average of audio associated with each data stream in the stitched data stream.

14. The server computer of claim 11, wherein determining a subset of messages of the plurality of messages associated with a similar geolocation comprises determining that a geolocation for each of the subset of messages is associated with the same predetermined region of global positioning system (GPS) coordinates.

15. The server computer of claim 11, wherein stitching together the set of messages to generate a stitched data stream further comprises:
   determining a start message for the stitched data stream based on a message with a time period occurring first in the common audio timeline for the subset of messages; and
   stitching together the set of messages starting with the start message to generate the stitched data stream.

16. The server computer of claim 15, wherein determining the start message further comprises:
   selecting the start message from a plurality of messages with similar periods of time common audio timeline based on a quality score.

17. The server computer of claim 15, wherein determining the start message further comprises:
   randomly selecting the start message from a plurality of messages with similar periods of time in the common audio timeline.

18. The server computer of claim 11, wherein the stitched data stream comprises messages that are prioritized based on a quality score for an order of display in the timeline.

19. The server computer of claim 11, wherein the stitched data stream comprises messages that are prioritized based on a random selection for an order of display in the timeline.

20. A non-transitory computer readable medium comprising instructions stored thereon that are executable by at least one processor to cause a computing device to perform operations comprising:
   receiving a plurality of messages from a plurality of user computing devices, each message of the plurality of messages comprising a data stream;
   determining a subset of messages of the plurality of messages associated with a similar geolocation and time period;
   grouping the subset of messages into a plurality of pairs of messages, each pair of messages comprising a first message and a second message;
   comparing audio fingerprints of the first message and the second message in each pair of messages to determine a match score for each pair of messages;
   determining a set of messages of the subset of messages associated with a common audio timeline based on the match score for each pair of messages; and
   stitching together the set of messages to generate a stitched data stream from the data streams for each message of the set of messages based on a time period for each message corresponding to the common audio timeline, the stitched data stream comprising messages with data streams that overlap in time periods such that there is more than one data stream for at least one time period in the stitched data stream.

* * * * *